US012755160B2

(12) United States Patent
Silver et al.

(10) Patent No.: US 12,755,160 B2
(45) Date of Patent: Oct. 6, 2026

(54) LIGHTWEIGHT AGENT ROUTER WITH REDUCED LATENCY PATH SELECTION ACROSS DISTRIBUTED COMPUTE NODES

(71) Applicant: Citibank, N.A., New York, NY (US)

(72) Inventors: Miriam Silver, Tel Aviv (IL); James Myers, Clearwater Beach, FL (US); William Franklin Cameron, Clearwater, FL (US); Prithvi Narayana Rao, Allen, TX (US); Ganesh Prasad Bhat, New Jersey, NJ (US); Sourabh Deb, Tampa, FL (US); Jason Engelbrecht, London (GB); Zheyu Wang, Shanghai (CN); Haolin Jin, Shanghai (CN)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/571,423

(22) Filed: Mar. 18, 2026

(65) Prior Publication Data

US 2026/0212195 A1 Jul. 23, 2026

Related U.S. Application Data

(63) Continuation-in-part of application No. 19/458,425, filed on Jan. 23, 2026, and a continuation-in-part of (Continued)

(51) Int. Cl.
*G06N 3/0455* (2023.01)
*G06N 3/006* (2023.01)

(Continued)

(52) U.S. Cl.
CPC .................................. *G06N 3/091* (2023.01)

(58) Field of Classification Search
CPC ....... G06N 3/0455; G06N 3/084; G06N 3/091
See application file for complete search history.

(56) References Cited

U.S. PATENT DOCUMENTS 6,842,899 B2 1/2005 Moody et al.
6,912,533 B1 6/2005 Hornick (Continued)

FOREIGN PATENT DOCUMENTS

WO WO-2024020416 A1 * 1/2024 .......... G06F 16/243

OTHER PUBLICATIONS

Do et al, Apr. 3, 2024, "Automatic Prompt Selection for Large Language Models" (Year: 2024).

(Continued)

*Primary Examiner* — Brandon S Cole
(74) *Attorney, Agent, or Firm* — Ashurst Perkins Coie US LLP; Sumedha Ahuja; Willa Wu

(57) ABSTRACT

The systems and methods disclosed herein provide a lightweight artificial intelligence agent router that dynamically allocates tasks across a plurality of stateless AI agents. The router receives a task request and classifies it into one or more task types by comparing the request against historical task-agent pairings stored in a datastore. Each agent is registered in an agent registry that includes a metadata profile with performance metrics derived from prior executions. The router scores each agent by evaluating these performance metrics against the classified task type to rank the agents and select a subset of the agents whose scores satisfy a threshold value. The router determines an execution order by evaluating dependencies between sequential portions of the task request, thereby ensuring that outputs from earlier agents are available as inputs to subsequent agents. After task completion, the router updates the agent registry with execution results to adjust future routing decisions.

20 Claims, 26 Drawing Sheets

Related U.S. Application Data application No. 19/391,868, filed on Nov. 17, 2025, said application No. 19/458,425 is a continuation of application No. 19/279,103, filed on Jul. 24, 2025, now Pat. No. 12,536,406, application No. 19/571,423 is a continuation of application No. 19/204,706, filed on May 12, 2025, and a continuation-in-part of application No. 18/951,120, filed on Nov. 18, 2024, said application No. 19/391,868 is a continuation of application No. 18/900,216, filed on Sep. 27, 2024, now Pat. No. 12,475,235, said application No. 19/204,706 is a continuation of application No. 18/830,573, filed on Sep. 11, 2024, now Pat. No. 12,321,862, which is a continuation-in-part of application No. 18/821,880, filed on Aug. 30, 2024, said application No. 19/279,103 is a continuation-in-part of application No. 18/812,913, filed on Aug. 22, 2024, said application No. 18/900,216 is a continuation-in-part of application No. 18/792,523, filed on Aug. 1, 2024, now Pat. No. 12,282,565, said application No. 18/821,880 is a continuation-in-part of application No. 18/661,532, filed on May 10, 2024, now Pat. No. 12,111,747, said application No. 18/812,913 is a continuation-in-part of application No. 18/661,532, filed on May 10, 2024, now Pat. No. 12,111,747, which is a continuation-in-part of application No. 18/661,519, filed on May 10, 2024, now Pat. No. 12,106,205, said application No. 18/951,120 is a continuation of application No. 18/633,293, filed on Apr. 11, 2024, now Pat. No. 12,147,513, said application No. 18/661,519 is a continuation-in-part of application No. 18/633,293, filed on Apr. 11, 2024, now Pat. No. 12,147,513, said application No. 18/792,523 is a continuation-in-part of application No. 18/607,141, filed on Mar. 15, 2024, now Pat. No. 12,608,486, which is a continuation-in-part of application No. 18/399,422, filed on Dec. 28, 2023, now Pat. No. 12,367,292, which is a continuation of application No. 18/327,040, filed on May 31, 2023, now Pat. No. 11,874,934, which is a continuation-in-part of application No. 18/114,194, filed on Feb. 24, 2023, now Pat. No. 11,763,006, which is a continuation-in-part of application No. 18/098,895, filed on Jan. 19, 2023, now Pat. No. 11,748,491.

(51) Int. Cl.

| | |
|---|---|
| ***G06N 3/0475*** | (2023.01) |
| ***G06N 3/084*** | (2023.01) |
| ***G06N 3/091*** | (2023.01) |

(56) References Cited

U.S. PATENT DOCUMENTS

| | | | | |
|---|---|---|---|---|
| 10,430,581 | B2 | 10/2019 | Lamothe-Brassard | |
| 10,824,474 | B1 * | 11/2020 | Kamboj | G06F 9/5038 |
| 11,227,047 | B1 | 1/2022 | Vashisht et al. | |
| 11,573,848 | B2 | 2/2023 | Linck et al. | |
| 11,741,226 | B2 | 8/2023 | Dixit | |
| 11,750,530 | B2 | 9/2023 | Agardh et al. | |
| 11,960,386 | B2 | 4/2024 | Indani et al. | |
| 12,307,299 | B1 * | 5/2025 | Elbadrashiny | G06F 9/5005 |
| 12,379,964 | B2 | 8/2025 | Hwang | |
| 12,380,340 | B1 | 8/2025 | Mamut et al. | |
| 2001/0039562 | A1 | 11/2001 | Sato | |
| 2007/0033005 | A1 | 2/2007 | Cristo et al. | |
| 2007/0038436 | A1 | 2/2007 | Cristo et al. | |
| 2016/0121483 | A1 | 5/2016 | Mchugh et al. | |
| 2018/0096675 | A1 * | 4/2018 | Nygaard | G10L 13/00 |
| 2019/0319789 | A1 | 10/2019 | Chhabra et al. | |
| 2020/0334083 | A1 | 10/2020 | Liu et al. | |
| 2021/0118440 | A1 | 4/2021 | Peng et al. | |
| 2022/0004923 | A1 | 1/2022 | Kamkar et al. | |
| 2023/0147671 | A1 * | 5/2023 | Narulkar | G06F 21/79 707/692 |
| 2023/0401274 | A1 * | 12/2023 | Denninghoff | G06F 16/9538 |
| 2024/0250921 | A1 * | 7/2024 | Klemm | H04L 51/02 |
| 2024/0302803 | A1 | 9/2024 | Bagoly et al. | |
| 2025/0021464 | A1 | 1/2025 | Lang et al. | |

OTHER PUBLICATIONS

Hu, Q., J., et al., "Routerbench: A Benchmark for Multi-LLM Routing System," arXiv:2403.12031v2 [cs.LG] Mar. 28, 2024, 16 pages.

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv. /abs/2409.10102.

Constantin, Viorelm. , "Artificial Intelligence-Based Algorithm For Resource Allocation", 2022, IEEE, 8 pages (Year: 2022).

Veerendra, Battula, "Dynamic Resource Allocation in Solaris/Linux Hybrid Environments Using Real-Time Monitoring And AI-Biased Load Balancing", National Institute of Health, vol. 5, (Year: 2021), pp. 81-89.

Vengerov, David, "A Reinforcement Learning Approach to Dynamic Resource Allocation", Science Direct, vol. 20, Issue 3, (Year: 2007), 13 Pages.

* cited by examiner

| **Data Source Nutrition Label** | **Source 1** | **Source 2** | **Source 3** |
|---|---|---|---|
| Applicability | ● | □ | ▲ |
| Reliability | ● | □ | ● |
| Completeness | □ | ● | ▲ |
| Freshness | ● | □ | □ |
| Overall | ● | □ | ▲ |

| Key | ● High | □ Medium | ▲ Low |
|---|---|---|---|

*FIG. 6A*

| **Agent Nutrition Label** | **Agent 1** | **Agent 2** | **Agent 3** |
|---|---|---|---|
| Applicability | □ | □ | ▲ |
| Reliability | □ | ● | ● |
| Resiliency | ● | □ | ▲ |
| Cost | □ | ● | □ |
| Overall | □ | ● | ▲ |

| Key | ● High | □ Medium | ▲ Low |
|---|---|---|---|

*FIG. 6B*

2000

| Performance Metric 2002 | Usage Value 2004 | Maximum Value 2006 | Threshold Metric Value 2008 |
|---|---|---|---|
| Central Processing Unit (CPU) Usage | 45% | 100% | 55% |
| Memory Usage | 12.30 GB | 50.00 GB | 37.70 GB |
| Hard Disk Space Usage | 93.2 TB | 100.0 TB | 68.0 TB |
| Number of Input Tokens | 150 | 200 | 50 |
| Cost Incurred | $5,203 | $12,000 | $6,797 |

*FIG. 20*

LIGHTWEIGHT AGENT ROUTER WITH REDUCED LATENCY PATH SELECTION ACROSS DISTRIBUTED COMPUTE NODES

CROSS-REFERENCE TO RELATED APPLICATION(S)

This application is a continuation-in-part of U.S. patent application Ser. No. 19/458,425, entitled "DYNAMIC ARTIFICIAL INTELLIGENCE AGENT ORCHESTRATION USING A LARGE LANGUAGE MODEL GATEWAY ROUTER" and filed Jan. 23, 2026, which is a continuation of U.S. patent application Ser. No. 19/279,103 (now U.S. Pat. No. 12,536,406) entitled "DYNAMIC ARTIFICIAL INTELLIGENCE AGENT ORCHESTRATION USING A LARGE LANGUAGE MODEL GATEWAY ROUTER" and filed Jul. 24, 2025, which is a continuation-in-part of U.S. patent application Ser. No. 18/812,913 entitled "DYNAMIC SYSTEM RESOURCE-SENSITIVE MODEL SOFTWARE AND HARDWARE SELECTION" and filed Aug. 22, 2024, which is a continuation-in-part of U.S. patent application Ser. No. 18/661,532 (now U.S. Pat. No. 12,111,747) entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 (now U.S. Pat. No. 12,106,205) entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 (now U.S. Pat. No. 12,147,513) entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024.

This application is related to U.S. patent application Ser. No. 19/256,550 entitled "VALIDATING VECTOR CONSTRAINTS OF OUTPUTS GENERATED BY MACHINE LEARNING MODELS" and filed Jul. 1, 2025, which is a continuation of U.S. patent application Ser. No. 19/015,660 (now U.S. Pat. No. 12,361,335) entitled "VALIDATING VECTOR CONSTRAINTS OF OUTPUTS GENERATED BY MACHINE LEARNING MODELS" and filed Jan. 10, 2025, which is a division of U.S. patent application Ser. No. 18/653,858 (now U.S. Pat. No. 12,198,030) entitled "VALIDATING VECTOR CONSTRAINTS OF OUTPUTS GENERATED BY MACHINE LEARNING MODELS" and filed May 2, 2024, which is a continuation-in-part of U.S. patent application Ser. No. 18/637,362 (now U.S. Pat. No. 12,111,754) entitled "DYNAMICALLY VALIDATING AI APPLICATIONS FOR COMPLIANCE" and filed on Apr. 16, 2024.

This application is further a continuation-in-part of U.S. patent application Ser. No. 18/951,120 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Nov. 18, 2024, which is a continuation of U.S. patent application Ser. No. 18/633,293 (now U.S. Pat. No. 12,147,513) entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024.

This application is further a continuation-in-part of U.S. patent application Ser. No. 19/391,868, entitled "GENERATIVE CYBERSECURITY EXPLOIT DISCOVERY AND EVALUATION" and filed Nov. 17, 2025, which is a continuation of U.S. patent application Ser. No. 18/900,216 (now U.S. Pat. No. 12,475,235) entitled "GENERATE CYBERSECURITY EXPLOIT DISCOVERY AND EVALUATION" and filed Sep. 27, 2024, which is a continuation-in-part of U.S. patent application Ser. No. 18/792,523 (now U.S. Pat. No. 12,282,565) entitled "GENERATIVE CYBERSECURITY EXPLOIT SYNTHESIS AND MITIGATION" and filed on Aug. 1, 2024, which is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" and filed on Mar. 15, 2024, which is a continuation-in-part of U.S. patent application Ser. No. 18/399,422 entitled "PROVIDING USER-INDUCED VARIABLE IDENTIFICATION OF END-TO-END COMPUTING SYSTEM SECURITY IMPACT INFORMATION SYSTEMS AND METHODS" and filed on filed Dec. 28, 2023, which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" and filed on May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" and filed on Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" and filed on Jan. 19, 2023.

This application is further a continuation-in-part of U.S. patent application Ser. No. 19/204,706 entitled "LATENCY-, ACCURACY-, AND PRIVACY-SENSITIVE TUNING OF ARTIFICIAL INTELLIGENCE MODEL SELECTION PARAMETERS AND SYSTEMS AND METHODS OF THE SAME" and filed on May 12, 2025, which is a continuation of U.S. patent application Ser. No. 18/830,573 (now U.S. Pat. No. 12,321,862) entitled "LATENCY-, ACCURACY-, AND PRIVACY-SENSITIVE TUNING OF ARTIFICIAL INTELLIGENCE MODEL SELECTION PARAMETERS AND SYSTEMS AND METHODS OF THE SAME" and filed Sep. 11, 2024, which is a continuation-in-part of U.S. patent application Ser. No. 18/821,880 entitled "SYSTEM-SENSITIVE MACHINE LEARNING MODEL SELECTION AND OUTPUT GENERATION AND SYSTEMS AND METHODS OF THE SAME" and filed Aug. 30, 2024, which is a continuation-in-part of and claims priority to U.S. patent application Ser. No. 18/661,532 (now U.S. Pat. No. 12,111,747) entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of and claims priority to U.S. patent application Ser. No. 18/661,519 (now U.S. Pat. No. 12,106,205) entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of and claims priority to U.S. patent application Ser. No. 18/633,293 (now U.S. Pat. No. 12,147, 513) entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024.

The content of the foregoing applications is incorporated herein by reference in their entirety.

BACKGROUND

An artificial intelligence (AI) agentic model ("agent"), whether autonomous or semi-autonomous, refers to a persistent software entity characterized by a digitally encoded objective function. The objective function can instruct the agent to, for example, maximize task accuracy, minimize resource usage, comply with specified operational constraints, and the like. The degree of autonomy can range from semi-autonomous, where human intervention is occasionally used, to fully autonomous, where the agent operates independently within defined parameters. Agents use received data (e.g., an input, a prompt, a query) to autonomously trigger and manage actions such as application programming interface (API) invocations, outbound network requests, updates to internal or external datastores, and other computational tasks. However, conventional approaches to coordinating multiple agents typically rely on static routing configurations that assign tasks to predetermined agents or invoke all available agents for every incoming task, regardless of task characteristics or agent performance.

BRIEF DESCRIPTION OF THE DRAWINGS

FIGS. 6A and 6B illustrate example security labels, in accordance with some implementations of the present technology.

FIG. 20 shows a schematic of a data structure illustrating a system state and associated threshold metric values, in accordance with some implementations of the present technology.

Figure 1:
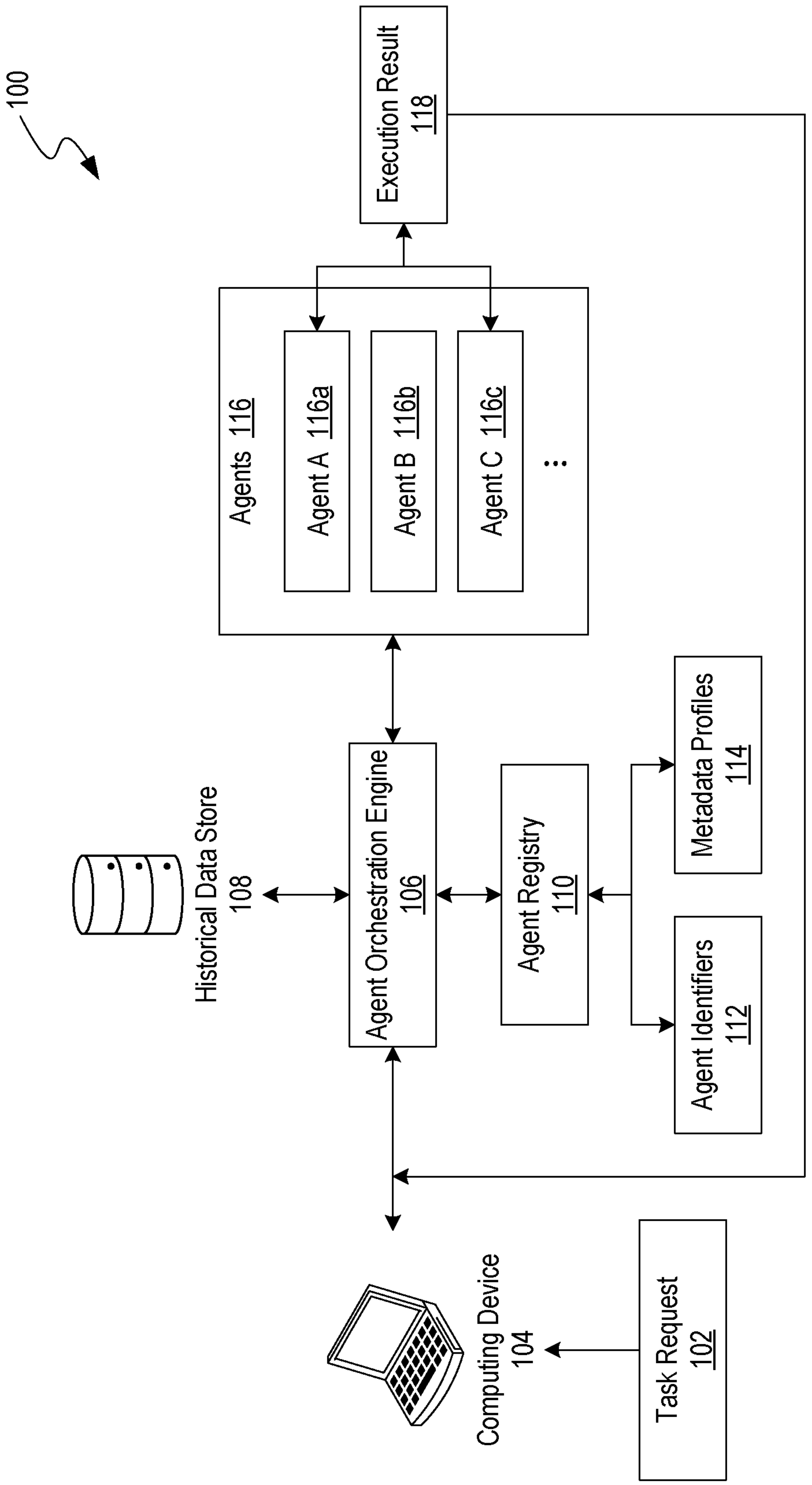
FIG. 1 shows a schematic illustrating an example architecture of a model orchestration platform used to allocate tasks among distributed artificial intelligence (AI) agents, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Artificial intelligence systems can deploy multiple agents to process task requests, such that each agent is a software entity that executes a specific function based on an underlying model and an objective function. An agent can be trained on domain-specific data to perform functions such as retrieving information from a knowledge base (e.g., a structured repository), generating natural language responses, invoking external services through application programming interfaces, and so forth. When multiple agents are available, an allocation decision is typically made to determine how to allocate incoming task requests among the agents. The allocation decision, for example, defines which agents should process a given task request and, when multiple agents are selected, the sequence in which the agents should execute, and so forth. The allocation decision can indicate a sequential execution, for example, in scenarios where the output of one agent serves as input to a subsequent agent. Additionally or alternatively, the allocation decision can indicate a parallel execution in scenarios where agents can process the task request independently. The allocation decision affects both the quality of the output produced and the computational resources consumed during task processing.

Deploying a single agent to handle all incoming task requests, as implemented in some conventional model orchestration approaches, limits the capability of the system to the capabilities of that one agent. Each agent is typically specialized for a particular domain or function based on the data the agent was trained on and the objective function the agent was designed to optimize or otherwise bias. For example, an agent biased (e.g., optimized) for speed may generate responses quickly but may sacrifice accuracy compared to an agent biased (e.g., optimized) for accuracy. Thus, when a single agent receives a task request outside its area of specialization, the agent can generate outputs that are incomplete, inaccurate, or otherwise irrelevant to the user's intent. The single-agent approach further creates a bottleneck where all task requests must wait for the one agent to become available, leading to increased queue times during periods of high demand.

However, deploying all available agents to process every task request, as implemented in some conventional model orchestration approaches, introduces inefficiency and redundancy that degrade overall system performance. When multiple agents with overlapping capabilities process the same task, the agents may generate similar or identical outputs that provide no additional value beyond what a single agent would have produced. Additional computational resources are then typically expended to aggregate or reconcile the redundant outputs. Agents that are not trained for a particular task type may generate low-quality outputs that contaminate the aggregation process, further reducing the quality of the final result. Further, the coordination overhead required to manage communication between all agents and to synchronize their outputs adds complexity that increases the likelihood of errors and failures.

In addition, deploying all available agents for every task request consumes computational resources that are typically disproportionate to the value produced. Each agent invocation requires allocating processor cycles to execute the agent's inference operations, thereby allocating memory to store the agent's model parameters and intermediate computations, and consuming network bandwidth to transmit the task request to the agent and to receive the agent's response. When agents are deployed on cloud infrastructure, each invocation incurs a resource cost (e.g., monetary, network, hardware, software) based on the compute time and memory consumed. For example, deploying ten agents when two agents would perform just as accurately/quickly multiplies these resource costs by a factor of five without producing a corresponding improvement in output quality. The increased resource consumption also increases latency because the system must wait for all agents to complete processing before aggregating their outputs, and the slowest agent determines the overall response time. Network congestion caused by transmitting task requests to many agents simultaneously can further increase latency by introducing delays in message delivery.

Conventional approaches that attempt to selectively deploy agents rely on static rule-based configurations that map task types to predetermined agent assignments. These rule-based configurations define conditional statements that evaluate attributes of the task request and specify which agents should be invoked when the conditions are satisfied. The rules are typically authored by system administrators based on assumptions about which agents are trained for which task types and are typically stored in configuration files that the system loads at startup. Once the system begins processing a task request, the rule-based configuration commits to a fixed agent assignment that typically cannot be modified based on observations during execution. If an assigned agent begins producing low-quality outputs or experiences degraded performance due to resource contention, the system typically continues routing the task to that agent because the rules do not account for runtime conditions. The rules further typically cannot adapt to changes in agent capabilities over time, such as when an agent is retrained on new data and performs better in different domains or when an agent's performance degrades due to model drift. Updating the rules typically requires manual intervention by administrators who revise the conditional statements, thereby creating a lag between when agent capabilities change and when the routing configuration reflects those changes.

As such, the inventors have developed systems (hereafter "model orchestration platform") and related methods to dynamically allocate tasks across a plurality of stateless artificial intelligence agents based on real-time performance evaluation and task characteristics. The model orchestration platform receives a task request at a computing device communicatively coupled to multiple AI agents, where each agent operates in a stateless configuration such that the agent does not retain task-specific memory between invocations. Each AI agent can be registered in an agent registry that stores a metadata profile defining performance metric values (e.g., latency measurements, success rates, cost-per-task measurements) derived from historical task executions. The model orchestration platform identifies a task feature set by classifying the task request into one or more task types using a datastore that maps vector representations (e.g., fixed-length numerical arrays encoding semantic content) of historical tasks to historical agent selections. The model orchestration platform can generate a score for each AI agent by evaluating the performance metric values against the task feature set and selecting an agent configuration by ranking the agents according to their scores, identifying a subset of agents whose scores satisfy a threshold value, and determining an execution order by evaluating intermediate output dependencies (e.g., where the output of a first agent serves as input to a second agent) between sequential portions of the task request. The model orchestration platform transmits the task request to the selected agent subset according to the execution order and/or updates the agent registry based on execution results to improve future routing decisions.

In some implementations, the model orchestration platform monitors intermediate results during task execution and dynamically adjusts the agent configuration in response to detecting deteriorating performance. The model orchestration platform obtains an intermediate outcome score generated by a first AI agent during execution and, in response to determining that the intermediate outcome score fails to satisfy a performance criterion, reroutes the remaining portion of the task request to a second AI agent having a score that satisfies the threshold value. The model orchestration platform can evaluate candidate execution paths prior to transmitting the task request by generating a probability of successful task completion for each candidate path and selecting a path having a probability that exceeds a confidence threshold. This pre-execution assessment enables the model orchestration platform to commit resources only to execution paths with sufficient likelihood of success.

Moreover, in some implementations, the model orchestration platform operates in conjunction with a hub-and-spoke architecture for managing data transmission among agents. When multiple agents share information during task processing, transmitting data directly between every pair of agents creates complexity that scales with the number of agents and increases the risk of data inconsistency when agents hold different versions of the same information. The hub-and-spoke architecture addresses this technical constraint by using a centralized hub that acts as a single repository for information received from multiple source agents and distributes data to requesting agents based on authorization protocols and data availability. The model orchestration platform can function as an implementation of the centralized hub, such that the agent registry operates as a central repository that stores metadata profiles for each agent and enforces access controls determining which agents can transfer data to the hub and which agents can retrieve data from the hub. When an agent requests data from the hub, the model orchestration platform can verify the agent's authorization, determine whether the requested data exists and whether any restrictions apply, and transfer the data only if the authorization and restriction checks are satisfied.

Further, in some implementations, the model orchestration platform uses a gateway router architecture for orchestrating autonomous AI agents via semantic analysis of incoming prompts. When a system receives diverse prompts from users, determining which agent should process each prompt based solely on keyword matching or explicit user selection fails to account for the semantic intent underlying the prompt and may route prompts to agents that are not trained to perform the task. The gateway router architecture addresses this technical constraint by generating semantic fingerprints of incoming prompts that capture the underlying meaning and comparing those fingerprints against historical prompt-agent pairings to identify which agents have successfully processed semantically similar prompts. The model orchestration platform can apply hierarchical classification techniques to categorize incoming task requests into progressively more specific task types and match them to appropriate agents based on query characteristics. The model orchestration platform can further evaluate estimated performance metrics for candidate agents, compare those metrics against threshold values derived from system state and resource availability, and select agents whose capabilities satisfy the requirements of the task request while optimizing (or otherwise biasing) for latency, cost, and/or accuracy constraints.

The model orchestration platform can address several technical limitations of conventional modeling approaches. For example, the model orchestration platform can overcome the capability limitations of single-agent deployments by dynamically selecting a subset of agents whose combined capabilities match the requirements of each task request rather than routing all tasks to a single general-purpose agent. The model orchestration platform can avoid the inefficiency and resource waste of deploying all available agents by using performance-based scoring to identify only the agents most likely to produce high-quality outputs for the specific task type, thereby reducing redundant processing and unnecessary computational overhead. The model orchestration platform can reduce latency by selecting agents with favorable response time metrics and by pruning candidate execution paths that have low probabilities of success before committing resources to task execution. The model orchestration platform can address the inflexibility of static rule-based routing by continuously updating the metadata profiles in the agent registry based on execution results, enabling the scoring function to reflect current agent capabilities rather than assumptions encoded in static configuration files. The model orchestration platform can further address the inability of conventional approaches to adapt during task execution by monitoring intermediate results and dynamically reallocating tasks to alternative agents when performance degradation is detected, rather than committing to a fixed agent assignment that cannot be modified once execution begins.

While the model orchestration platform is described in detail with one or more sequences of operations, the order in which these operations are performed can be modified or rearranged. For example, the model orchestration platform can generate agent scores before extracting the task feature set from the task request, thereby allowing preliminary agent rankings to inform which task features can be used for final agent selection. In another example, the model orchestration platform can transmit the task request to an initial agent subset and begin collecting intermediate results before determining the complete execution order for all agents, using the intermediate results to inform the sequencing of subsequent agents based on observed output quality and latency. The specific ordering of operations described in the Detailed Description and illustrated in the figures represents example implementation sequences, but alternative orderings are additionally within the scope of the disclosed technology.

While the current description provides examples related to LLMs and agents, one of skill in the art would understand that the disclosed techniques can apply to other forms of machine learning or algorithms, including unsupervised, semi-supervised, supervised, and reinforcement learning techniques. For example, the disclosed model orchestration platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Model Orchestration Platform

FIG. 1 shows a schematic illustrating an example architecture 100 of a model orchestration platform used to allocate tasks among distributed artificial intelligence (AI) agents, in accordance with some implementations of the present technology. The architecture 100 is implemented using components of example computer system 2500 illustrated and described in more detail with reference to FIG. 25. Implementations of example architecture 100 can include different and/or additional components or can be connected in different ways.

A task request 102 can be transmitted to a computing device 104. In some implementations, the computing device 104 is a mobile phone having an application processor that executes agent coordination logic locally on the device. The computing device 104 can be a server structured to receive task requests from remote client devices over a network connection. In some implementations, the computing device 104 is a laptop computer running a desktop application that interfaces with local or cloud-hosted agents. In some implementations, the computing device 104 is an edge computing device.

The computing device 104 can be associated with an agent orchestration engine 106 that coordinates task allocation across multiple AI agents. The agent orchestration engine 106 can be implemented as a standalone software module executing directly on the computing device 104, such that the software module runs as a background process that intercepts incoming task requests and routes them to one or more agents without requiring a separate server. In some implementations, the agent orchestration engine 106 is deployed as a microservice within a container orchestration platform, such that the microservice runs in an isolated container that can be scaled horizontally by spawning additional container instances in response to increased task request volume. In some implementations, the agent orchestration engine 106 operates as a distributed service spanning multiple compute nodes, where each compute node handles a portion of the agent registry and the nodes coordinate through a consensus protocol to determine routing decisions.

The agent orchestration engine 106 can operate as a centralized controller that maintains workflow state, such as task progress indicators and intermediate outputs, while the agents 116 remain stateless, i.e., the agents 116 do not retain task-specific memory between invocations. This stateless agent architecture enables the agent orchestration engine 106 to reassign tasks from one agent to another without transferring execution context or synchronizing the internal agent state.

The agent orchestration engine 106 can be communicatively connected with a historical data store 108 that maintains records of prior task executions. The historical data store 108 can store vector representations (or other alphanumeric representations) of previously received task requests. Each vector representation can refer to a fixed-length numerical array generated by encoding the text or structured content of a task request using an embedding model. The historical data store 108 can store corresponding agent selection outcomes that indicate which agents were selected to process each historical task request and whether the task completed successfully (e.g., without failure conditions). In some implementations, the historical data store 108 maintains additional execution metadata such as elapsed processing time for each historical task, resource consumption measurements indicating memory and/or processor utilization during task execution, and/or error codes or failure indicators for tasks that did not complete successfully. The historical data store 108 can be implemented as a relational database that stores execution records in structured tables indexed by task identifiers. The historical data store 108, in some implementations, is implemented as a vector database that can be used for similarity search operations (where the agent orchestration engine 106 queries the vector database to retrieve historical tasks having vector representations within a specified distance of an incoming task request).

The agent orchestration engine 106 can be communicatively connected with an agent registry 110 that stores one or more agent identifiers 112 and one or more metadata profiles 114 associated with each agent identifier 112. Each agent identifier 112 can be a unique alphanumeric string that distinguishes one agent from another within the registry, such as a universally unique identifier (UUID) or a human-readable name combined with a version number. Each metadata profile 114 can define performance metric values derived from historical task executions by the corresponding agent. The performance metric values can include latency measurements that record the elapsed time between when the agent receives a task request and when the agent returns a response. The performance metric values can include success rates that represent a ratio of successfully completed tasks to total tasks assigned to the agent over a defined time window. In some implementations, the performance metric values include resource consumption data that quantifies the computational resources used by the agent during task execution, such as processor cycles consumed or memory allocated. In some implementations, the metadata profile 114 stores the performance metric values as time-series data that preserves individual measurements from each historical task execution, thereby enabling the agent orchestration engine 106 to detect performance patterns (e.g., trends, trajectories) or degradation patterns (e.g., trends, trajectories) over time. In some implementations, the metadata profile 114 stores the performance metric values as aggregated statistics (e.g., rolling averages, percentile values) that summarize agent performance without retaining individual execution records. The metadata profile 114 can be stored in a structured format (e.g., JavaScript Object Notation (JSON) document, protocol buffer message) that defines typed fields for each performance metric.

The agent orchestration engine 106 can be communicatively connected with one or more agents 116, such as a first agent 116*a*, a second agent 116*b*, a third agent 116*c*, and so forth. Each agent 116 can be deployed as an independent container with a particular service endpoint. The container packages the agent's executable code and dependencies into an isolated runtime environment, and the service endpoint exposes a network address through which the agent orchestration engine 106 transmits task requests to the agent. In some implementations, each agent 116 is deployed as a serverless function accessible via an API gateway, where the serverless function executes on demand in response to incoming requests and the cloud provider automatically allocates and deallocates compute resources based on request volume. The agent 116 can alternatively be deployed as an on-premise model hosted within a network boundary, such that the agent executes on hardware owned and operated by an organization and network traffic between the agent orchestration engine 106 and the agent does not traverse public internet infrastructure. This on-premise deployment can be used for agents that process sensitive or otherwise protected data subject to regulatory restrictions on data residency or transmission.

The agent orchestration engine 106 can reduce latency and processing overhead by applying a lightweight scoring function to rank the agents 116 based on the metadata profiles 114 rather than invoking each agent 116 to evaluate the task request 102 directly. The lightweight scoring function retrieves performance metric values from the metadata profiles 114 stored in the agent registry 110 and determines a numerical score for each agent 116 by evaluating the performance metric values against task features extracted from the task request 102. Because the scoring function operates on predetermined metadata rather than requiring each agent 116 to process the task request 102, the agent orchestration engine 106 avoids the latency and resource consumption that would result from transmitting the task request 102 to every agent 116 and waiting for each agent 116 to return an evaluation response. The scoring function can be implemented as a weighted sum that multiplies each performance metric value by a corresponding weight and sums the weighted values to produce the score. The weights can be adjusted based on task features, such that time-sensitive tasks increase the weight applied to latency measurements while cost-sensitive tasks increase the weight applied to resource consumption data.

The lightweight scoring function can achieve low-latency operation because the scoring is executed using metadata retrieved from the agent registry 110 without issuing inference calls to any of the agents 116. The scoring function can perform a fixed number of operations per agent that are bounded in time regardless of the complexity of the task request 102. Each operation involves a constant-time lookup of precomputed aggregate values stored in the metadata profile 114, rather than computing these values on demand from raw execution logs. The vector embedding of the task request 102 can be retrieved from a cache if the same or a sufficiently similar task request has been previously processed, avoiding redundant encoding operations. In some implementations, the orchestration overhead introduced by the agent orchestration engine 106 is bounded such that the total time consumed by task classification, agent scoring, and execution order determination does not exceed a predefined latency budget, and/or the request context processed by the agent orchestration engine 106 does not exceed a predefined memory budget.

The agent orchestration engine 106 can select a subset of the agents 116 based on the ranking by identifying agents having scores that satisfy a threshold value. In the example of FIG. 1, the selected subset includes the first agent 116*a* and the third agent 116*c*, while the second agent 116*b* is excluded from the subset because the score for the second agent 116*b* falls below the threshold value. The selected subset of the agents 116 can be used to generate an execution result 118 by processing the task request 102 according to an execution order determined by the agent orchestration engine 106.

The execution order can specify a sequential arrangement in which the first agent 116*a* generates an intermediate output that serves as an input to the third agent 116*c*. The third agent 116*c* receives the intermediate output along with relevant portions of the original task request 102 and produces the execution result 118 based on the combined input. This sequential arrangement can be used when the task request 102 involves multiple processing operations that have data dependencies, such that a later operation requires output from an earlier operation to proceed. In some implementations, the first agent 116*a* and the third agent 116*c* process the task request 102 in parallel rather than sequentially. The agent orchestration engine 106 transmits the task request 102 to both agents simultaneously and receives separate outputs from each agent. The agent orchestration engine 106 aggregates the respective outputs to generate the execution result 118 by merging complementary information from each output and/or by selecting the output having a higher confidence score. The parallel arrangement can be used when the task request 102 can be decomposed into independent subtasks that do not have data dependencies between them. In some implementations, a separate aggregation agent receives outputs from the first agent 116*a* and the third agent 116*c* and combines them into the execution result 118. The aggregation agent can apply particular logic to reconcile conflicting information between the outputs or to synthesize a unified response from partial outputs generated by each agent.

The execution result 118 can be transmitted back to the agent orchestration engine 106 for logging and registry updates. The agent orchestration engine 106 can record the execution result 118 in the historical data store 108 along with metadata indicating which agents processed the task request 102 and performance measurements from the execution. The agent orchestration engine 106 can update the metadata profiles 114 in the agent registry 110 to reflect the performance of the first agent 116*a* and the third agent 116*c* during the task execution, such that future scoring operations incorporate the most recent performance data. The execution result 118, in some implementations, is transmitted directly back to the computing device 104 for delivery to a requestor without passing through the agent orchestration engine 106 to reduce response latency by removing an intermediate network hop between the agents 116 and the computing device 104.

Figure 2:
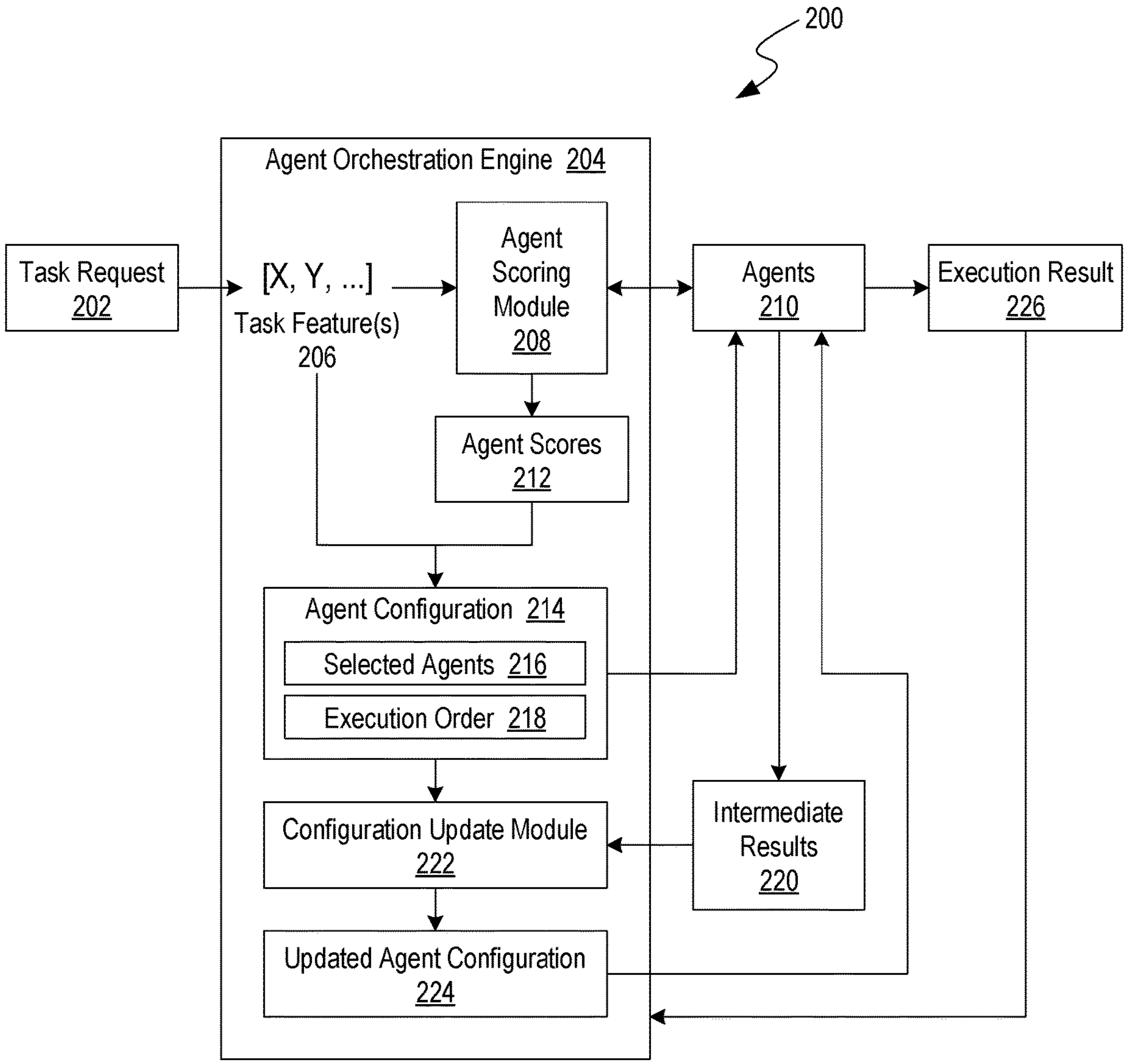
FIG. 2 shows a schematic illustrating an example environment of allocating tasks using an agent orchestration engine of a model orchestration platform, in accordance with some implementations of the present technology.

FIG. 2 shows a schematic illustrating an example environment 200 of allocating tasks using an agent orchestration engine 204 (e.g., the agent orchestration engine 106 in FIG. 1) of a model orchestration platform, in accordance with some implementations of the present technology. The environment 200 is implemented using components of example computer system 2500 illustrated and described in more detail with reference to FIG. 25. Implementations of example environment 200 can include different and/or additional components or can be connected in different ways.

A task request 202 can be transmitted to the agent orchestration engine 204. The agent orchestration engine 204 identifies one or more task features 206 from the task request 202 by generating a vector embedding of the task request 202 using an encoder model. The encoder model transforms the textual or structured content of the task request 202 into a fixed-length numerical array that captures semantic relationships between words and phrases within the task request 202. The agent orchestration engine 204 can query a data store, such as the historical data store 108 of FIG. 1, to retrieve historical tasks having vector embeddings within a similarity distance of the vector embedding of the task request 202. The similarity distance can be measured using cosine similarity, which quantifies the angular difference between two vectors in a high-dimensional space such that vectors pointing in similar directions receive higher similarity scores regardless of their magnitudes. The similarity distance can additionally or alternatively be measured using Euclidean distance, which quantifies the straight-line distance between two points in the vector space such that vectors with similar coordinate values receive lower distance scores. The agent orchestration engine 204 can assign task type labels to the task request 202 based on task type labels associated with the retrieved historical tasks. For example, if the three most similar historical tasks are each labeled with a "data retrieval" task type, the agent orchestration engine 204 can assign the "data retrieval" label to the task request 202.

In some implementations, the agent orchestration engine 204 extracts the task features 206 by generating a probability distribution across predefined task type categories. The agent orchestration engine 204 passes the task request 202 through an AI model or rules engine that outputs a probability value for each predefined task type category. Each probability value represents the likelihood that the task request 202 belongs to the corresponding category. The AI model can be a neural network trained on labeled historical task requests to identify patterns indicative of each task type category. The agent orchestration engine 204 can select task types having probabilities exceeding a classification threshold. In some implementations, the agent orchestration engine 204 extracts the task features 206 using a rules engine that evaluates conditional statements against the content of the task request 202. The rules engine can, from the task request 202, identify keywords or phrases that match predefined patterns and assign task type labels based on which patterns are matched. This rules-based approach provides deterministic classification without requiring machine learning inference operations.

In some implementations, the agent orchestration engine 204 uses structured fields within the task request 202 to identify domain indicators that define the task features 206. The structured fields can include header values that specify metadata about the task request 202 such as a source application identifier or a user role designation. The structured fields can include request parameters that define specific requirements for the task, such as a maximum response time or a preferred output format. The structured fields can include metadata tags that categorize the task request 202 according to a predefined taxonomy, such as a domain area. The agent orchestration engine 204, in some implementations, extracts complexity values from the structured fields using indicators such as the number of subtasks specified in the task request 202 or the depth of nested data structures within the request payload. The agent orchestration engine 204 can extract priority levels from the structured fields using explicit priority designations or inferred priority designations determined based on the source of the task request 202.

The task features 206 can be used by an agent scoring module 208 to score one or more agents 210 and to generate a set of agent scores 212. The agent scoring module 208 determines each agent score by retrieving a metadata profile for each agent from an agent registry, such as the agent registry 110 of FIG. 1. The metadata profile can include performance metric value(s) that quantify how each agent has performed on historical task executions. The performance metric values include historical success rates that represent the proportion of tasks completed without errors relative to total tasks assigned to the agent, average response times that represent the mean elapsed time between when the agent receives a task request and when the agent returns a completed response, cost-per-task measurements that represent the computational resources consumed by the agent during task execution, and so forth. In some implementations, the agent scoring module 208 applies a weighted scoring operation that biases (e.g., multiplies) each performance metric value by a weight corresponding to the task features 206. The weights determine the relative importance of each performance metric when calculating the overall agent score. For example, if the task features 206 indicate a time-sensitive task type based on a priority level extracted from the task request 202, the agent scoring module 208 increases the weight applied to the average response time metric such that agents with lower response times receive higher agent scores 212.

In some implementations, the agent scoring module 208 operates as an internal component of the agent orchestration engine 204, executing within the same process space and sharing memory with other components of the agent orchestration engine 204. This internal implementation reduces latency by eliminating network communication overhead between the agent scoring module 208 and other orchestration components. In other implementations, the agent scoring module 208 executes as a separate microservice accessible via a network endpoint. The microservice runs in an isolated container and exposes an API through which the agent orchestration engine 204 submits scoring requests and receives agent scores 212 in response. This microservice implementation enables the agent scoring module 208 to be scaled independently of the agent orchestration engine 204 and to be updated without redeploying the agent orchestration engine 204. In some implementations, the agent scoring module 208 is a machine learning ranking model that accepts the task features 206 and metadata profiles as input and outputs a ranked list of agents. The ranking model can be trained on historical data that pairs task features with agent selection outcomes and learns to predict which agents are most likely to successfully complete tasks having particular feature combinations. In some implementations, the agent scoring module 208 is a rules engine that evaluates conditional statements mapping task type patterns to agent identifiers. The rules engine maintains a table of rules where each rule specifies a condition based on task features and an action that assigns a bias or weight to agents matching certain criteria. In some implementations, the agent scoring module 208 is itself another agent within the agents 210 that is trained to rank and select tasks.

The agent scores 212 and the task features 206 can be used by the agent orchestration engine 204 to generate an agent configuration 214. The agent configuration 214 specifies which agents will process the task request 202 and in what sequence. The agent configuration 214 includes one or more selected agents 216 that have been chosen from the agents 210 to handle the task request 202. The agent configuration 214 includes an execution order that defines the sequence in which the selected agents 216 will be invoked. The agent orchestration engine 204 identifies the selected agents 216 by sorting the agents 210 in descending order according to the agent scores 212 such that agents with higher scores appear earlier in the sorted list. The agent orchestration engine 204 can select agents having scores that satisfy a threshold value by iterating through the sorted list and including each agent whose score meets or exceeds the threshold. The threshold value can be a fixed value or a dynamic value determined based on the distribution of agent scores 212, such as selecting agents whose scores fall within the top quartile of all scores.

The agent orchestration engine 204 determines the execution order by decomposing the task request 202 into sequential portions that represent particular processing operations used to complete the task. The agent orchestration engine 204 can identify input-output relationships between the sequential portions by analyzing which portions produce data that other portions require as input. For example, if a first portion generates a summary of a document and a second portion translates the summary into another language, the agent orchestration engine 204 identifies that the second portion depends on the output of the first portion. The agent orchestration engine 204 can order the selected agents 216 such that an agent responsible for generating an output required by a subsequent portion executes before the agent responsible for the subsequent portion. This ordering ensures that each agent has access to the data it needs when it begins processing. In some implementations, the agent orchestration engine 204 determines the execution order by generating a plurality of candidate execution paths that represent different possible sequences for invoking the selected agents 216. The agent orchestration engine 204 determines a probability of successful completion for each candidate execution path by aggregating historical success rates of the selected agents 216 when executed in the corresponding order. A successful completion occurs, in some implementations, when all agents in the execution path return valid outputs within their respective timeout periods and the final output satisfies one or more quality criteria defined for the task type. The agent orchestration engine 204 selects a candidate execution path having a probability of successful completion that exceeds a confidence threshold. If multiple candidate execution paths exceed the confidence threshold, the agent orchestration engine 204 can select the path with the highest probability or the path with the lowest estimated latency.

The agent configuration 214 can be used by the agent orchestration engine 204 to invoke the selected agents 216 from the agents 210 in a specific execution order 218. The agent orchestration engine 204 transmits the task request 202 or relevant portions thereof to each selected agent in the sequence defined by the execution order 218. In some implementations, the agents 210 invoked in accordance with the agent configuration 214 produce a set of intermediate results 220 as they complete their respective processing operations. The intermediate results 220 include partial outputs generated by each selected agent at the completion of a corresponding execution operation. Each partial output can represent the agent's contribution to the overall task before subsequent agents have processed it further. The intermediate results 220 can include confidence scores indicating a degree of certainty associated with each partial output that the agent generates based on internal quality assessments of its output, one or more quality metrics measuring accuracy or completeness of each partial output (e.g., how closely the output matches expected results, what proportion of the requested information the output contains), and/or error indicators signaling that an agent failed to produce a valid output within a timeout period (and/or the type of failure). The intermediate results 220 enable the agent orchestration engine 204 to operate dynamically by monitoring task progress at each execution operation and adjusting the agent configuration 214 based on observed performance rather than committing to a fixed execution path at the outset.

The intermediate results 220 can be transmitted to a configuration update module 222 that evaluates the intermediate results 220 and, in some implementations, generates an updated agent configuration 224. The configuration update module 222 generates the updated agent configuration 224 by comparing performance metrics within the intermediate results 220 against predefined performance thresholds stored in the agent registry 110 of FIG. 1. Each performance threshold defines a minimum acceptable value for a corresponding metric. In response to detecting that a quality metric for a particular agent falls below a corresponding threshold, the configuration update module 222 can remove the particular agent from the updated agent configuration 224. The configuration update module 222 can substitute an alternative agent from the agents 210 having a next highest agent score among agents not already included in the configuration. This substitution enables the orchestration system to recover from underperforming agents without failing the entire task.

In response to detecting that an error indicator signals a timeout or failure, the configuration update module 222 modifies the execution order to bypass the failing agent and route the task request 202 to a fallback agent. The fallback agent can be a predetermined backup agent designated in the agent registry 110 for each primary agent, or the fallback agent can be dynamically selected based on the agent scores 212 at the time of failure. The configuration update module 222 can preserve intermediate results 220 generated by agents that completed successfully and pass those results to the fallback agent so that prior work is not discarded.

In some implementations, the configuration update module 222 adds additional agents to the updated agent configuration 224 in response to determining that confidence scores within the intermediate results 220 fall below a confidence threshold. Low-confidence scores can indicate that the agents are uncertain about their outputs, which can mean that redundant processing by multiple agents improves output quality. The configuration update module 222 can select additional agents having complementary capabilities or different underlying models to provide diverse perspectives on the task. The outputs from the additional agents can be aggregated using, for example, voting mechanisms or weighted averaging to produce a final output with higher confidence than any single agent can.

The updated agent configuration 224 can be transmitted back to the agents 210 to generate a final execution result 226. The agents 210 that remain in the updated agent configuration 224 can continue processing from where they left off, while newly added agents begin processing based on the intermediate results 220 generated by prior agents. The final execution result 226 represents the completed output of the task request 202 after all agents in the updated agent configuration 224 have finished their processing operations. The final execution result 226 can be transmitted back to the agent orchestration engine 204. The agent orchestration engine 204 can record the final execution result 226 in the historical data store 108 along with metadata about which agents participated and how they performed. The agent orchestration engine 204 can update the metadata profiles 114 in the agent registry 110 in accordance with the performance of each agent during this task execution. The final execution result 226, in some implementations, is transmitted directly to a processing device such as the computing device 104 of FIG. 1 without passing through the agent orchestration engine 204.

Figure 3:
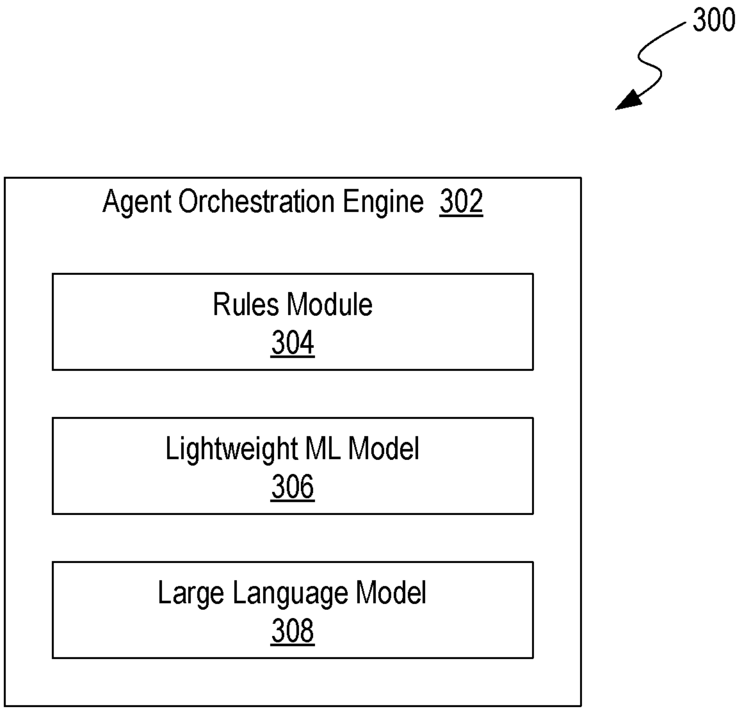
FIG. 3 shows a schematic illustrating an example layered architecture of an agent orchestration engine of a model orchestration platform, in accordance with some implementations of the present technology.

FIG. 3 shows a schematic illustrating an example layered architecture 300 of an agent orchestration engine of a model orchestration platform, in accordance with some implementations of the present technology. The layered architecture 300 is implemented using components of example computer system 2500 illustrated and described in more detail with reference to FIG. 25. Implementations of example layered architecture 300 can include different and/or additional components or can be connected in different ways.

An agent orchestration engine 302 (e.g., the agent orchestration engine 106 of FIG. 1 and the agent orchestration engine 204 of FIG. 2) can be structured with multiple layers that handle different dimensions (e.g., aspects, portions) of task processing. The layered architecture enables the agent orchestration engine 302 to balance low-latency deterministic processing with flexible decision-making by routing operations to a specific layer based on task characteristics. In some implementations, lower layers execute faster but are applied in defined scenarios, while higher layers consume more resources but are applied in more complex situations. The agent orchestration engine 302 can evaluate incoming task requests and direct each request to the appropriate layer based on the complexity of the request and the confidence with which lower layers can process.

A rules module 304 can form a first layer of the agent orchestration engine 302. The rules module 304 enforces hard constraints by evaluating incoming task requests against predefined conditional statements stored in a rules repository. Each conditional statement specifies a condition that can be evaluated against attributes of the task request and an action that the rules module 304 executes when the condition is satisfied. The rules module 304, in some implementations, enforces latency requirements by comparing a maximum allowable response time specified in the task request against average latency values stored in the metadata profiles 114 of FIG. 1 and excluding agents whose average latency exceeds the specified maximum. The rules module 304 can enforce cost caps by estimating the computational cost of processing the task request with each candidate agent based on historical cost-per-task measurements and rejecting agent configurations whose estimated total cost exceeds a budget limit defined in the task request or in a system-wide policy. The rules module 304 can enforce regulatory restrictions by examining data classification tags within the task request and routing task requests containing data subject to geographic residency requirements exclusively to agents deployed within the required jurisdiction. The rules module 304 can enforce security classifications by matching security clearance levels associated with each agent against the sensitivity level of the task request and excluding agents that lack the clearance to access the data involved in the task.

A lightweight machine learning model 306 can form a second layer of the agent orchestration engine 302. The lightweight machine learning model 306 performs task classification by generating vector embeddings of task requests and comparing those embeddings against reference embeddings associated with predefined task type categories. The lightweight machine learning model 306 can use an encoder network that transforms the content of a task request into a fixed-dimension numerical array. The lightweight machine learning model 306 can classify the task request by measuring the distance between the task request embedding and each reference embedding and assigning the task type category whose reference embedding is closest to the task request embedding. The lightweight machine learning model 306 can perform agent scoring by retrieving performance metric values from the metadata profiles 114 of FIG. 1 and evaluating those values against the task features 206 of FIG. 2 using a ranking operation. The ranking operation can be determined based on historical data that pairs task features with agent selection outcomes, thereby enabling the lightweight machine learning model 306 to learn which combinations of agent characteristics and task characteristics lead to successful task completions. The lightweight machine learning model 306 can evaluate candidate sequences of agents and estimate the probability that each sequence will complete the task successfully based on historical performance data for similar sequences. The lightweight machine learning model 306 can operate on fixed-dimension embeddings that require a constant amount of memory and processing time regardless of the length of the input task request, therefore producing all outputs in a single forward pass through the network.

A large language model 308 can form a third layer of the agent orchestration engine 302. The large language model 308 can be applied to task requests that the rules module 304 and the lightweight machine learning model 306 cannot resolve with confidence above a certain threshold. The large language model 308 can interpret task requests by inferring the user's intent even when the request does not match predefined patterns or task type categories. In some implementations, the large language model 308 generates explanations of recommended agent configurations by producing, for example, human-readable text that describes why particular agents were selected and how the execution order was determined. These explanations support auditability and enable users to understand and verify the orchestration decisions. In some implementations, the large language model 308 simulates the execution of different agent sequences by predicting the output of each agent at each operation and evaluating whether subsequent agents would have the information they need to proceed. Because the large language model 308 typically consumes more processing resources and introduces higher latency than the rules module 304 or the lightweight machine learning model 306, the agent orchestration engine 302 can invoke the large language model 308 selectively rather than on a processing path for every task request.

Different layers can be triggered for different operations performed by the agent orchestration engine 302 based on the characteristics of each incoming task request and the confidence with which each layer can process it. In some implementations, the agent orchestration engine 302 routes all incoming task requests through the rules module 304 first to filter out requests that violate hard constraints. The agent orchestration engine 302 can pass remaining requests to the lightweight machine learning model 306 for scoring and classification. The lightweight machine learning model 306 can generate task features and agent scores and output a confidence score indicating how certain the model is about its classification and scoring decisions. The agent orchestration engine 302 can invoke the large language model 308 when the lightweight machine learning model 306 outputs a confidence score below a threshold, indicating that the model is uncertain about how to handle the request. In some implementations, the agent orchestration engine 302 selects a layer based on a task type indicator within the task request rather than processing through layers sequentially. The task type indicator can be an explicit field in the request or inferred from the source of the request.

Figure 4:
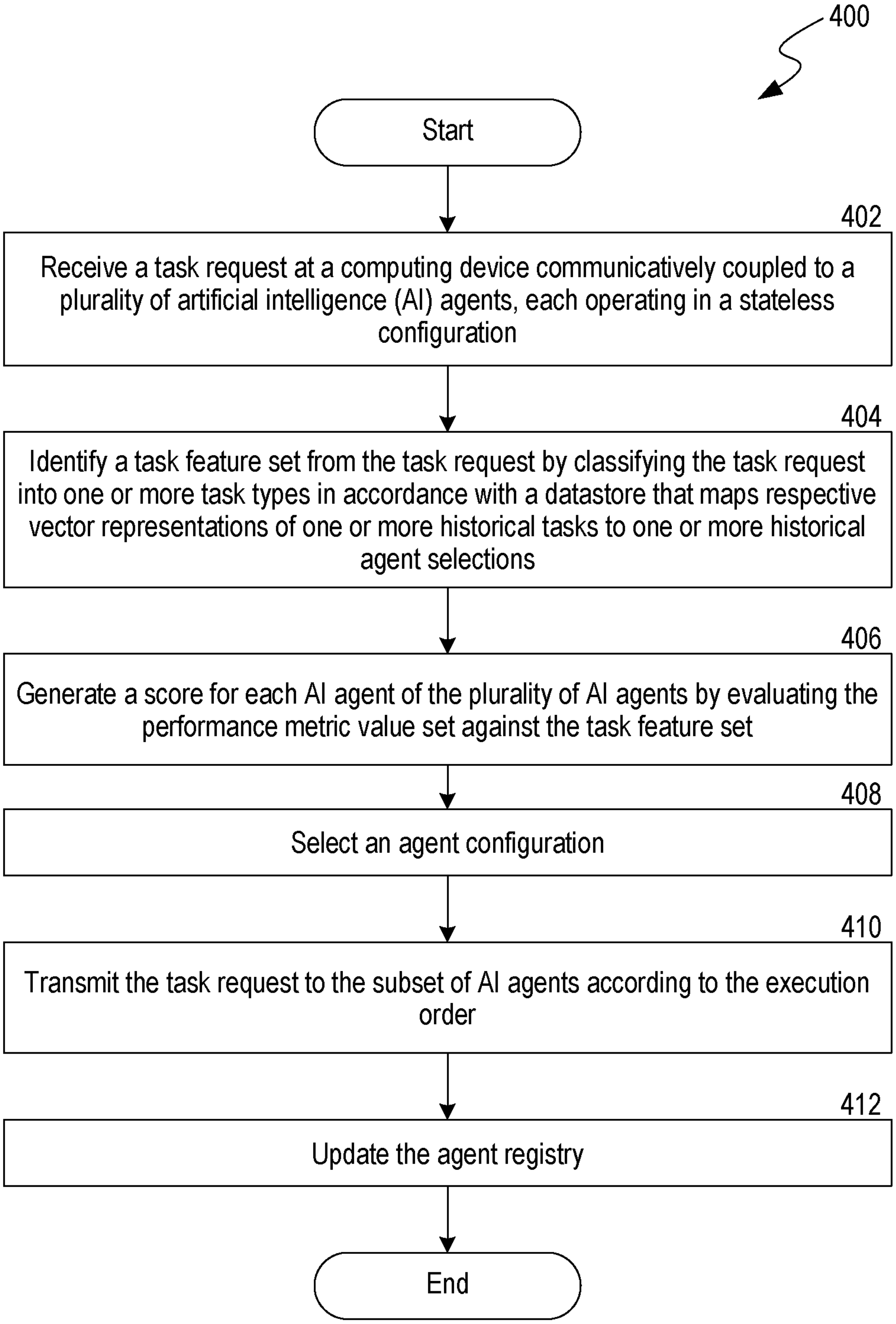
FIG. 4 is a flow diagram illustrating a process for dynamically allocating tasks across a plurality of stateless AI agents using a model orchestration platform, in accordance with some implementations of the present technology.

FIG. 4 is a flow diagram illustrating a process 400 for dynamically allocating tasks across a plurality of stateless AI agents using a model orchestration platform, in accordance with some implementations of the present technology. In some implementations, the process 400 is performed by components of example computer system 2500 illustrated and described in more detail with reference to FIG. 25. Likewise, implementations can include different and/or additional operations or can perform the operations in different orders.

In operation 402, the model orchestration platform can receive or otherwise obtain a task request at a computing device communicatively coupled to a plurality of artificial intelligence (AI) agents (e.g., autonomous, semi-autonomous), each operating in a stateless configuration. The task request can be a query submitted by a user through a client application or a structured API call generated by an automated system. The task request can include explicit parameters that specify requirements for the task, such as a maximum acceptable response time or a preferred output format. The computing device can be any of the computing devices described above with respect to FIG. 1, including mobile phones, servers, laptop computers, or edge computing devices.

Each AI agent can be registered in an agent registry configured to store a metadata profile of the AI agent, e.g., attributes describing each agent. The metadata profile can define a performance metric value set (e.g., measured metrics such as latency, success rate, cost) derived from one or more historical task executions associated with the AI agent. The metadata profile can be structured to be dynamically updated in response to a change in an operational state, i.e., availability, workload, and/or readiness, of the AI agent. This stateless design enables the model orchestration platform to reassign tasks from one agent to another without needing to transfer execution context or synchronize internal state between agents.

In some implementations, the performance metric value set includes a compliance score derived from a particular count of one or more task executions in which the AI agent satisfied one or more operative constraints relative to a total count of task executions by the AI agent, i.e., whether the agent meets regulatory or policy guidelines. The operative constraints can include data handling requirements that specify how the agent must process sensitive information, such as requirements to encrypt data in transit or to avoid storing personally identifiable information in logs. The operative constraints can include output format requirements that specify the structure and content of responses the agent generates, such as requirements to include citations for factual claims or to avoid generating content in certain prohibited categories. The compliance score can be determined using the number of task executions in which the agent satisfied all applicable operative constraints relative to the total number of task executions assigned to the agent. The model orchestration platform can use the compliance score to exclude agents with low compliance from processing task requests that are associated with regulated data or that require strict adherence to output guidelines.

The operational state can include at least one of an availability status indicating whether the AI agent is currently processing a task or a workload metric indicating a number of tasks queued for the AI agent (e.g., whether the agent is busy or ready to perform a new task). The model orchestration platform can query the availability status before assigning a new task to an agent to avoid overloading agents that are already occupied. The workload metric refers to a value representing the number of task requests that have been assigned to the agent but have not yet completed processing. The workload metric enables the model orchestration platform to distribute tasks across agents in a manner that prevents any single agent from accumulating a backlog of pending tasks. In some implementations, the operational state includes a health indicator that reflects whether the agent is experiencing degraded performance. The health indicator can be derived from periodic heartbeat signals that each agent transmits to the agent registry to confirm that the agent is responsive.

In operation 404, the model orchestration platform can identify a task feature set from the task request by classifying the task request into one or more task types in accordance with a datastore that maps respective vector representations of one or more historical tasks to one or more historical agent selections, i.e., past agent-task pairings. The model orchestration platform can query the datastore to retrieve historical tasks whose vector representations are within a similarity distance of the vector representation of the current task request. The similarity distance can be measured using cosine similarity or Euclidean distance as described above with respect to FIG. 2. The model orchestration platform can examine the task type labels associated with the retrieved historical tasks and assign those labels to the current task request. The task feature set can include additional attributes beyond the task type labels, such as a complexity indicator derived from the length or structure of the task request or a priority level extracted from metadata fields within the task request.

In some implementations, the datastore includes a graph structure having a first set of nodes representing the one or more task types and a second set of nodes representing one or more agent identifiers identifying the plurality of AI agents. Each edge of the graph structure can be connected to a first node in the first set of nodes to a second node in the second set of nodes in response to a determination that a corresponding AI agent of the second node has executed a task of a corresponding task type of the first node. The graph structure enables the model orchestration platform to traverse relationships between task types and agents by following edges from a task type node to discover which agents have historically processed tasks of that type. Each edge can store attributes such as a success rate indicating the proportion of tasks of the corresponding type that the corresponding agent completed successfully, an average latency, and so forth. The model orchestration platform can use these edge attributes when generating agent scores. In some implementations, the graph structure includes a third set of nodes representing execution outcomes to enable the model orchestration platform to query paths from task type nodes through agent nodes to outcome nodes to identify which agent configurations have historically produced successful outcomes for particular task types.

The datastore used to classify the task request can be implemented using different storage architectures. The datastore can be a vector database that stores vector embeddings of historical task requests and supports nearest-neighbor queries to retrieve historical tasks whose embeddings are closest to the embedding of the current task request. The datastore, in some implementations, is a relational database that stores historical task records in structured tables. The datastore can be a knowledge graph that links task type nodes to agent nodes and outcome nodes through directed edges, where each edge stores one or more attributes such as success rates and latency measurements derived from historical executions of the corresponding task type by the corresponding agent. The knowledge graph enables the model orchestration platform to traverse multi-hop paths from a task type node through agent nodes to outcome nodes to identify which agent configurations have historically produced successful outcomes for particular task types.

In operation 406, the model orchestration platform can generate a score for each AI agent of the plurality of AI agents by evaluating the performance metric value set against the task feature set. The model orchestration platform retrieves the metadata profile for each agent from the agent registry and extracts the performance metric values stored in the profile.

In some implementations, the model orchestration platform normalizes the performance metric values prior to applying operation 406. The model orchestration platform can apply min-max normalization, which rescales each performance metric value to a range by subtracting the minimum observed value across all agents and dividing by the difference between the maximum and minimum observed values. The model orchestration platform can apply z-score normalization, percentile normalization, and/or other normalization operations. The model orchestration platform can select the AI agent subset using various thresholding approaches applied to the normalized scores, such as an absolute threshold that selects all agents whose scores exceed a fixed value, a top-k threshold that selects the k highest-scoring agents, a dynamic threshold determined based on the score distribution for the current task request, and so forth.

The model orchestration platform can determine (e.g., estimate) a probability of successful task completion for each candidate execution path. The model orchestration platform can multiply the individual historical success rates of each agent in the path when executed in the corresponding order. The model orchestration platform can apply a dependency penalty that reduces the probability when the execution path includes agents whose outputs are coupled. In some implementations, the model orchestration platform uses a trained model, such as a logistic regression model or a gradient-boosted ranking model, that accepts the task feature set and agent metadata as input and outputs a predicted success probability.

In some implementations, the model orchestration platform prunes candidate execution paths to reduce computational resources consumed during path selection. The model orchestration platform can apply a beam search approach that maintains a fixed number of the highest-scoring candidate paths at each evaluation step and discards the remaining candidates. The model orchestration platform, in some implementations, prunes any candidate path whose upper bound on success probability falls below the probability of the best complete path found so far. The model orchestration platform can evaluate candidate paths one step at a time and, once a path exceeds a confidence threshold, commits to that path and prunes all remaining candidates.

The score can be generated using methods as described above with respect to the agent scoring module 208 of FIG. 2. The score can be generated by aggregating one or more historical success rates (e.g., proportion of tasks the agent has completed successfully over a defined time window) and one or more measured response times (e.g., average elapsed time between when the agent receives a task request and when the agent returns a response). The model orchestration platform can aggregate these values by applying weights to reflect the relative importance of success rate versus response time for the current task. The aggregation can be performed using a weighted sum where each metric value is multiplied by its corresponding weight and the products are summed to produce the final score.

Prior to generating the score for the one or more AI agents, the model orchestration platform can filter the plurality of AI agents to determine the one or more AI agents by applying one or more constraints stored in the agent registry. The one or more constraints define, for example, at least one of a maximum latency value or a maximum cost value. The filtering operation removes agents from consideration before the scoring operation to reduce the computational overhead of generating scores for agents that would ultimately be excluded due to constraint violations. In some implementations, the constraints include a minimum compliance score that excludes agents whose compliance scores fall below a threshold required for the task type.

In operation 408, the model orchestration platform can select an agent configuration by ranking (or otherwise determining) the plurality of AI agents according to respective scores of the plurality of AI agents and identifying (or otherwise determining) an AI agent subset by determining that the respective scores of the AI agent subset satisfy a threshold value. The model orchestration platform orders the agents such that an agent responsible for producing a required output executes before the agent that requires that output.

In some implementations, the model orchestration platform can determine that a task complexity value derived from the task feature set satisfies a complexity threshold. In response to the determination, the model orchestration platform can assign the task request to two or more AI agents sharing at least a portion of the respective metadata profiles. Each of the two or more AI agents can independently use the task request to generate a respective output. The model orchestration platform can aggregate the redundant outputs by selecting the output that appears most frequently across agents or by averaging numerical values across outputs to produce a consensus result.

In some implementations, determining the agent configuration includes providing the feature set and the score for the one or more agents as input to an AI model configured to output the agent subset and the execution order. The AI model is a machine learning model trained on historical data that pairs task features and agent scores with successful agent configurations. The AI model learns patterns in the historical data that indicate which combinations of agents and execution orders produce successful outcomes for tasks with particular feature combinations. During inference, the AI model accepts the task feature set and the agent scores as input and outputs a recommended agent subset along with a recommended execution order.

In some implementations, determining the agent configuration includes matching the one or more types to one or more routing rules. Each routing rule can define a type pattern indicative of a particular type and a corresponding agent identifier associated with a particular agent. Each agent of the agent subset can be associated with an agent identifier that matches at least one of the one or more types. The routing rules can be stored in a rules repository accessible by the model orchestration platform.

In operation 410, the model orchestration platform can cause transmission of the task request to the AI agent subset according to the execution order. The model orchestration platform transmits the task request to the first agent in the execution order and waits for the agent to return a response. If the execution order specifies sequential processing, the model orchestration platform transmits the response from the first agent along with one or more portions of the original task request to the second agent in the execution order. This process can continue until all agents in the execution order have processed the task. If the execution order specifies parallel processing for some or all agents, the model orchestration platform can transmit the task request to multiple agents simultaneously and collect their responses concurrently.

In operation 412, the model orchestration platform can cause update of the agent registry by obtaining an execution result set responsive to the transmitted task request and updating one or more respective performance metric value sets of one or more AI agents based on the execution result set. By updating the agent registry after each task execution, the model orchestration platform ensures that subsequent scoring and selection operations reflect updated performance data for each agent.

In some implementations, the model orchestration platform can generate a likelihood of successful task completion for each of a plurality of candidate execution paths prior to transmitting the task request. The model orchestration platform can determine the execution order by selecting a particular candidate execution path of the plurality of candidate execution paths having a probability of successful task completion that satisfies a confidence threshold.

To perform a preliminary assessment of the agent configuration, the model orchestration platform can, prior to causing transmission of the task request, generate an outcome score for the agent configuration by querying the datastore to retrieve one or more historical execution results for one or more task requests having respective vector representations within a similarity threshold of the vector representation of the task request. In response to the outcome score failing to satisfy an outcome threshold, the model orchestration platform can modify the agent configuration by adding a first AI agent or replacing a second AI agent in the AI agent subset with a third AI agent.

The model orchestration platform can evaluate a plurality of candidate execution orders for the agent subset by generating a confidence score for each candidate execution order of the plurality of candidate execution orders and prune one or more candidate execution orders in response to determining that a particular confidence score for a particular candidate execution order fails to satisfy one or more criteria. The confidence score for each candidate execution order can be generated by estimating the probability that the agents will successfully complete the task when invoked in that order. This pruning reduces the computational resources required to evaluate and select among candidate orders by eliminating low-confidence options early in the selection process.

Once task execution has begun, to detect deteriorating performance before task completion, the model orchestration platform can obtain an intermediate outcome score generated by a first AI agent in the AI agent subset during execution of an observed portion of the task request, determine that the intermediate outcome score fails to satisfy one or more performance criteria, and reroute a remaining portion of the task request to a second AI agent in the agent registry having a score that satisfies the threshold value.

The model generation platform can block or otherwise prevent failing approaches to a task execution. The model orchestration platform can detect an indicator of a deteriorating performance during execution of the task request and dynamically reallocate one or more resources to a different agent configuration prior to completion of the task request. The indicator of deteriorating performance can be an increasing response time that suggests the agent is experiencing resource contention or an increasing error rate that suggests the agent is encountering difficulties processing the task.

The model orchestration platform can receive an intermediate result from a first AI agent in the AI agent subset during execution of the task request. The model orchestration platform can determine that a value of a quality metric of the intermediate result fails to satisfy a quality threshold and, prior to completion of the task request, prevent execution by the first AI agent by reassigning the task request to a second AI agent in the plurality of AI agents.

In some implementations, the model orchestration platform can run candidate agents in parallel without exposing the output to users. The model orchestration platform can transmit the task request to a shadow agent concurrently with transmitting the task request to the AI agent subset. An output generated by the shadow agent can be stored in the datastore. The model orchestration platform can compare the output generated by the shadow agent against an output generated by the AI agent subset to update a performance metric value set of the shadow agent. The shadow agent can be an agent that the model orchestration platform is evaluating for potential inclusion in future agent configurations but that has not yet been validated for production use. By running the shadow agent in parallel with the production agents, the model orchestration platform can collect performance data on the shadow agent without risking exposure of potentially low-quality outputs to users.

Human validation scores and/or downstream impacts can be fed back to the model orchestration platform to recalibrate one or more portions of the model orchestration platform. For example, the model orchestration platform receives a feedback signal associated with an output generated by the AI agent subset. The model orchestration platform can store the feedback signal in the datastore in association with one or more of the task requests or the agent configurations and adjust one or more weights used to generate the score for each AI agent based on the feedback signal. The feedback signal can be an explicit rating provided by a user who reviewed the output, such as a thumbs-up or thumbs-down indicator, a numerical score on a scale, and so forth. The feedback signal can alternatively be an implicit indicator derived from user behavior, such as whether the user accepted the output without modification or whether the user requested a revised output. The feedback signal can be a downstream impact measurement that quantifies the effect of the output on subsequent processes, such as whether a decision made based on the output led to a desirable outcome.

Example Hub-and-spoke Architecture Used by the Model Orchestration Platform

Figure 5:
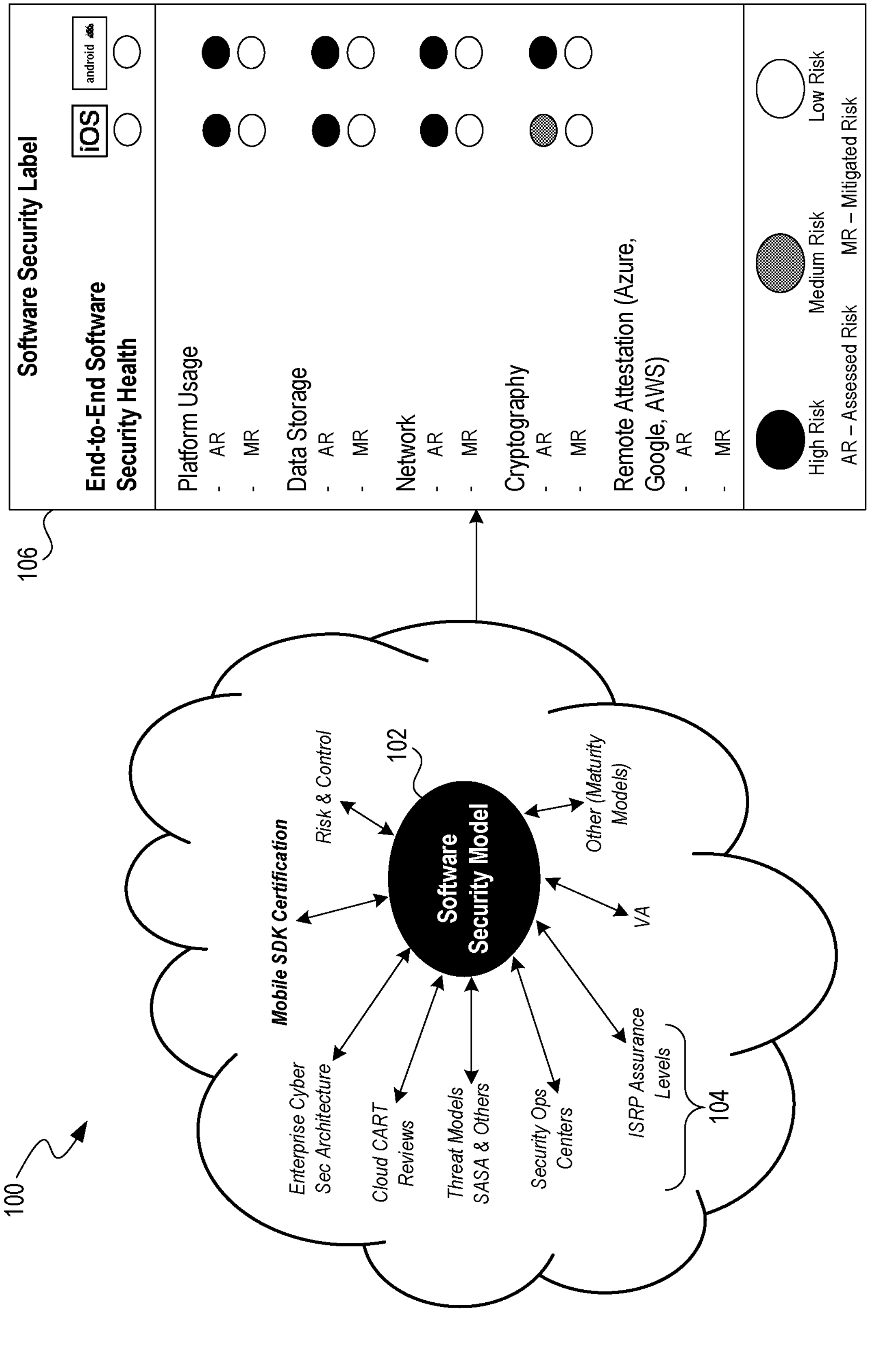
FIG. 5 is a block diagram showing an illustration of components used to determine platform-specific end-to-end security vulnerabilities and a graphical layout for displaying the platform-specific end-to-end security vulnerabilities via a Graphical User Interface (GUI), in accordance with some implementations of the present technology.

FIG. 5 is a block diagram showing an illustration of components used to determine platform-specific end-to-end security vulnerabilities and a graphical layout for displaying the platform-specific end-to-end security vulnerabilities via a Graphical User Interface (GUI). In various implementations, system 500 (e.g., the model orchestration platform) can provide a software security label 506. The software security label 506 can display information in a graphical layout that is related to end-to-end software security of a platform-specific software application. For instance, end-to-end software security of a platform-specific software application may refer to the security measures (e.g., networking security mitigation techniques, networking security protection systems, etc.), security vulnerabilities (e.g., security threats, threat vectors, etc.) or other security information of a software application being executed on or with respect to a particular platform. As a software application may be executed on a variety of platforms, where each platform uses a combination of hardware components (and software components installed on the hardware) to host/run the software application, it is advantageous to understand the security of a given software application and whether the software application is safe to use. Logical component 502 can aggregate and analyze data from data sources/sub-models (e.g., agents 504) to generate for display a software security label 506 at a graphical user interface (GUI). Logical component 502 can be one or more of: a data model, a machine learning model, a computer program, or other logical components configured for receiving, transmitting, analyzing, or aggregating application- and/or processing-related data. Logical component 502 can analyze data received from agents 504 and generate a software security label for an end-user (e.g., a user, customer, unskilled user) to convey in an easily understood format whether a software application is safe to use. In some implementations, agents 504 can be a variety of data sources. For example, agents 504 can represent data obtained from one or more third parties (e.g., third-party security entities). Such third-party data sources may represent industry trusted globally accessible knowledge databases of adversary tactics and techniques that are based on real-world observations of security threats of various platforms and computer software. In some implementations, agents 504 can also be one or more machine learning models, deep-learning models, computing algorithms, or other data models configured to output security-related information of a platform and/or computer software. Logical component 502 can analyze data received by agents 504 to generate a graphical representation of end-to-end software security health such that an end-user (or alternatively, a software developer) can easily understand the safety of a software application being executed on a given platform.

FIGS. 6A and 6B illustrate example graphical labels according to some implementations. The label shown in FIG. 6A compares various data sources across various assessment domains. In FIG. 6A, the assessment domains include applicability (e.g., how applicable is a dataset to the problem being addressed), reliability (e.g., a measure of errors in the dataset), completeness (e.g., a measure of how much data is missing in the dataset, such as how many properties are not included in a property dataset), freshness (e.g., a measure of how current the dataset is). These are merely examples, and in practice there can be more, fewer, and/or different assessment domains. In FIGS. 6A and 6B, an overall score is shown, based on the scores for each assessment domain, although an overall score is not necessary. In FIGS. 6A and 6B, scores are assigned as high, medium, or low. However, it will be appreciated that other scoring approaches can be used. For example, numerical or letter grade scores are used in some implementations.

While FIG. 6A shows a label for comparing various data sources, FIG. 6B shows a label for assessing various agents. The same concept can be applied to artificial intelligence models more generally or to any other program, script, or the like. In FIG. 6B, agents are assessed across various domains including applicability, reliability, resiliency, and cost. Applicability can be a gauge of how well a model is suited to the particular task or problem space. Reliability can be an indication of how reliable the outputs of an agent or model are, for example, how often the agent takes actions that are consistent, correct, or both. Resiliency can be a measure of how an agent handles aberrant or missing data. For example, some agents may be able to operate effectively even when some errant data is input, while other agents may fail or produce erroneous outputs. Cost can be a measure of the computational demands associated with different agents. For example, a more complex agent can have greater computational demands and may cost more to run. In some cases, agents, models, or the like may be run by one or more third party services that charge based on usage, and such costs can be reflected in the cost assessment domain score.

Figure 7:
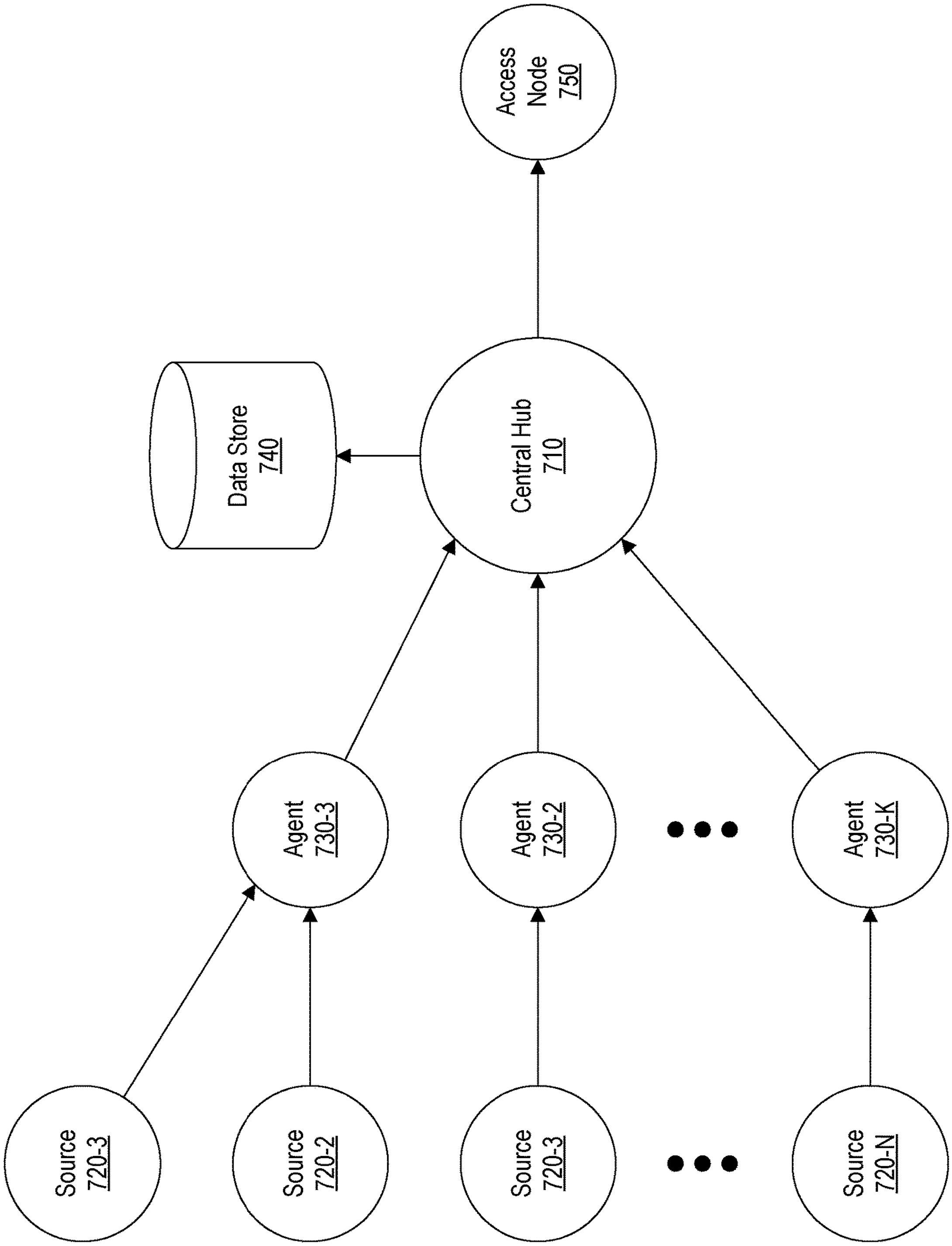
FIG. 7 is a diagram that schematically illustrates a hub and spoke system, in accordance with some implementations of the present technology.

FIG. 7 is a diagram that schematically illustrates a hub and spoke system according to some implementations described herein. A central hub 710 can act as a repository for information received from a variety of sources 720-1-720-N (generally, sources 720). In FIG. 7, four sources are illustrated. However, it will be appreciated that, in general, N can be any positive integer. Agents 730-1-730-N (generally, agents 730 or individually, agent 730), where N is again any positive integer, can access data in the sources 720. The agents 730 can submit information to the hub 710, which can store the information in a centralized repository or set of repositories. In some implementations, an agent can access data in the hub 710 and provide the data to a source or to any other system with access to the hub 710. In some implementations, an access node 750 can access information stored in the hub 710 but does not write data or otherwise cause data to be written into the hub 710. That is, the access node 750 can be a pure consumer of data. A source 720 can be a pure provider of data to the hub or can be mixed, both providing to the hub 710 and accessing data stored in the hub, either directly or indirectly, such as through an agent 730.

Figure 8:
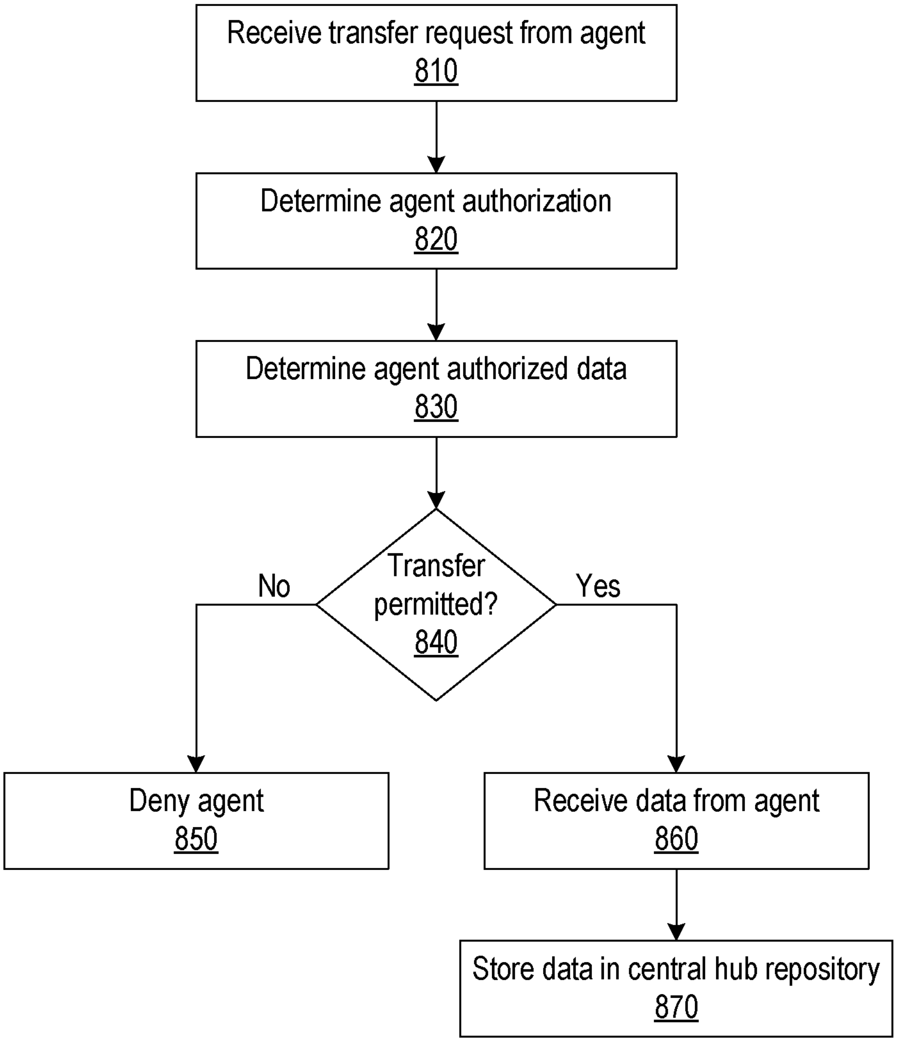
FIG. 8 is a block diagram of a flowchart for storing data in a central hub, in accordance with some implementations of the present technology.

FIG. 8 is a block diagram of a flowchart for storing data in a central hub according to some implementations. At operation 810 the hub can receive a transfer request from an agent. The transfer request can include information about the agent (e.g., an identifier of the agent, an API key used by the agent, a credential used by the agent, etc.). At operation 820, the hub can determine an authorization of the agent, for example by checking the agent's identifier, API key, username, password, etc., against information about known agents. At operation 830, the hub can determine data the agent is permitted to transfer to the hub. For example, an agent may be permitted to transfer data from specific sources, in specific formats, etc., but not from other sources, in other formats, and so forth.

At operation 840, the hub can determine if the transfer is permitted, for example based on the determined agent authorization and the determined authorized transfer permissions. For example, the hub can compare the type of data the agent is trying to transfer to the type(s) of data the agent is allowed to transfer. For example, a transfer can be denied if an agent authorized to transfer web pages attempts to transfer executable code. If the transfer is not permitted, the hub can deny the agent's request at operation 850. In some implementations, the hub simply drops the request. In some implementations, the hub notifies the agent that the request was denied, which can aid in troubleshooting. In some implementations, the hub can block future attempts by the agent to transfer data to the hub. For example, if the hub determines that the agent shows signs of being hijacked or malfunctioning, the hub can block the agent to prevent potential impacts on the quality of the data stored in the hub or the availability of the hub.

If, at operation 840, the hub determines that the transfer is permitted, the hub can receive the data from the agent at operation 860 and store the data in a repository of the hub at operation 870.

Figure 9:
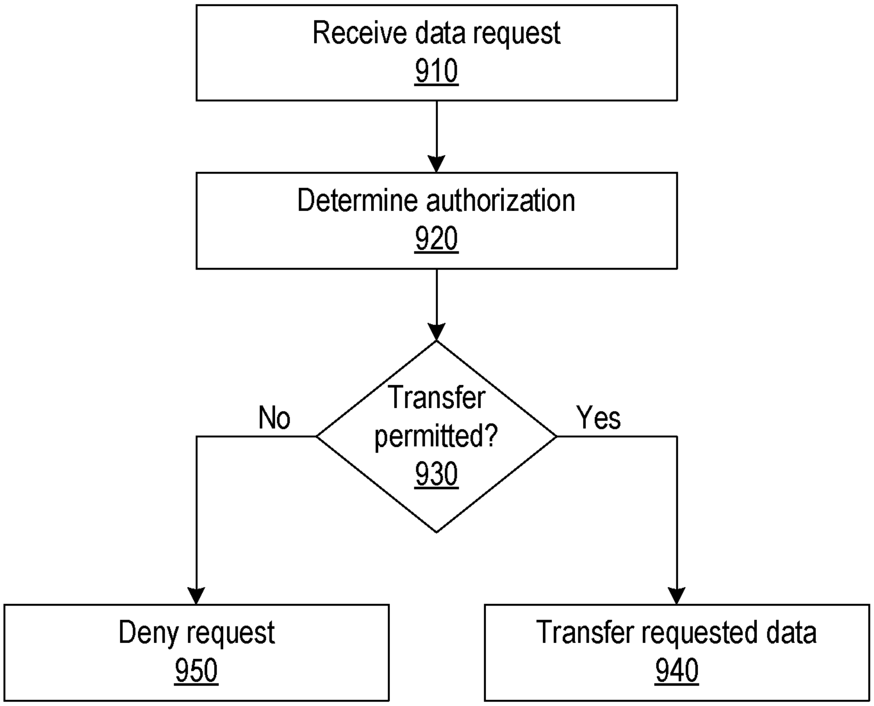
FIG. 9 is a block diagram of a flowchart for transferring data from a hub according to some implementations, in accordance with some implementations of the present technology.

FIG. 9 is a block diagram of a flowchart for transferring data from a hub according to some implementations. At operation 910, the hub can receive a data request for data stored in the hub. At operation 920, the model orchestration platform can determine authorization, for example based on an identifier, API key, etc., provided by the requestor. At operation 930, the hub can determine if the transfer is permitted, for example based on the determined authorization. If so, the hub can transfer the data to the requestor at operation 940 if the data exists. If the data does not exist, the hub can alternatively send a notification or error message to the requestor indicating that the data is not available.

If the transfer is not permitted at operation 930, the model orchestration platform can deny the request at operation 950. In some implementations, the hub provides a notification or error message to the requestor. This can indicate, for example, that the requestor lacks sufficient permissions.

Figure 10:
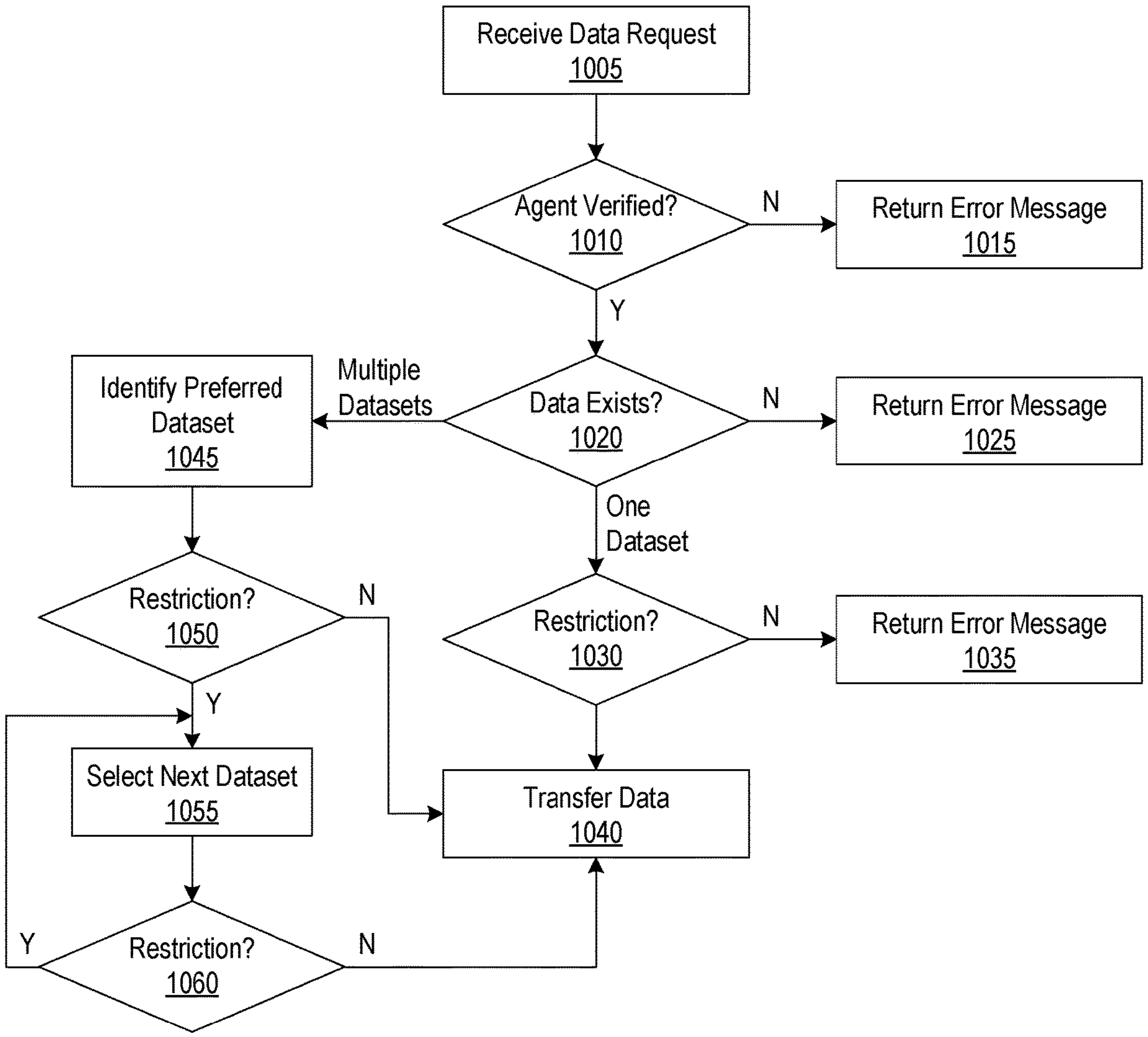
FIG. 10 is a block diagram of a flowchart for transferring data from a hub in response to a request from an agent, in accordance with some implementations of the present technology.

FIG. 10 is a block diagram of a flowchart from transferring data from a hub in response to a request from an agent according to some implementations. At operation 1005, the hub can receive a data request from an agent. At operation 1010, the hub can determine if the agent is verified and authorized to receive the requested data. If not, the hub can return an error message at operation 1015. The error message can be specific (e.g., informing the agent that it could not be verified) or can be more generic (e.g., a generic error indicating that the request could not be fulfilled). A more generic message can make it more difficult for an attacker or unauthorized user to figure out why their requests are failing, but can also make it more difficult to troubleshoot issues with fulfilling requests from legitimate agents.

At operation 1020, the hub can determine if the requested data exists. If not, the hub can return an error message to the agent at operation 1025. If the data exists one dataset, the hub can determine if the dataset is restricted at operation 1030. For example, a dataset may be restricted because the only certain agents can access it, because the dataset is deemed to have expired in general, because the dataset can't be used due specific business rule restrictions, etc. If the dataset is restricted, the hub can return an error message at operation 1035. If not, the hub can transfer the data at operation 1040.

If, at operation 1020, there are multiple datasets, the hub can identify a preferred dataset. For example, a preferred dataset can be selected based on the agent that provided the dataset, an age of the dataset, etc. At operation 1050, the hub can determine if there are any restrictions on the preferred dataset. If not, the hub can transfer the data at operation 1040. If there is a restriction on the preferred dataset, the hub can select the next dataset at operation 1055. At operation 1060, the hub can evaluate the next dataset and determine if there is a restriction. If not, the hub can transfer the next dataset at operation 1040. If so, the hub can select another dataset of operation 1055. The process can continue until a dataset without a restriction is identified or until all datasets are exhausted, in which case an error message can be return by the hub.

In some implementations, the data transfer at operation 1040 includes only the requested data. In some implementations, additional information is included, such as expiration date, source, agent that provided the data, confidence level associated with the data, and so forth.

Using an LLM to Route Agents Via the Model Orchestration Platform

Figure 11:
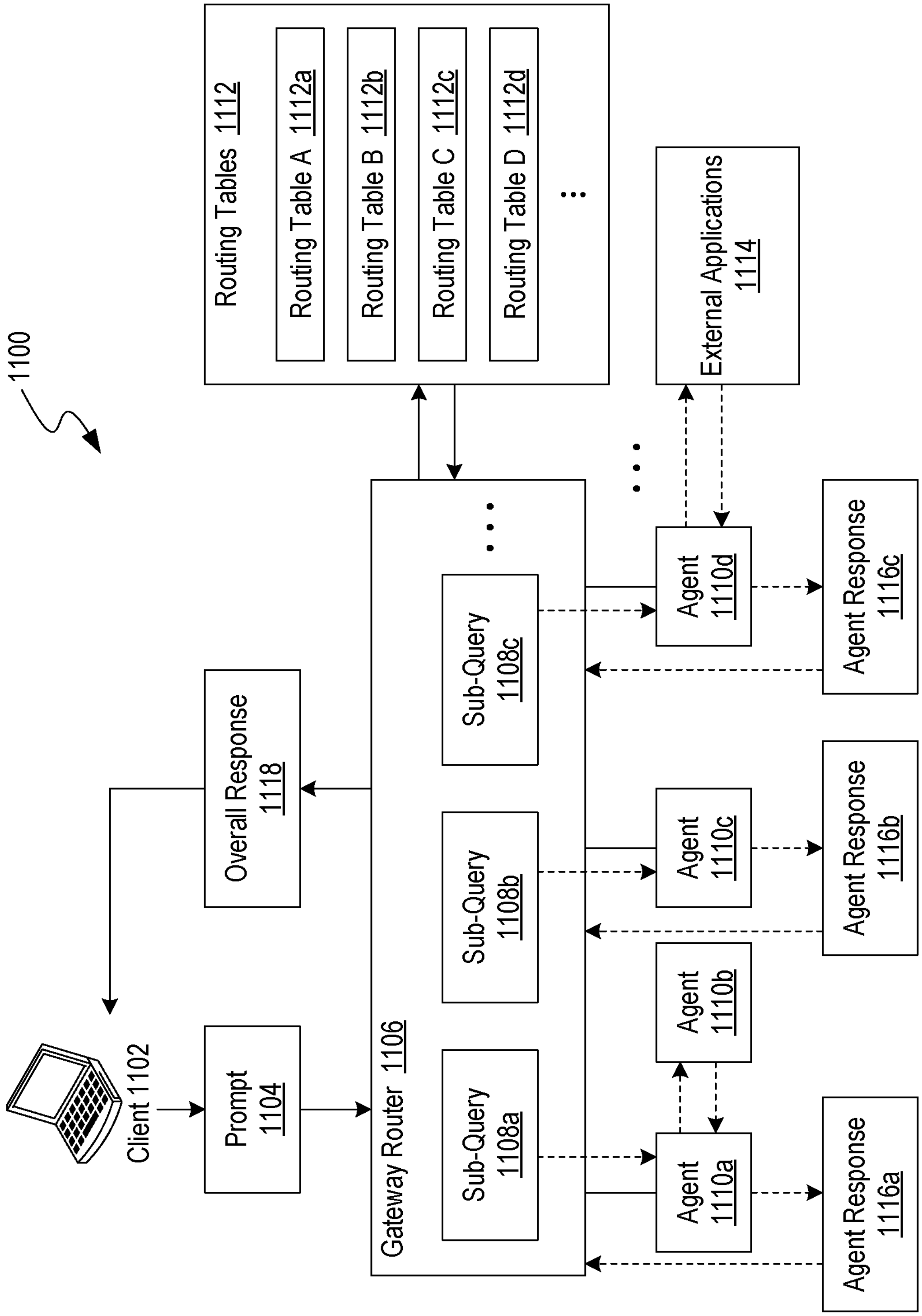
FIG. 11 shows a schematic illustrating an example environment of orchestrating semi-autonomous or autonomous agents, in accordance with some implementations of the present technology.

FIG. 11 shows a schematic illustrating an example environment 1100 of orchestrating semi-autonomous or autonomous agents, in accordance with some implementations of the present technology. The environment 1100 is implemented using components of example computer system 2500 illustrated and described in more detail with reference to FIG. 25. Implementations of example environment 1100 can include different and/or additional components or can be connected in different ways.

The environment 1100 includes a client 1102, which may be any electronic device provisioned with digital computation and communication capability, such as a laptop, workstation, server endpoint, mobile processor, or embedded system, capable of generating, encoding, and transmitting semantically structured input data (e.g., prompts, search queries, command tokens) to the gateway router 1106. The client 1102 can be a personal computer, mobile device, or any other suitable computing device such as those with a user interface.

The gateway router 1106 refers to an orchestration endpoint of the environment 1100 that receives the prompt 1104 from the client 1102 and manages the distribution of processing tasks across multiple semi-autonomous or autonomous agents. The gateway router 1106 can operate as a routing node and be implemented as a computer program executable on one or more processors of the client 1102 or a different computing device. The gateway router 1106 may, in some implementations, include a monolithic LLM. In some implementations, the gateway router can include a federated suite of models where each model can be specialized for different tasks (e.g., prompt segmentation, domain inference, agent selection) and the suite can operate under a meta-controller (potentially itself, an LLM, or other system) that arbitrates inter-model decisioning and delegates segmented tasks to the agent network. The gateway router 1106 can include an active ensemble configuration, in which diverse models (e.g., transformer-based models, symbolic reasoners, reinforcement learning agents) run in coordinated or competitive execution, with routing decisions produced through model fusion and aggregation methods (e.g., MoE or majority/consensus voting).

In each case, the gateway router 1106 partitions, segments, or otherwise decomposes the received prompt 1104 into sub-queries 1108 (e.g., a first sub-query 1108*a*, a second sub-query 1108*b*, a third sub-query 1108*c*, and so forth). The sub-queries 1108 each refer to a computational action unit that includes instructions such as data retrieval requests, each annotated with an output parameter set that can specify a user type (e.g., access-level), temporal context (timestamp), requested output modality (text, vector, file), performance requirements, system resource thresholds, and so forth.

The environment 1100 includes multiple semi-autonomous or autonomous agents 1110 (a first agent 1110*a*, a second agent 1110*b*, a third agent 1110*c*, a fourth agent 1110*d*, and so forth) that process the sub-queries 1108 and generate agent responses 1116 (e.g., a first agent response 1116*a*, a second agent response 1116*b*, a third agent response 1116*c*, and so forth). The agents 1110 refer to a persistent software entity that can be characterized by a digitally encoded objective function (e.g., maximization of task accuracy, minimization of resource usage, compliance with specified policy constraints). The instantiation of the objective function can be static (e.g., assigned at deployment) or dynamic, enabling runtime adaptation of the objective function in response to changes in environmental signals (such as resource state, input task complexity, geopolitical events, market data, user context, and the like). The agents 1110 are enabled to receive unstructured, semi-structured, or structured environmental signals (e.g., prompt metadata, resource availability, inter-agent messages, contextual signals received from the gateway router 1106), and use the environmental signals to autonomously trigger and manage actions such as application programming interface (API) invocations, outbound network requests, updates to internal or external datastores, and so forth.

The agents 1110 can be structured as a network and/or a "constellation" of agents. For example, the agents 1110 can be interconnected such that each agent operates as an autonomous or semi-autonomous node enabled to perform direct peer-to-peer interactions and/or hierarchical delegation. For example, a general agent can perform query parsing and context recognition, but subsequently route specialized sub-tasks to sub-agents with subject matter expertise (SMEs) (e.g., trained on a domain-specific dataset) in specific domains such as legal compliance, financial analysis, and so forth. Therefore, either the orchestrator agent can initially invoke only the general agent, which then further delegates sub-tasks, or the orchestrator agent can choose to directly identify and route work to the specialized sub-agent. For instance, in a financial services context, the gateway router can divide a trading query into segments for agents handling treasuries, equities, and derivatives, and then aggregate the results to produce an overall response.

The actions autonomously executed by the agents 1110 can be responsive to a respective objective function of the agent. For example, an agent's objective function may direct it to maximize retrieval accuracy from a specific database, minimize task completion latency, or balance multiple criteria based on predefined weights. During autonomous execution, the agent 1110 can determine a degree of expected utility of candidate actions by evaluating them against the agent's objective function and select executable actions that align with the agent's assigned objectives within any imposed operational constraints or boundaries set by the gateway router 1106.

The agents 1110 can vary in architecture. For example, the first agent 1110*a* refers to a primary agent that receives sub-queries directly from the gateway router 1106, and is enabled to autonomously communicate with the second agent 1110*b* (e.g., spawn secondary sub-tasks or transfer execution context to other agents), which is not directly connected to the gateway router 1106. The inter-agent communication enables collaborative problem-solving and knowledge sharing between different agents without direct orchestration from the gateway router 1106. In another example, the third agent 1110*c* refers to a directly connected agent that interfaces directly with the gateway router 1106 for processing sub-queries. In yet another example, the fourth agent 1110*d* refers to an agent enabled to autonomously connect to external applications 1114, for example, via application programming interfaces (APIs) or other integration methods, to gather additional information or perform specific tasks to generate the third agent response 1116*c*.

In some implementations, the gateway router 1106 uses routing tables 1112 to determine a candidate agent or combination of candidate agents to route the sub-query to. The routing tables 1112 refer to data structures that store information associated with one or more respective agents 1110, such as agent capabilities, knowledge bases connected to the agent, compliance status with certain guidelines (e.g., compliance with the EU AI Act, compliance with organizational guidelines), resources used by the agent, current workload, historical performance metrics, and so forth. The routing tables 1112 can include multiple individual routing tables (such as a first routing table 1112*a*, a second routing table 1112*b*, a third routing table 1112*c*, a fourth routing table 1112*d*, and so forth) corresponding to different agents or agent types. Each routing table can include or otherwise indicate mappings between sub-query characteristics and agent capabilities, thereby enabling the gateway router 1106 to use the information within the routing table when routing the sub-queries. The routing tables 1112 can be dynamically updated based on agent performance and/or system feedback.

The fourth agent 1110*d* in FIG. 11 communicatively connects with one or more external applications 1114. The external applications 1114 refer to third-party software systems, databases, or services that can be accessed by the agents 1110 to supplement their knowledge base or operations. These external applications 1114 can include data sources, computational tools, domain-specific APIs, and so forth.

Each agent generates an agent response 1116 (e.g., the first agent response 1116*a*, the second agent response 1116*b*, the third agent response 1116*c*, and so forth) based on the assigned sub-query 1108. The agent responses 1116 refer to unstructured, semi-structured, or structured output data that includes or otherwise indicates the results of a respective agent responsive to the assigned sub-query 1108. The agent responses 1116 can include text, structured data, or references to external resources. For instance, the agent responses 1116 may include natural language text (such as summaries or explanations), structured outputs like JSON or XML objects, tabular data, executable scripts, or uniform resource identifiers (URIs) referencing files or computational results stored elsewhere. The agent responses 1116 can include pointers to large datasets or content retrieved via external APIs (e.g., the external applications 1114).

The gateway router 1106 is enabled to receive or otherwise obtain these individual agent responses 1116 and synthesize the agent responses 1116 into an overall response 1118. The gateway router 1106 can, for example, concatenate or merge the agent responses 1116. In some implementations, the gateway router 1106 combines overlapping results, filters redundancies, resolves conflicts based on agent confidence scores or reliability metrics, and so forth. The gateway router 1106, in some implementations, uses majority voting to aggregate the agent responses 1116 when multiple agents provide alternative answers to the same logical sub-task. The gateway router 1106, in some implementations, weighs or re-prioritizes agent responses in response to known user preferences, system policies, or observed trustworthiness (e.g., via an assigned reputation score) of specific agent/application pairs. Further methods of aggregating the agent responses 1116 are discussed in detail with reference to FIG. 16. The overall response 1118 can be transmitted back to the client 1102 (e.g., via the gateway router 1106) for presentation to the user.

Figure 12:
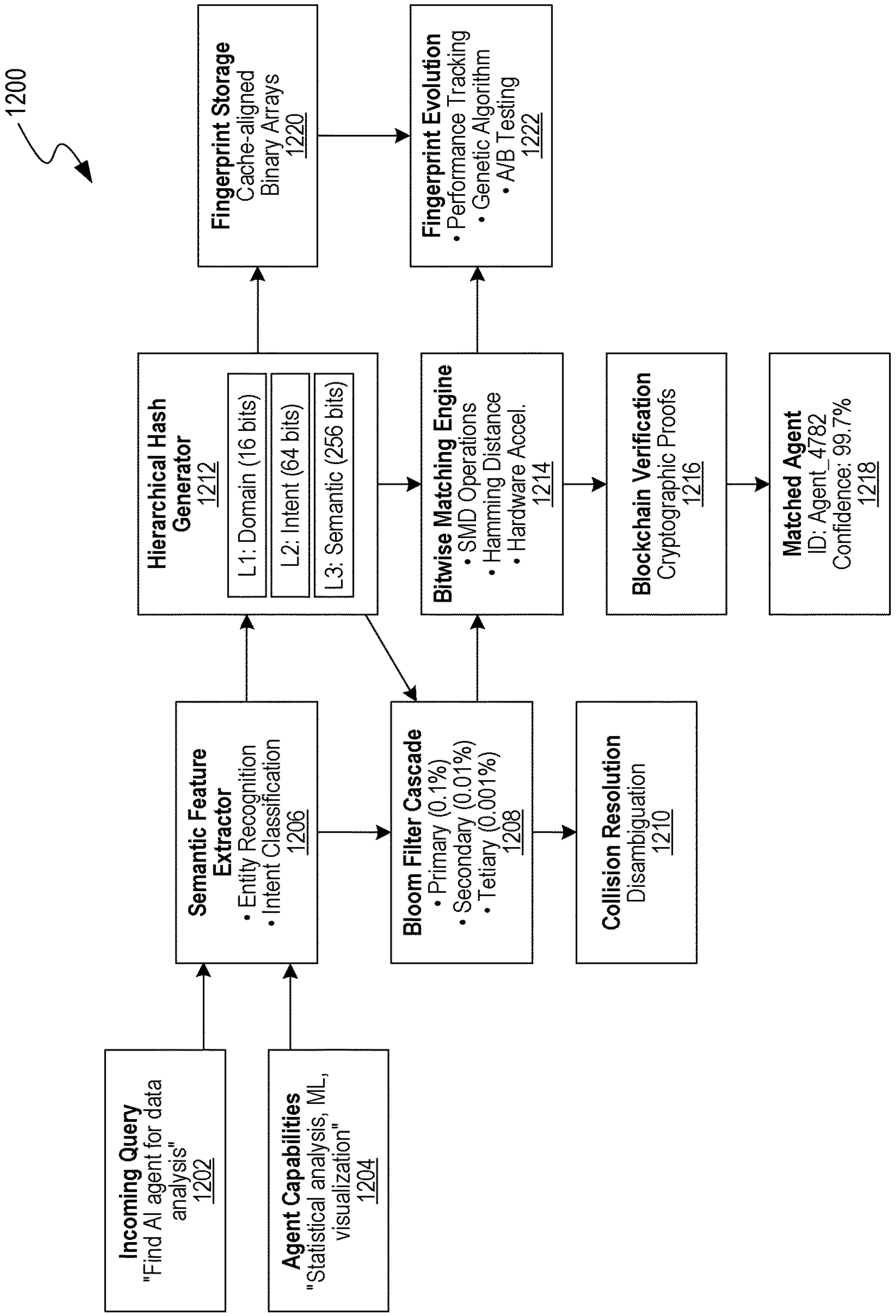
FIG. 12 shows a schematic illustrating an example architecture implementing a semantic fingerprinting framework for agent routing, in accordance with some implementations of the present technology.

Hierarchical Model Cascade Architecture Used by the Model Orchestration Platform FIG. 12 shows a schematic illustrating an example architecture 1200 implementing a semantic fingerprinting framework for agent routing, in accordance with some implementations of the present technology. The architecture 1200 is implemented using one or more computing systems, such as example computer system 2500 illustrated and described in more detail with reference to FIG. 25. Implementations of example architecture 1200 can be carried out on multiple such devices (e.g., connected through a network) connected in various ways. The components included in the architecture 1200 can be configured based on deployment requirements for a specific deployment and/or system implementing the architecture 1200.

The architecture 1200 can receive a query 1202. The query 1202 can be received by a user interface, which can be implemented on the client 1102 of FIG. 11, and can be received through API endpoints (e.g., for message queues). The query 1202 can be a natural language query (or input, request, command) requesting generation of an output using one or more AI agents. The architecture 1200 can be connected to multiple downstream AI agents (e.g., via a network connection, API interface), such as the AI agents 1110 in FIG. 11. Each AI agent can have a specific task or focus, such as managing inventory, making purchases, or providing customer service. The architecture 1200 can be configured to route the query 1202 to a set of one or more downstream AI agents that are chosen from multiple AI agents. The AI agents can be chosen such that the agents are capable of addressing the query (e.g., generating a response and/or performing an action according to a request of the query) and generating an output.

The architecture 1200 can receive a description 1204 of AI agent capabilities. For example, the description 1204 of the capabilities of a particular AI agent can include a natural language description of specific computer-executable tasks the agent is configured to perform (e.g., a computer-executable operation set configured to be executed on a software application set), privileged data the agent can access, systems or databases that the agent has access to, the domain or focus of the agent, and the like.

The semantic feature extractor 1206 processes input (such as the query 1202 and/or an agent capability description 1204) and extracts semantic features. Extracting semantic features can include implementing language processing techniques, such as tokenization, keyword identification, intent classification, or domain identification. This can include ontological techniques such as named entity recognition. Extracting semantic features can include determining (e.g., computing) metadata associated with the input, such as a complexity assessment (e.g., if the input has multiple domains, multiple intents, or multiple requested actions), or detecting one or more agent capabilities required to address a query input. Computing the semantic features can include using a language model, such as an LLM or small language model (SLM). The semantic features can be in the form of one or more feature vectors. The semantic features can be combined into a semantic feature set. In some implementations, generating the semantic feature set includes generating the semantic feature set from the input by applying a neural network-based embedding model (e.g., a language model) to tokens generated from the input.

The hierarchical hash generator 1212 can perform a fingerprinting operation to generate a fingerprint for each input. The fingerprint can be a binary representation (e.g., a binary vector) that reflects characteristics of the input, such as a domain, intent, and/or semantic content. The fingerprint can be generated by using a plurality of hierarchical hash levels. As described in more detail with respect to FIG. 13, each hierarchical hash level can apply one or more hash functions to a dimension of the input semantic feature set. The dimensions can include semantic categories, such as intent, domain, intended tasks, query complexity, data privilege level and security, and the like. Outputs from higher levels of the hierarchical hash generator 1212 can be longer and encode more detailed information that the output from lower levels. The hierarchical hash levels can implement locality-sensitive hash (LSH) functions so that semantically similar semantic feature sets will have similar hashes. Examples of LSH functions include MinHash (e.g., for determining set similarity), SimHash (e.g., for determining cosine similarity), and random hyperplane projection. In some implementations, feature-weighted hashing is implemented, in which certain members of the semantic feature set influence the final hash value more than other members.

The fingerprint storage 1220 can store agent fingerprints. The fingerprint storage 1220 can implement memory optimizations, such as cache-aligned storage, to improve the efficiency of operations involving loading and comparing agent fingerprints.

A bloom filter cascade module 1208 can implement a hierarchical bloom filter cascade to identify a set of agent fingerprints that are most similar to the query fingerprint. As described in more detail with respect to FIG. 14, the bloom filter cascade module 1208 can be used to probabilistically determine equality (and/or inequality) between the query fingerprint and one or more agent fingerprints. The bloom filter cascade module 1208 can implement one or more bloom filter levels. Each bloom filter level can use a plurality of hash functions to generate bitstrings from each fingerprint. If the bitstring corresponding to an agent fingerprint is identical to the bitstring corresponding to the query fingerprint, then the agent fingerprint passes the bloom filter level and is processed by a subsequent bloom filter level. The bloom filter levels can be arranged hierarchically, such that higher levels produce longer bitstring outputs and encode more detailed information than lower levels. The agent fingerprints that pass all bloom filter levels can be directly compared to the query fingerprint. For example, a Hamming distance can be computed between each agent fingerprint that passes all bloom filter levels. The architecture 1200 can use the Hamming distances to determine a routing path for the query 1202 (e.g., a list of one or more AI agents to process the query 1202).

A collision resolution module 1210 can resolve fingerprint collisions. A fingerprint collision describes the scenario when two distinct AI agents are assigned the same fingerprint by the semantic fingerprinting framework (e.g., by the hierarchical hash generator 1212). Fingerprint collisions can decrease the efficiency of the semantic fingerprinting framework by causing false positives (e.g., agents that would be a poor match for a particular query 1202, but have the same fingerprint as an agent that is a good match) to not be excluded from earlier levels of the bloom filter cascade, and can lead to the query 1202 being processed by agents that are not equipped to address the query 1202. The collision resolution module 1210 can resolve a fingerprint collision by using additional hash functions and/or additional agent data to determine an agent to include in the routing path for processing the query 1202.

The fingerprint evolution module 1222 can use feedback data (e.g., user feedback, agent success rates) to improve the fingerprinting operation. The fingerprint evolution module 1222 can modify parameters of the fingerprinting operation (e.g., parameters of the hierarchical hash generator 1212) to generate new fingerprinting operations. The fingerprint evolution module 1222 can receive and/or monitor metrics such as routing success rate, system performance (e.g., latency, system load), and/or fingerprint collision rate, to evaluate the advantages of different fingerprinting operations.

The blockchain manager 1216 can integrate the architecture 1200 with distributed ledger technology to generate audit trails for the processing of the query 1202 through the architecture 1200 and to implement audit verification using the blockchain. The blockchain manager 1216 can generate a cryptographic attestation of the query 1202, which can include a timestamp, hash functions and/or parameters, generated routing paths, and/or one or more characteristics of the query 1202 (e.g., length, complexity, intent, domain). The blockchain manager 1216 can format the attestations for storage in a distributed ledger and/or blockchain, and can manage on-chain transaction submissions.

Figure 13:
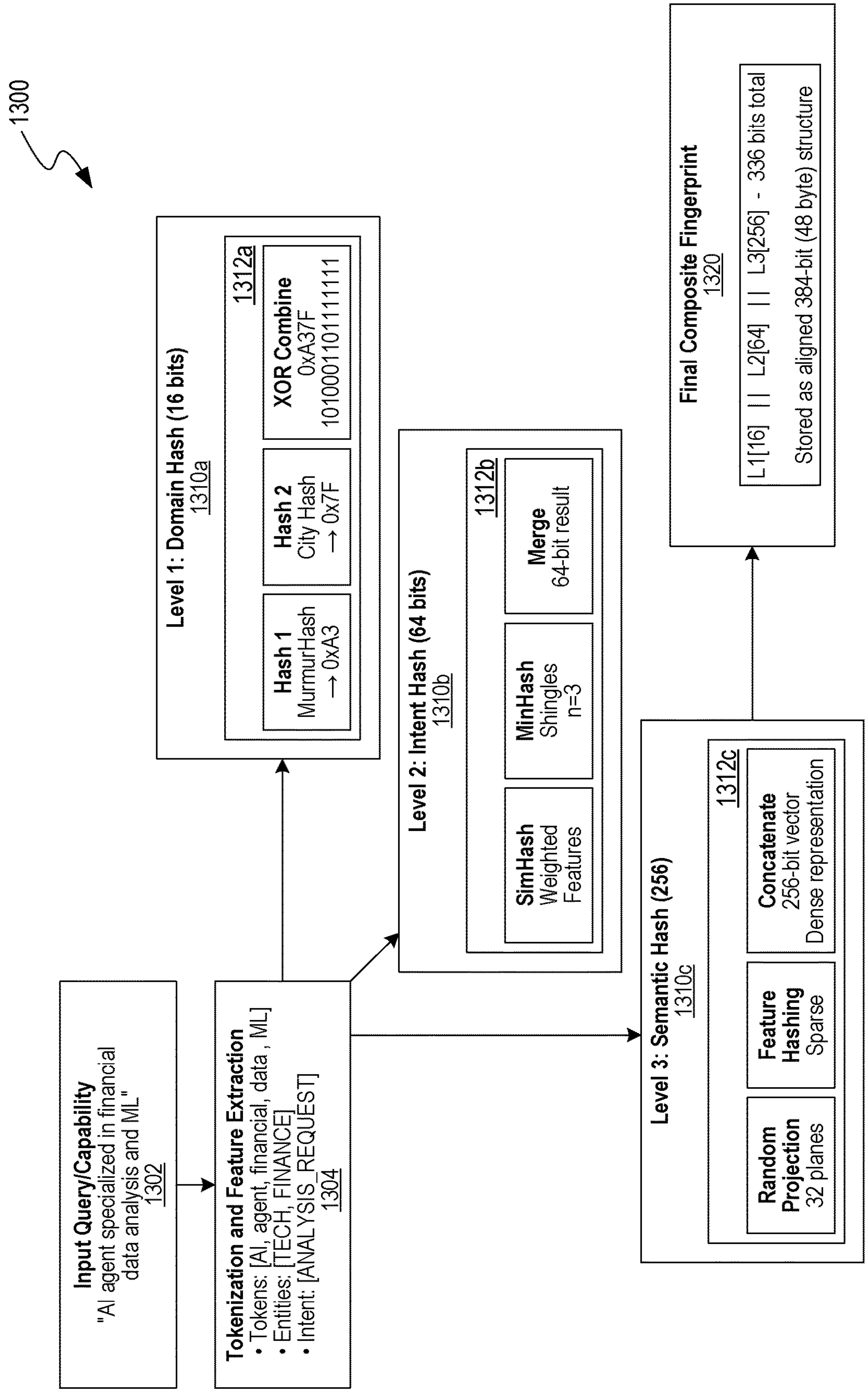
FIG. 13 shows a schematic illustrating an example architecture implementing a hierarchical fingerprint generation process for agent routing, in accordance with some implementations of the present technology.

Hierarchical Fingerprint Generation Performed by the Model Orchestration Platform FIG. 13 shows a schematic illustrating an example architecture 1300 implementing a hierarchical fingerprint generation process for agent routing, in accordance with some implementations of the present technology. The architecture 1300 is implemented using one or more computing systems, such as example computer system 2500 illustrated and described in more detail with reference to FIG. 25. Implementations of example architecture 1300 can be carried out on multiple such devices (e.g., connected through a network) connected in various ways. The components included in the architecture 1300 can be configured based on deployment requirements for a specific deployment and/or system implementing the architecture 1300.

The architecture 1300 receives an input 1302. The input can be a query that is requesting output generated by a set of agents, or a description of the capabilities of an agent. The architecture 1300 is configured to create a fingerprint for each input that is a fixed-length hash reflecting semantic content of the input. That is, inputs that are semantically similar (e.g., having the same domain, intent, described tasks) will have similar fingerprints. Similarity between fingerprints can be defined in terms of a Hamming distance (e.g., the number of bits that are different between the fingerprints when represented as a binary vector and/or bitstring). The architecture 1300 is configured to apply the same fingerprinting operation to the query and agent capabilities, so that agent capabilities with similar semantic content to a particular query will have a fingerprint that is similar to the fingerprint of the particular query.

The preprocessing module 1304 processes the input 1302 to generate a representation of the input 1302. The representation of the input 1302 can include a set of semantic features, such as an intent, a domain, a task, and/or one or more feature vectors. Processing the input 1302 can include generating intermediate representations of the input 1302, such as a list of tokens and/or one or more feature vectors, and can include creating characterizations of the input, such as identifying an intent or domain, and/or extracting key words. The key words can correspond to entities in a domain-specific ontology. In some implementations, the preprocessing module 1304 includes neural network-based encoder, such as an AI model, LLM, or SLM. In some implementations, the preprocessing module 1304 creates a different representation of the input 1302 for each level of the hierarchical fingerprint generation process.

The hierarchical fingerprint generation process includes a first level 1310*a*, a second level 1310*b*, and a third level 1310*c*. The levels 1310 can apply one or more hash functions to input data (e.g., a representation of the input 1302, a semantic feature set generated form the input 1302). The levels 1310 are arranged hierarchically, with higher levels 1310 generating a longer output hash than lower levels 1310, and encoding more detailed, comprehensive, and/or abstract information and/or meaning than lower levels 1310. In some implementations the hierarchical fingerprint generation process includes additional levels and/or alternate levels with a different focus and/or intent than the levels 1310 described with respect to the architecture 1300.

Each level 1310 can include applying one or more locality-sensitive hash (LSH) functions. Examples include MurmurHash, CityHash, SimHash, MinHash, and random plane projection. Each LSH function can return a hash output of a specific number of bits, where the number of bits depends on the level 1310 and/or the particular implementation.

In some implementations, a level 1310 uses multiple LSH functions to create multiple partial hashes (e.g., an output set) that are merged into a final level hash 1312. For example, the first level 1310 a can use a MurmurHash to generate an 8-bit first partial hash, use a CityHash to generate an 8-bit second partial hash, and merge the first and second partial hashes by concatenating the second partial hash to the end of the first partial hash to generate a 16-bit final hash. In another example, the second level 1310*b* can use a SimHash to generate a 64-bit first partial hash, use a MinHash to generate a 64-bit second partial hash, and merge the first and second partial hashes by applying a bitwise XOR operation to the first and second partial hashes to generate a 64-bit final hash. In some implementations, a level 1310 uses three hashes to make three partial hashes that are merged into a single hash. For example, a first partial hash can be used as a bitwise selector between a second and third partial hash to generate a final hash. Alternatively, or additionally, multiple hashes can be combined using a bitwise XOR operation. In some implementations, each level 1310 has an independent number of partial hashes that are merged using any combination of the operations described above.

In some implementations, a level 1310 processes input data (e.g., a semantic feature set) and generates an output set. For example, the level 1310 can apply a hash function to a plurality of elements of a semantic feature set to generate an output set, or can apply a plurality of hash functions to one or more elements of the semantic feature set to generate the output set. The elements of the output set can be aggregated (e.g., merged, concatenated) to create the fingerprint (e.g., a binary vector representing the fingerprint).

The hierarchical fingerprint generation process includes a first level 1310*a*. The first level 1310 can include creating a first level hash 1312*a* that encodes a domain of the input 1302. For example, the hash can be a function of a semantic domain (e.g., medical, travel, finance) related to the input. The domain can be detected by keyword search (e.g., analyzing tokens) and/or vector similarity (e.g., with domains encoded as feature vectors). The first level hash 1312*a* can have a relatively (e.g., as compared to other levels 1310) small number of output bits (e.g., 16 bits). This can correspond to a coarse-grained hashing (e.g., where the first level hash 1312*a* encodes a relatively small amount of information and/or cannot easily differentiate between a large number of domains).

The second level 1310*b* can generate a second level hash 1312*b* that encodes an intent of the input 1302. If the input is a query, it can encode a query intent (e.g., information retrieval, purchase intent). If the input is an agent capability, it can encode a query intent that is addressable by the agent (e.g., encoding an agent's ability to perform purchases). The second level hash 1312*b* can have a relatively moderate number of output bits (e.g., 64 bits).

The third level 1310*c* can generate a third level hash 1312*c* that encodes semantic meaning extracted from the input 1302. The third level hash 1312*c* can have a relatively large number of output bits (e.g., 256 bits).

The architecture 1300 can include one or more additional levels. For example, the architecture 1300 can include a fourth level that encodes detailed requirements for addressing the query. The fourth level can generate a fourth level hash with a larger number of output bits than previous levels. For example, the fourth level hash can include 1024 bits.

The architecture 1300 produces a final composite fingerprint 1320. The level hashes 1312 can be merged to generate the final composite fingerprint 1320. In some implementations, the final composite fingerprint 1320 can be generated by concatenating the level hashes 1312. For example, the final composite fingerprint can include 384 bits, where the first 16 bits include the first level hash 1312*a*, the subsequent 64 bits include the second level hash 1312*b*, and the final 64 bits include the third level hash 1312*c*.

Figure 14:
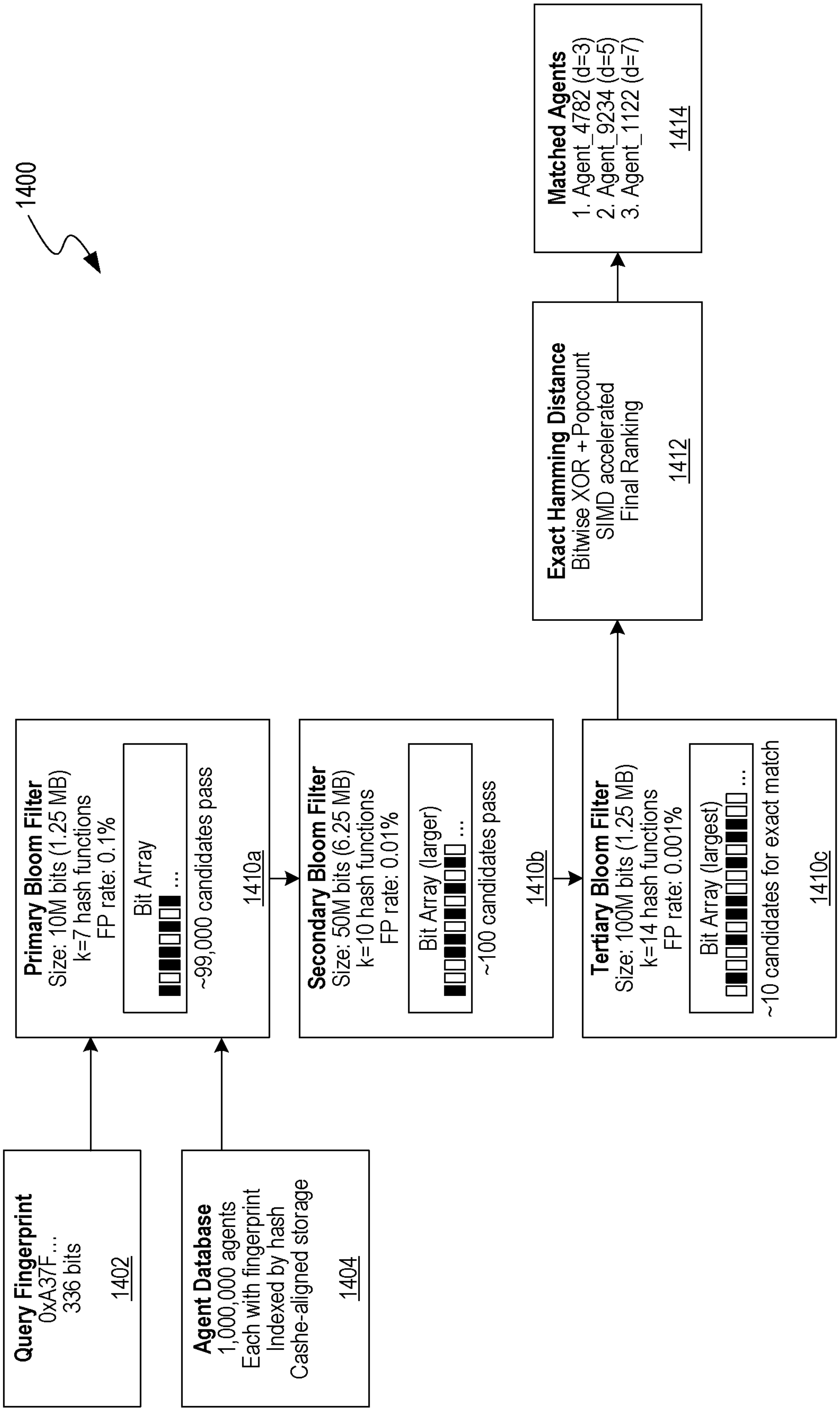
FIG. 14 shows a schematic illustrating an example architecture implementing a bloom filter cascade for semantically relevant agent matching, in accordance with some implementations of the present technology.

Bloom Filter Cascade Architecture to Match Agents Using the Model Orchestration Platform FIG. 14 shows a schematic illustrating an example architecture 1400 implementing a bloom filter cascade for semantically relevant agent matching, in accordance with some implementations of the present technology. The architecture 1400 is implemented using one or more computing systems, such as example computer system 2500 illustrated and described in more detail with reference to FIG. 25. Implementations of example architecture 1400 can be carried out on multiple such devices (e.g., connected through a network) connected in various ways. The components included in the architecture 1400 can be configured based on deployment requirements for a specific deployment and/or system implementing the architecture 1400.

A bloom filter refers to a probabilistic membership data structure and procedure in which multiple hash values are used to determine inclusion of a test element in a set of elements. This is done by generating a bitstring, as described in more detail below, that encodes every unique hash value computed from every element in the set. The hash values of the test element are calculated and compared to the bitstring of the set. If the test element is a member of the set, then the calculated hash values will be consistent with the hash values recorded in the bitstring. Thus, if the hash values calculated for the test element are not consistent with the bitstring of the set, then the test element cannot be an element of the set.

A bloom filter can be implemented in two parts. First, a bitstring is generated for the set. A plurality of hash functions are identified that output hash values of a fixed length (e.g., 8 bits). Equivalently, the hash functions output hash values that are below a maximum hash value (e.g., 255). The output hash values for the set are interpreted as numbers within a particular range of values (e.g., between 0 and 255). The bitstring for the set is generated by setting the bitstring to have a value of 1 at all bit positions in the bitstring (e.g., as indexed from 0 to 255) that correspond to hash values of the set, and to have a value of 0 at all other bit positions. For example, the bitstring can be initialized as a bitstring of zeros, where the number of bits equals the total number of distinct possible hash values (e.g., a bitstring of 256 bits). Then, each element in the set can be hashed using the plurality of hash functions, each hash value can be interpreted as an index value, and the bit of the bitstring at that index value can be set to 1. Alternatively, a bitstring can be generated for each element individually, and the bitstring for the set can be generated by applying a bitwise AND operation applied to the element bitstrings.

Second, the plurality of hash functions are applied to the test element to determine membership in the set. Because hash functions are deterministic, if the test element is an element of the set, then all bits at positions corresponding to hash values of the test element will have a value of 1 (e.g., they were set to 1 as a result of applying the hash functions to the element of the set that is identical to the test element). The plurality of hash functions are applied to the test element, and each hash value is interpreted as a bit position index value, and the bits of the bitstring at these index value are read. If all of the corresponding bitstring values are 1, then the test element passes the bloom filter, and can be an element of the set. If an index value corresponds to a 0 in the bitstring, the test element cannot be an element of the set.

The bloom filter can only probabilistically determine membership, as it is possible for a test element to pass the bloom filter and not be an element of the set. This is because of the existence of hash collisions (e.g., two elements can generate the same set of hash values and thus the same bitstring), and because the bitstring of the set is a combination of multiple single-element bitstrings (e.g., the pattern of nonzero values can include the bitstring of a particular test element, even if none of the elements of the set correspond to the same bitstring). The advantage of the bloom filter is that this approach is faster than a direct comparison of the test element to every element in the set. This is in part because the test element (e.g., the corresponding bitstring) is compared to a single object (e.g., the bitstring of the set) that represents a combined information from all set elements, rather than comparing the test element to each element individually. Additionally, a bitstring can be a much smaller representation of an element, and thus comparisons between bitstrings can be faster than comparisons between the elements themselves.

The bloom filter approach can also be used to probabilistically determine equality between two objects. A bitstring can be generated for a target element (e.g., a bitstring for a set containing a single element), and the bitstring of a test element can be compared to it (e.g., testing for inclusion in a set containing a single element). This can thus be used to probabilistically determine if two elements satisfy a similarity threshold (e.g., equality between the two elements). In some implementations, LSH functions are used to generate bitstrings, such that two similar fingerprints will produce two similar bitstrings (e.g., with only a few bits having different values).

The bloom filter cascade can use multiple bloom filter levels 1410 to probabilistically match a query fingerprint 1402 with one or more agent fingerprints stored in an agent bitstring database 1404. Each bloom filter level 1410 uses a plurality of hash functions to encode each agent fingerprint into a bitstring of a fixed length. Each bitstring can be calculated once and stored in an agent bitstring database 1404. The agent bitstring database can be configured for quick access and retrieval of agent bitstrings (e.g., "cache-friendly" storing). The query fingerprint 1402 is encoded into a query bitstring using the plurality of hash functions, and the query bitstring is compared to the bitstrings of the agents. The agent bitstrings that pass the bloom filter level 1410 continue to subsequent bloom filter levels 1410. The bitstrings associated with subsequent bloom filter levels 1410 can be longer, encode more information, and/or encode more complex information than the bitstrings of lower bloom filter levels 1410. This allows the subsequent bloom filter levels 1410 to make a more accurate comparison of the agent fingerprints with the query fingerprint 1402, at the cost of requiring more computational resources per comparison. However, fewer agents will pass the previous bloom filter level 1410. In some implementations, agent fingerprints are grouped into predetermined sets of agent fingerprints. The bloom filter levels 1410 can then determine membership of the query fingerprint 1402 in each of the predetermined sets of agent fingerprints (and/or determine if the query fingerprint 1402 and the fingerprints in the set satisfy a similarity threshold). This can decrease the computational resources needed to perform each bloom filter level 1410, at the cost of a higher false positive rate (e.g., higher number of agent fingerprints that pass all bloom filter levels 1410 and do not match the query fingerprint 1402).

A primary bloom filter level 1410*a* can be configured to compare bitstrings of a relatively small length (e.g., smaller than other bloom filter levels 1410) generated using a relatively small number of hash functions (e.g., smaller than other bloom filter levels 1410). The primary bloom filter level 1410*a* can compare a bitstring of the query fingerprint 1402 to bitstrings from a relatively large number of agents (e.g., larger than other bloom filter levels 1410). In some implementations, the primary bloom filter level 1410*a* generates a bitstring from a portion of a fingerprint (e.g., a portion corresponding to the output of one or more levels 1410 of the hierarchical fingerprint generation process). In some implementations, the primary bloom filter level 1410*a* is configured to generate bitstrings by applying seven hash functions to each fingerprint. In some implementations, the primary bloom filter level 1410*a* is configured to have a guaranteed false positive rate not exceeding 0.1%.

A secondary bloom filter level 1410*b* can be configured to compare bitstrings of a relatively moderate length generated using a relatively moderate number of hash functions. The secondary bloom filter level 1410*b* can compare a bitstring of the query fingerprint 1402 to bitstrings from a relatively moderate number of agents. In some implementations, the secondary bloom filter level 1410*b* generates a bitstring from a portion of a fingerprint. In some implementations, the secondary bloom filter level 1410*b* is configured to generate bitstrings by applying ten hash functions to each fingerprint. In some implementations, the secondary bloom filter level 1410*b* is configured to have a guaranteed false positive rate not exceeding 0.01%.

A tertiary bloom filter level 1410*c* can be configured to compare bitstrings of a relatively long length generated using a relatively large number of hash functions. The tertiary bloom filter level 1410*c* can compare a bitstring of the query fingerprint 1402 to bitstrings from a relatively small number of agents. In some implementations, the tertiary bloom filter level 1410*c* generates a bitstring from a portion of a fingerprint. In some implementations, the tertiary bloom filter level 1410*c* is configured to generate bitstrings by applying fourteen hash functions to each fingerprint. In some implementations, the tertiary bloom filter level 1410*c* is configured to have a guaranteed false positive rate not exceeding 0.001%.

The architecture 1400 can implement additional bloom filter levels 1410 and/or alternative bloom filter levels 1410. For example, the architecture 1400 can implement a fourth bloom filter level that generates longer bitstrings than previous bloom filter levels 1410.

The architecture 1400 implements a bitwise matching module 1412 to quantify a difference between the bitstring representation of the query fingerprint 1402 and the bitstrings that pass all bloom filter levels 1410 (e.g., that satisfy a similarity threshold with the query fingerprint 1402). For example, the bitwise matching module 1412 can calculate a Hamming distance between the bitstring of the query fingerprint 1402 and a bitstring of an agent fingerprint. The Hamming distance between two bitstrings of equal length is equal to the number of bits in which the two bitstrings have different values. The bitwise matching module 1412 can include algorithms that parallelize bitwise computations to determine a Hamming distance between two bitstrings.

In some implementations, the architecture 1400 implements a bitwise matching module 1412 as part of one or more bloom filter levels 1410. For example, if a particular bloom filter level 1410 uses a portion of the agent fingerprints (e.g., corresponding to a hierarchical level hash as described in FIG. 13), then the architecture can identify a set of agent bitstrings that pass the particular bloom filter level 1410, and can implement a Hamming distance between the each of the agent fingerprint portions and the corresponding query fingerprint portion. Agents with corresponding fingerprint portions that satisfy additional/alternate similarity thresholds with the query fingerprint portion (e.g., fingerprint portions that are within a certain Hamming distance of the query fingerprint portion, such as a Hamming distance of zero) can then proceed to the subsequent bloom filter level 1410.

The architecture 1400 can determine a routing path 1414 of matched agents for the query. For example, the architecture 1400 can rank agent fingerprints based on the Hamming distance of each fingerprint with respect to the query fingerprint 1402. The routing path 1414 can include agents with fingerprints associated with the smallest Hamming distances (e.g., out of all agent fingerprints that passed all bloom filter levels 1410). In some implementations, the routing path 1414 can include all agents associated with fingerprints associated with Hamming distances at or below a certain threshold (e.g., that satisfy a similarity threshold). The threshold can be predetermined or dynamic. For example, the threshold can depend on available computational resources, characteristics of the agents (e.g., an amount of computational resources associated with executing a particular agent), and/or can be chosen such that a predefined number of agents are included in the routing path (e.g., the top three). The query can then be routed to the agents on the routing path 1414.

Figure 15:
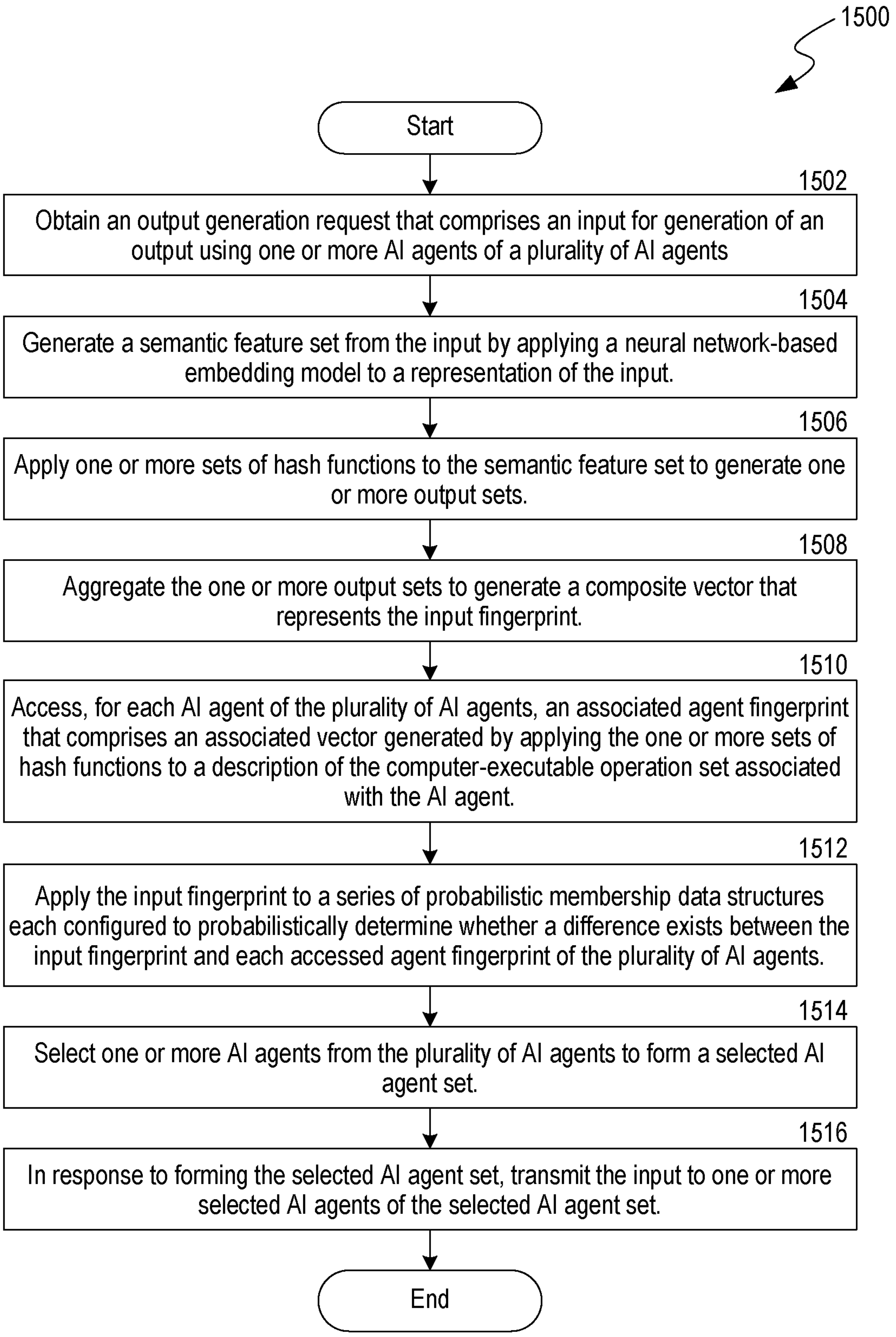
FIG. 15 is a flow diagram illustrating a process for routing queries by performing semantic fingerprinting of queries, in accordance with some implementations of the present technology.

FIG. 15 is a flow diagram illustrating a process 1500 for routing queries by performing semantic fingerprinting of queries, in accordance with some implementations of the present technology. The process 1500 can be implemented on one or more computing systems, such as computer system 2500 illustrated and described in more detail with reference to FIG. 25. The process 1500 can be implemented as part of a model orchestration platform.

At operation 1502, the process 1500 can include obtaining an output generation request comprising an input for generation of an output using one or more AI agents of a plurality of AI agents. The input can include a query, request, and/or a command set. The input can be a natural language input. The input can be received from a user via a user interface (UI). Each AI agent can be associated with a computer-executable operation set. The AI agent can be configured to autonomously execute one or more computer-executable operations in the set on one or more software applications of a software application set in response to satisfaction of a condition set associated with the AI agent.

The process 1500 can include generating an input fingerprint for the input. Generating the input fingerprint can include performing a fingerprinting operation via a semantic fingerprinting framework.

At operation 1504, the process 1500 can include generating a semantic feature set from the input by applying a neural network-based embedding model to a representation of the input. The embedding model can be a language model, such as an LLM and/or an SLM.

At operation 1506, the process 1500 can include applying one or more sets of hash functions to the semantic feature set to generate one or more output sets. For example, a plurality of hash functions can be applied to the semantic feature set to generate a corresponding plurality of partial hashes, where the output set comprises the partial hashes. Each output set can correspond to a set of hash functions. Each set of hash functions can operate within a different dimension of the semantic feature set.

At operation 1508, the process 1500 can include aggregating the one or more output sets to generate a composite vector that represents the input fingerprint. For example, each output set can correspond to a partial hash (e.g., a combination of the elements of the output set), and the partial hashes can be concatenated into the composite vector.

At operation 1510, the process 1500 can include accessing, for each AI agent of the plurality of AI agents, an associated agent fingerprint that comprises an associated vector generated by applying the one or more sets of hash functions to a description of the computer-executable operation set associated with the AI agent. Each associated agent fingerprint can be generated by performing a fingerprinting operation via a semantic fingerprinting framework.

At operation 1512, the process 1500 can include applying the input fingerprint to a series of probabilistic membership data structures each configured to probabilistically determine whether a difference exists between the input fingerprint and each accessed agent fingerprint of the plurality of AI agents. Applying the input fingerprint to the series of probabilistic membership data structures can include implementing a bloom filter cascade (e.g., where agent bitstrings generated from associated agent fingerprints are included in the probabilistic membership data structures). Each probabilistic membership data structure can correspond to a level in a bloom filter cascade, and have a different focus and/or comprise bitstrings of different lengths (e.g., when compared to other probabilistic membership data structures in the series).

At operation 1514, the process 1500 can include selecting one or more AI agents from the plurality of AI agents to form a selected AI agent set. A selected AI agent can correspond to a selected AI agent fingerprint such that no difference was determined to exist between the selected AI agent fingerprint and the input fingerprint. Selecting the one or more AI agents can include determining additional properties of the AI agent fingerprints, such as corresponding Hamming distances between the AI agent fingerprints and the input fingerprint.

At operation 1516, the process 1500 can include, in response to forming the selected AI agent set, transmitting the input to one or more selected AI agents of the selected AI agent set. The one or more selected AI agents can autonomously execute respective computer-executable operation sets.

Figure 16:
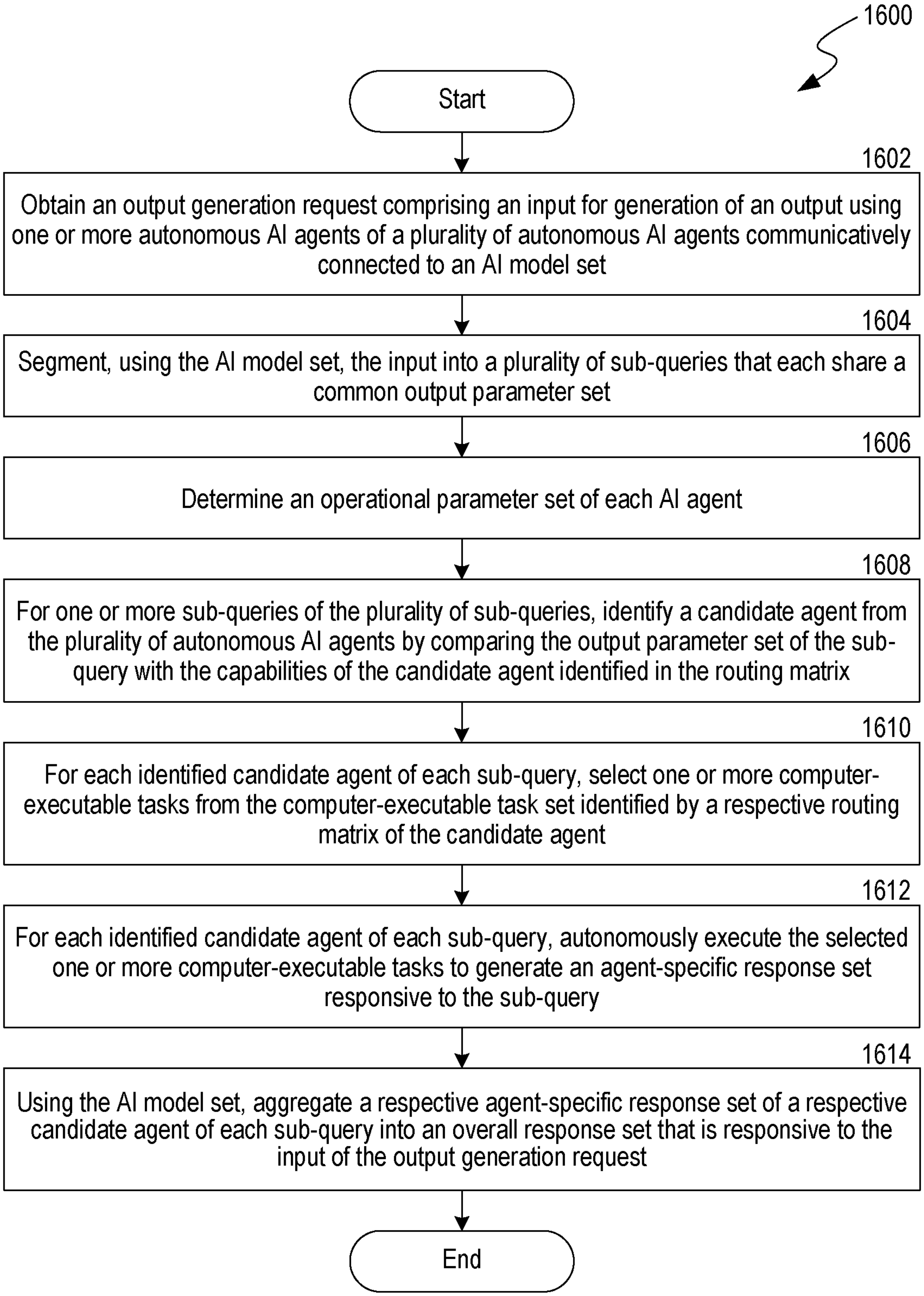
FIG. 16 shows a flow diagram illustrating a process for orchestrating a plurality of semi-autonomous or autonomous artificial intelligence (AI) agents to generate a personalized response, in accordance with some implementations of the present technology.

Example Methods of Implementing an LLM Gateway Router Using the Model Orchestration Platform FIG. 16 shows a flow diagram illustrating a process 1600 for orchestrating a plurality of semi-autonomous or autonomous AI agents to generate a personalized response, in accordance with some implementations of the present technology. In some implementations, the process 1600 is performed by components of example computer system 2500 illustrated and described in more detail with reference to FIG. 25. Likewise, implementations can include different and/or additional operations or can perform the operations in different orders.

In operation 1602, the model orchestration platform is enabled to obtain (e.g., receive from a computing device) an output generation request that includes a digitally encoded input, such as a textual prompt, query object, or command set, for generation of an output using one or more AI agents of a set of AI agents communicatively connected to a gateway router (e.g., a large language model (LLM) set, an AI model set, a model set, an AI agent set).

In implementations where the gateway router is an LLM set, the LLM set can identify the context, intent, and/or semantic structure of the input using techniques such as dependency parsing, named entity recognition, and semantic role labeling. In some implementations, the gateway router is a modular suite of models that can include a hybrid setup of rules-based classifiers, neural embeddings, and so forth. The gateway router can map out which portions of the input are linked (e.g., what is the main verb, which nouns are the subject or object, and which adjectives modify which nouns) to identify dependencies. The gateway router can identify entities referenced within the input, such as names of people, organizations, locations, dates, or products. The gateway router can determine the underlying intent of the input by predicting the likely action based on training data or using a rule-based system to map identified verbs to a corresponding action. For example, an intent can be referenced as "retrieve information," "book an appointment," "send an email," or "answer a question."

One or more AI agents can be associated with a specific routing data structure such as a matrix, table, graph, or other data structure that identifies actions such as a computer-executable task set used to generate a response, preconditions, parameter boundaries, and/or trigger events. The routing data structure(s) can be annotated using domain-specific ontologies or knowledge graphs. For example, a matrix row maps a detected user type and operation to a given agent's indices, while a column encodes resource constraints or regulatory flags.

Each action can be autonomously executed by the AI agent on a set of software applications in response to satisfaction of a condition set. For example, each action can be identified in the routing data structure by its operational signature, such as a software API call, database transaction, service invocation, code execution on an isolated virtual machine, and so forth. The respective AI agent can evaluate a condition set, which can be Boolean or other logic, against the input's operational parameters (such as user permissions, data sensitivity, time constraints, or current system load). Only when the conditions in the condition set are satisfied does the agent proceed to autonomously execute the action.

In operation 1604, the model orchestration platform is enabled to segment, using the gateway router, the input into a plurality of portions such as sub-queries. Each sub-query can share a common output parameter set that identifies, for example, a user type or privilege level (to enforce access control), timestamp of receipt, requested output modality (such as text, file, JSON object, vector embedding, or structured report), performance metric thresholds (e.g., required response time, accuracy bounds, resource usage limits), constraints on system resource allocation (such as memory, CPU, or bandwidth quotas per sub-query), and so forth.

To partition the input, the gateway router can transform the input into high-dimensional vectors (i.e., numerical representations that encode the underlying contextual relationships of each part of the input) using an embedding model (which can be within the gateway router). The embeddings enable the gateway router to detect shifts in intent, semantic domains, or actionable entities within the input. For example, the vectors are compared against a set of pre-established reference embeddings, each representing prototypical intents, domains (e.g., a subset of knowledge), or entity types. By measuring the proximity and direction of the input vectors relative to these references (using cosine similarity or related distance metrics), the gateway router can quantify how closely each segment aligns with known categories or detect when vector patterns shift, signaling a change in user intent, topic, or actionable item. A vector shift can be flagged as a context transition, and therefore form a separate sub-query.

For example, when a user or automated system transmits an input to the platform that states "prepare the house for bedtime by turning off the downstairs lights, locking all exterior doors, lowering the thermostat to 65 degrees, and activating security cameras," the gateway router identifies the sequence of independent operations: (1) turning off lights, (2) locking doors, (3) adjusting the thermostat, and (4) activating security devices by identifying keywords within the input (e.g., "lock," "adjust thermostat"). Each of the operations is treated as a sub-query. For each sub-query, the gateway router can obtain the common output parameter set of the predefined sub-query. For instance, the gateway router tags each one with the user's privilege level (so "lock all doors" or "deactivate alarms" will only be attempted if the user has admin access).

In operation 1606, the model orchestration platform is enabled to determine an operational parameter set of each AI agent that defines at least one user type authorized to use the AI agent, a range of timestamps associated with the AI agent, at least one output modality of responses generated by the AI agent, at least one performance metric value, at least one resource usage value, and so forth. Performance metric values, such as required response time (latency), accuracy, trust confidence, or compliance levels, can be retrieved from agent registries or calculated in near-real-time or real-time based on prior executions, simulated workloads, or machine learning-based predictions. Resource usage values can define computational boundaries, such as maximum CPU cycles, RAM usage, bandwidth consumption, number of concurrent threads, and so forth. The model orchestration platform can store the operational parameter set of each AI agent within a respective dynamic routing table or configuration graph that tracks active constraints and current state for each agent.

In operation 1608, the model orchestration platform is enabled to, for each sub-query of the plurality of sub-queries, identify, using the gateway router, a candidate agent (single or multiple) from the plurality of AI agents by comparing the output parameter set of the sub-query with the operational parameter set of each AI agent within the plurality of AI agents. In a rule-based approach, the gateway router uses filtering and logic rules to remove agents who do not meet particular requirements, such as compliance, privilege level, and so forth. In some implementations, the gateway router calculates similarity scores between the vectors of sub-query output parameters and agent operational parameters, e.g., using cosine similarity or other distance measures. The gateway router can use an ensemble model to rank candidate agents on predefined static capabilities (e.g., training data) and/or near-real-time or real-time performance, availability, historical success rate for similar tasks, predicted energy consumption, and so forth. For example, when the operational parameter set defines the at least one resource usage value, the model orchestration platform can allocate a subset of available computational resources to process the sub-query based on the one or more resource usage values of the identified candidate agent.

The gateway router can cross-reference the vectorized input against structured ontologies, or digital maps of domain expertise and capabilities of the AI agents communicatively connected to the model orchestration platform, to map distinct portions of the input to their most appropriate downstream handler. The gateway router can compare the current prompt with historical requests and workflows, and use the comparison to route similar input portions to historically routed agents.

In some implementations, each AI agent is associated with an ontology data structure. The ontology data structure can refer to a machine-readable representation of a domain set, an attribute set of each domain-specific category in the domain set, and/or a set of relationships among the domain set and the attribute set of each domain set. The AI model set can access the ontology data structure of a particular AI agent to identify, for a particular sub-query, a query-specific domain within the domain set based on one or more query-specific attributes within respective attribute sets of each domain. One or more candidate agents of the candidate agent set can be associated with the query-specific domain. The ontology data structure can be stored in, for example, a graph database, a distributed file system, a cloud-based object storage service, a local persistent memory of the AI agent, and so forth. Updates to the ontology structure can be performed only in response to a consensus among the AI agents. For example, the model orchestration platform can update the ontology data structure responsive to receiving a data signal from the AI agent set that indicates a consensus among the AI agent set for the update.

The plurality of AI agents can be organized in a hierarchal architecture (e.g., a "constellation" of agents). The hierarchal architecture can include a general-purpose agent at a first level of the hierarchal architecture, multiple specialized sub-agents at a second level, and so forth. AI agents can be identified on an API registry, which can refer to a continuously updated directory that lists all registered agents, their endpoints, supported functions, operational health status, and/or compliance metadata. For example, the model orchestration platform can expose an API registry identifying the AI agent set, where the API registry is accessible by the gateway router. This registry can be implemented as a centralized ledger or a distributed service, allowing the orchestrator (and even sub-agents) to dynamically discover, authenticate, and select the available agents for a given sub-task.

In some implementations, at least one AI agent is associated with a dynamic retrieval-augmented generation (RAG)-based model. The dynamic RAG-based model can update a knowledge base associated with the RAG-based model by retrieving data from one or more data sources via, for example, an API. The update can be triggered based on detected performance degradation, received user feedback, a scheduled interval, and the other contextual signals such as those discussed with reference to FIG. 13. The dynamic agent refers to a dynamic RAG-based agent that communicatively connects its internal language model(s) to an actively managed knowledge base that is continually refreshed by retrieving new data from sources (e.g., trusted sources) through APIs, web scrapers, and/or other database connectors. The timing and frequency of the updates can be fully automated or governed by predefined logic, for example, triggering data incorporation when an agent's live performance metrics drop below an accuracy benchmark (e.g., 90% on evaluation sets), in direct response to user feedback highlighting knowledge gaps, or at regular, scheduled intervals. The flexibility enables the gateway router and/or the candidate agent itself to monitor for new or valuable data sources, check for stale entries, and incorporate vetted updates, while minimizing or at least greatly reducing retraining costs and ensuring that sensitive or proprietary information remains secure and is not intermixed or exfiltrated outside a trusted or otherwise validated environment.

In some implementations, at least one AI agent is instantiated as fine-tuned models, wherein the fine-tuning can be performed using domain-specific datasets to modify the model parameters of a pre-trained neural network. The model orchestration platform can receive a base model (e.g., a transformer-based LLM or small language model (SLM)), select a corpus of training data associated with a target domain (such as legal, medical, or financial records), and/or execute a supervised learning operation to update the model's weights. The resulting fine-tuned AI agent is enabled to generate responses to sub-queries that match the domain of the training data, and the model orchestration platform can dynamically route such sub-queries to the fine-tuned agent by matching sub-query metadata or semantic embeddings of the query to a respective domain of the fine-tuned AI agent. Thus, internal representations of the fine-tuned AI agent are specifically adapted to the operational context of the sub-query.

The model orchestration platform, in some implementations, uses purpose-trained SLMs that have been constructed using knowledge distillation operations. For example, the knowledge distillation operations include training a "compact" SLM (the "student") to replicate the output distributions of a larger, more "complex" (i.e., more parameters) model (the "teacher") on a set of inputs. In some implementations, a dataset of input-output pairs is generated using the teacher model that can be subsequently used to train the student SLM to minimize or otherwise reduce a divergence metric (e.g., Kullback-Leibler divergence) between its outputs and those of the teacher. The resulting SLM agent can be registered within the model orchestration platform with metadata that indicates its specific capabilities. During runtime, the model orchestration platform evaluates system resource constraints and sub-query requirements, and selectively routes sub-queries to the SLM agent when its operational profile and knowledge domain are determined to be aligned for the task.

The AI agents can be instantiated using various machine learning techniques, such as Bayesian inference models, decision trees, SVMs, rule-based expert systems, and the like. Each AI agent can be instantiated as a software module with a defined interface for receiving sub-queries, executing a computational procedure (e.g., probabilistic inference, tree traversal, or rule evaluation), and/or returning a structured response. The model orchestration platform can maintain a registry of agent capabilities and match sub-query characteristics (such as data type, required explainability, or determinism) to the agent sharing common attributes.

Conversely, static agents operate against fixed, immutable knowledge bases, which provides the benefit of full control, data provenance, and improved data privacy, especially when the underlying LLM or SLM is kept on-premises or within particular operative boundaries (e.g., within the automated systems or servers of an organization). This architecture reduces the risk of unwanted data leakage or contamination. In some implementations, dynamic RAG agents can perform validations via both automated validation (using deep learning-driven validators) and human-in-the-loop workflows, where updates to the knowledge base are subject to approval by users with specific roles or permissions.

In some implementations, at least one AI agent is a static agent associated with a first knowledge base that is fixed, and at least one other AI agent is a dynamic agent with a second knowledge base that can be updated. The data routing table can select between static and dynamic agents for a particular portion of the input based on data sensitivity, update frequency, user-defined policy, and so forth. The routing data structure or gateway router can dynamically determine, for each incoming input or sub-query, whether a static or dynamic agent is most appropriate, based on the rate at which information changes in the relevant domain (update frequency), the sensitivity or classification of the information (ensuring proprietary or confidential data is handled only by static agents), policies defined by administrators, and so forth.

In operation 1610, the model orchestration platform is enabled to, for each identified candidate agent of each sub-query, select, using the gateway router, one or more actions (e.g., computer-executable tasks from the computer-executable task set) identified by a respective routing data structure (e.g., table, matrix) of the candidate agent. Each of the one or more actions can be selected based on the sub-query satisfying a respective condition set of the action. For example, the routing data structure can indicate a knowledge source used by the AI agent and/or a model used by the AI agent. The gateway router evaluates each sub-query against condition sets (i.e., logic rules or feature thresholds)identified by the routing data structure. For instance, if a sub-query requests "lower temperature if above 28° C.," the agent's task table can only activate its "HVAC adjust" action if current sensor data meets or exceeds that threshold. The routing structure can indicate which knowledge source (such as a sensor, retrieved data, or an external model) the agent should use, as well as which specific model or sub-model is invoked to process the input.

Routing data structures, which determine how actions are matched to conditions, can be maintained manually (e.g., updated by administrators through dashboards or configuration files) or automatically, via dynamic signals observed by the model orchestration platform itself. To update the routing data structures dynamically, the model orchestration platform can detect a change in one or more environmental signals using the LLM set, and dynamically modify the routing data structure of one or more AI agents based on the detected change in the one or more environmental signals.

The routing data structure can be updated in response to a detected change in system load (CPU, memory, or network usage), a detected change in user context (such as a role change), a detected change in environmental signals (such as a change in building occupancy or sensor reading/malfunction), and so forth. The change can additionally or alternatively be a change in value of a performance metric associated with the AI agent. Examples of contextual signals are discussed in further detail with reference to FIG. 13. For instance, if performance metrics indicate that an AI agent is becoming a bottleneck (increased response time, dropped packets), the routing data structure can downgrade its task assignment priority until a particular action such as fault recovery is executed.

In some implementations, the AI agent set and/or the gateway router includes a validation agent to validate updates to a knowledge base accessed by one or more AI agents. The validation agent can obtain (e.g., receive) a proposed update to the knowledge base. The validation agent can initiate a computer-implemented workflow to evaluate the proposed update against an update criteria set, and responsive to determining satisfaction of the proposed update with the update criteria set, apply the proposed update to the knowledge base. This thus prevents inadvertent propagation of faulty rules or data.

In some implementations, candidate agents can be identified based on historical queries. For example, the model orchestration platform compares the prompt against a database of previous queries, and identifies one or more identified candidate agents based on the comparison. Each new input can be compared against a database of previously processed output generation requests, using vector similarity search, recurrence pattern mining, or clustering models. If a current input closely matches a previously handled input, the routing platform can prioritize (e.g., increase the rank of) agent(s) that successfully (e.g., accurately, within a particular latency threshold) responded in the past.

In operation 1612, the model orchestration platform is enabled to autonomously execute, using the identified candidate agent, the selected one or more computer-executable tasks to generate an agent-specific response set responsive to the sub-query.

In operation 1614, the model orchestration platform is enabled to, using the gateway router, aggregate each respective agent-specific response set of each respective candidate agent of each sub-query (possibly from different modalities, such as text, images, audio, video, multi-modal data, unstructured data, semi-structured data, structured data, device status codes, summaries, and the like) into an overall response set that is responsive to the prompt of the output generation request. In some implementations, since responses can stem from a wide variety of data modalities, the gateway router normalizes each respective agent-specific response set into a standardized internal format so that disparate data types can be mapped to the original subcomponents of the input and enable the model orchestration platform to maintain a traceable link between each response and the specific sub-query of the input the response addresses. For example, one sub-query can request a temperature reading (structured data) while another requests a video snapshot from a security camera (multi-modal data).

Once normalized, the model orchestration platform can synthesize each respective agent-specific response set using temporal and semantic alignment (linking events or data across agents by their timestamp or logical context) and merging or summarizing redundant or complementary information. The model orchestration platform can perform conflict resolution through policy rules or majority voting. Confidence scoring and contextual weighting can be used to assess the reliability of each agent based on historical performance metrics, current system status, or explicit confidence values returned by the agents themselves. For instance, if two agents provide disagreeing status codes for a device state, the model orchestration platform can resolve the discrepancy by choosing (or weighting more heavily) the result from the most recently updated or highest-confidence agent. The aggregated response can be formatted or encoded according to the requirements of the output channel or requesting user, such as generating a structured report, a dashboard, a single summary text, or machine-consumable data package (e.g., JSON).

In some implementations, one or more AI agents are enabled to implement a feedback loop. For example, the model orchestration platform, via the gateway router and/or the AI agent, obtains a feedback set for one or more agent-specific response sets. The model orchestration platform generates a modification set (e.g., actions to adjust task parameters, alter execution sequences, or reweight routing priorities) to modify the one or more computer-executable tasks of a respective candidate agent and/or a sequence of the one or more computer-executable tasks of the respective candidate agent. The model orchestration platform transmits the modification set to the respective candidate agent, and applies the actions indicated in the modification set onto the respective candidate agent. The one or more AI agents can, once modified, re-execute the computer-executable tasks to generate a modified agent-specific response set, which can then be re-validated using the model orchestration platform.

In some implementations, the feedback loop is implemented using operations associated with fine-tuning and reinforcement learning. Fine-tuning can be performed by updating the parameters of a deployed agent model using additional labeled data that is specific to the operational environment or user context. For example, once new training samples are received, a supervised learning operation can be applied to adjust the model's weights, and the updated agent can be redeployed within the model orchestration platform. Reinforcement learning operations can be executed so that an agent receives reward signals based on the outcomes of its actions within the environment of the model orchestration platform. For example, an agent's policy is updated to enable the agent to iteratively adjust its behavior over time in response to observed feedback and performance metrics (e.g., using algorithms such as Q-learning or policy gradients).

Feedback can be generated internally by the agent itself, for example, by monitoring its own performance metrics, error rates, or confidence scores during task execution. Additionally or alternatively, feedback can be received from the orchestrator, which can be aggregate system-level performance data, user satisfaction scores, or compliance audit results. The orchestrator can transmit the received feedback as structured feedback signals to the agent. Agents, in some implementations, receive feedback from peer agents within the network to enable collaborative learning from feedback received by other agents. Furthermore, the model orchestration platform can obtain feedback from external sources, such as user annotations, third-party evaluation services, or regulatory compliance systems.

Agents within the model orchestration platform can autonomously generate feedback signals based on their internal state, task outcomes, or detected anomalies. The agent-generated feedback signals can be transmitted to the orchestrator, to other agents, or to external monitoring systems. For example, the model orchestration platform can implement a subscriber framework to enable services, agents, or external systems to register as subscribers to specific feedback channels or topics. When feedback is generated or received, the model orchestration platform can publish the feedback to all subscribed entities using a publish-subscribe messaging protocol. Thus, relevant feedback is disseminated in near real time or real time to all associated components across the model orchestration platform.

Validating Agent Inputs and Outputs Using the Model Orchestration Platform

Figure 17:
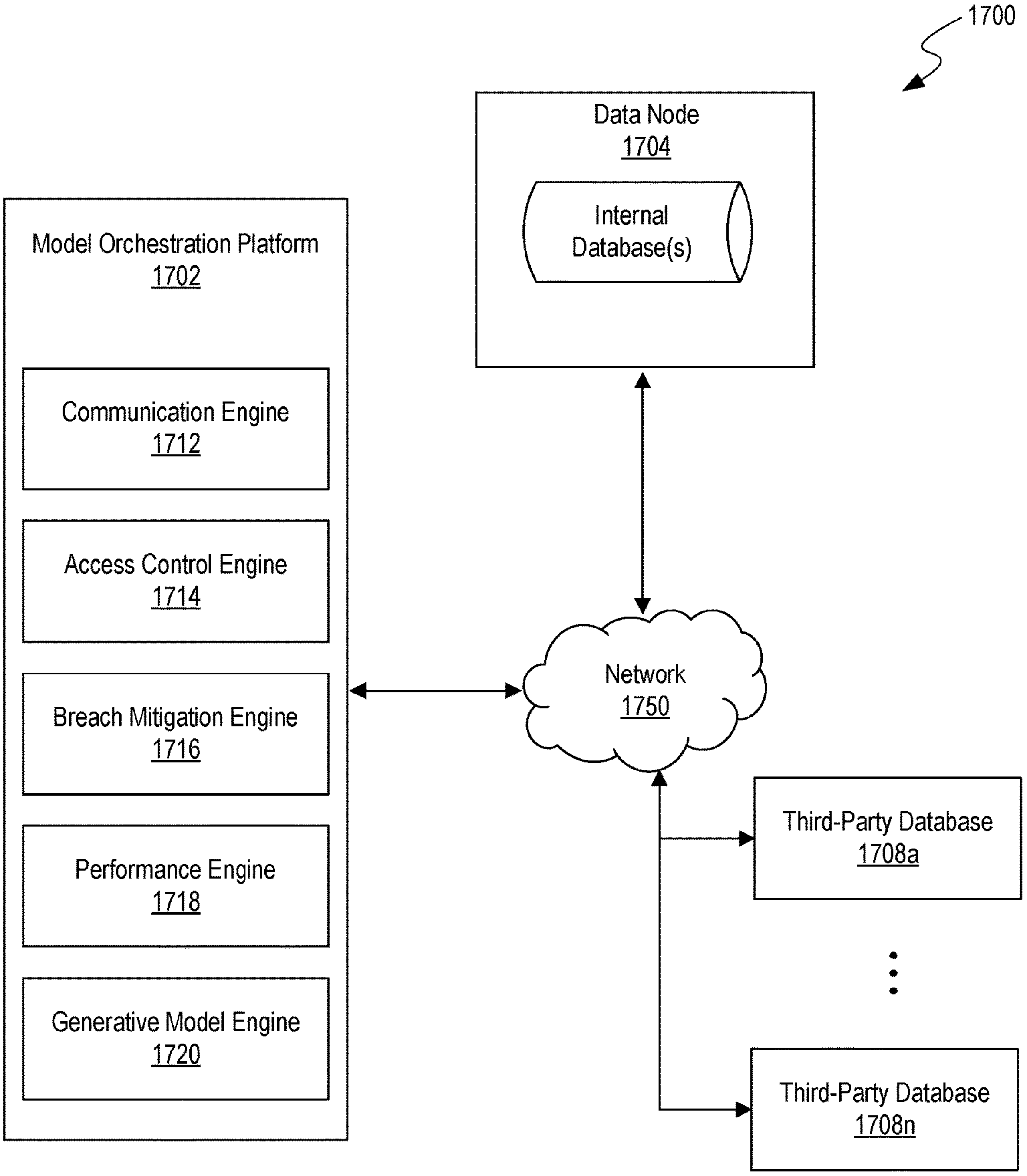
FIG. 17 shows an illustrative environment for evaluating model prompts and outputs for model selection and validation, in accordance with some implementations of the present technology.

FIG. 17 shows an illustrative environment 1700 for evaluating machine learning model inputs (e.g., agent prompts) and outputs for model selection and validation, in accordance with some implementations of the present technology. For example, the environment 1700 includes the model orchestration platform 1702, which is capable of communicating with (e.g., transmitting or receiving data to or from) a data node 1704 and/or third-party databases **1708*a*-1708*n* via a network 1750. The model orchestration platform 1702 can include software, hardware, or a combination of both and can reside on a physical server or a virtual server (e.g., as described in FIG. 26) running on a physical computer system. For example, the model orchestration platform 1702 can be distributed across various nodes, devices, or virtual machines (e.g., as in a distributed cloud server). In some implementations, the model orchestration platform 1702 can be configured on a user device (e.g., a laptop computer, smartphone, desktop computer, electronic tablet, or another suitable user device). Furthermore, the model orchestration platform 1702 can reside on a server or node and/or can interface with third-party databases 1708*a*-1708*n*** directly or indirectly.

The data node 1704 can store various data, including one or more machine learning models, prompt validation models, associated training data, user data, performance metrics and corresponding values, validation criteria, and/or other suitable data. For example, the data node 1704 includes one or more databases, such as an event database (e.g., a database for storage of records, logs, or other information associated with LLM-related user actions), a vector database, an authentication database (e.g., storing authentication tokens associated with users of the model orchestration platform 1702), a secret database, a sensitive token database, and/or a deployment database.

An event database can include data associated with events relating to the model orchestration platform 1702. For example, the event database stores records associated with users'inputs or prompts for generation of an associated natural language output (e.g., prompts intended for processing using an LLM). The event database can store timestamps and the associated user requests or prompts. In some implementations, the event database can receive records from the model orchestration platform 1702 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the model orchestration platform 1702). By doing so, the model orchestration platform 1702 can store and track information relating to performance, errors, and troubleshooting. The model orchestration platform 1702 can include one or more subsystems or subcomponents. For example, the model orchestration platform 1702 includes a communication engine 1712, an access control engine 1714, a breach mitigation engine 1716, a performance engine 1718, and/or a generative model engine 1720.

A vector database can include data associated with vector embeddings of data. For example, the vector database includes a numerical representations (e.g., arrays of values) that represent the semantic meaning of unstructured data (e.g., text data, audio data, or other similar data). For example, the model orchestration platform 1702 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the model orchestration platform 1702 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the model orchestration platform 1702 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the model orchestration platform 1702 can evaluate prompts and/or outputs to prevent breaches or leakage of such sensitive information.

A deployment database can include data associated with deploying, using, or viewing results associated with the model orchestration platform 1702. For example, the deployment database can include a server system (e.g., physical or virtual) that stores validated outputs or results from one or more LLMs, where such results can be accessed by the requesting user.

The model orchestration platform 1702 can receive inputs (e.g., prompts), training data, validation criteria, and/or other suitable data from one or more devices, servers, or systems. The model orchestration platform 1702 can receive such data using communication engine 1712, which can include software components, hardware components, or a combination of both. For example, the communication engine 1712 includes or interfaces with a network card (e.g., a wireless network card and/or a wired network card) that is associated with software to drive the card and enables communication with network 1750. In some implementations, the communication engine 1712 can also receive data from and/or communicate with the data node 1704, or another computing device. The communication engine 1712 can communicate with the access control engine 1714, the breach mitigation engine 1716, the performance engine 1718, and the generative model engine 1720.

In some implementations, the model orchestration platform 1702 can include the access control engine 1714. The access control engine 1714 can perform tasks relating to user/device authentication, controls, and/or permissions. For example, the access control engine 1714 receives credential information, such as authentication tokens associated with a requesting device and/or user. In some implementations, the access control engine 1714 can retrieve associated stored credentials (e.g., stored authentication tokens) from an authentication database (e.g., stored within the data node 1704). The access control engine 1714 can include software components, hardware components, or a combination of both. For example, the access control engine 1714 includes one or more hardware components (e.g., processors) that are able to execute operations for authenticating users, devices, or other entities (e.g., services) that request access to an LLM associated with the model orchestration platform 1702. The access control engine 1714 can directly or indirectly access data, systems, or nodes associated with the third-party databases 1708*a*-1708*n* and can transmit data to such nodes. Additionally or alternatively, the access control engine 1714 can receive data from and/or send data to the communication engine 1712, the breach mitigation engine 1716, the performance engine 1718, and/or the generative model engine 1720.

The breach mitigation engine 1716 can execute tasks relating to the validation of inputs and outputs associated with the LLMs. For example, the breach mitigation engine 1716 validates inputs (e.g., prompts) to prevent sensitive information leakage or malicious manipulation of LLMs, as well as validate the security or safety of the resulting outputs. The breach mitigation engine 1716 can include software components (e.g., modules/virtual machines that include prompt validation models, performance criteria, and/or other suitable data or processes), hardware components, or a combination of both. As an illustrative example, the breach mitigation engine 1716 monitors prompts for the inclusion of sensitive information (e.g., PII), or other forbidden text, to prevent leakage of information from the model orchestration platform 1702 to entities associated with the target LLMs. The breach mitigation engine 1716 can communicate with the communication engine 1712, the access control engine 1714, the performance engine 1718, the generative model engine 1720, and/or other components associated with the network 1750 (e.g., the data node 1704 and/or the third-party databases 1708*a*-1708*n*).

The performance engine 1718 can execute tasks relating to monitoring and controlling performance of the model orchestration platform 1702 (e.g., or the associated development pipeline). For example, the performance engine 1718 includes software components (e.g., performance monitoring modules), hardware components, or a combination thereof. To illustrate, the performance engine 1718 can estimate performance metric values associated with processing a given prompt with a selected LLM (e.g., an estimated cost or memory usage). By doing so, the performance engine 1718 can determine whether to allow access to a given LLM by a user, based on the user's requested output and the associated estimated system effects. The performance engine 1718 can communicate with the communication engine 1712, the access control engine 1714, the performance engine 1718, the generative model engine 1720, and/or other components associated with the network 1750 (e.g., the data node 1704 and/or the third-party databases 1708*a*-1708*n*).

The generative model engine 1720 can execute tasks relating to machine learning inference (e.g., natural language generation based on a generative machine learning model, such as an LLM). The generative model engine 1720 can include software components (e.g., one or more LLMs, and/or API calls to devices associated with such LLMs), hardware components, and/or a combination thereof. To illustrate, the generative model engine 1720 can provide users'prompts to a requested, selected, or determined model (e.g., LLM) to generate a resulting output (e.g., to a user's query within the prompt). As such, the generative model engine 1720 enables flexible, configurable generation of data (e.g., text, code, or other suitable information) based on user input, thereby improving the flexibility of software development or other such tasks. The generative model engine 1720 can communicate with the communication engine 1712, the access control engine 1714, the performance engine 1718, the generative model engine 1720, and/or other components associated with the network 1750 (e.g., the data node 1704 and/or the third-party databases 1708*a*-1708*n*).

Engines, subsystems, or other components of the model orchestration platform 1702 are illustrative. As such, operations, subcomponents, or other aspects of particular subsystems of the model orchestration platform 1702 can be distributed, varied, or modified across other engines. In some implementations, particular engines can be deprecated, added, or removed. For example, operations associated with breach mitigation are performed at the performance engine 1718 instead of at the breach mitigation engine 1716.

Figure 18:
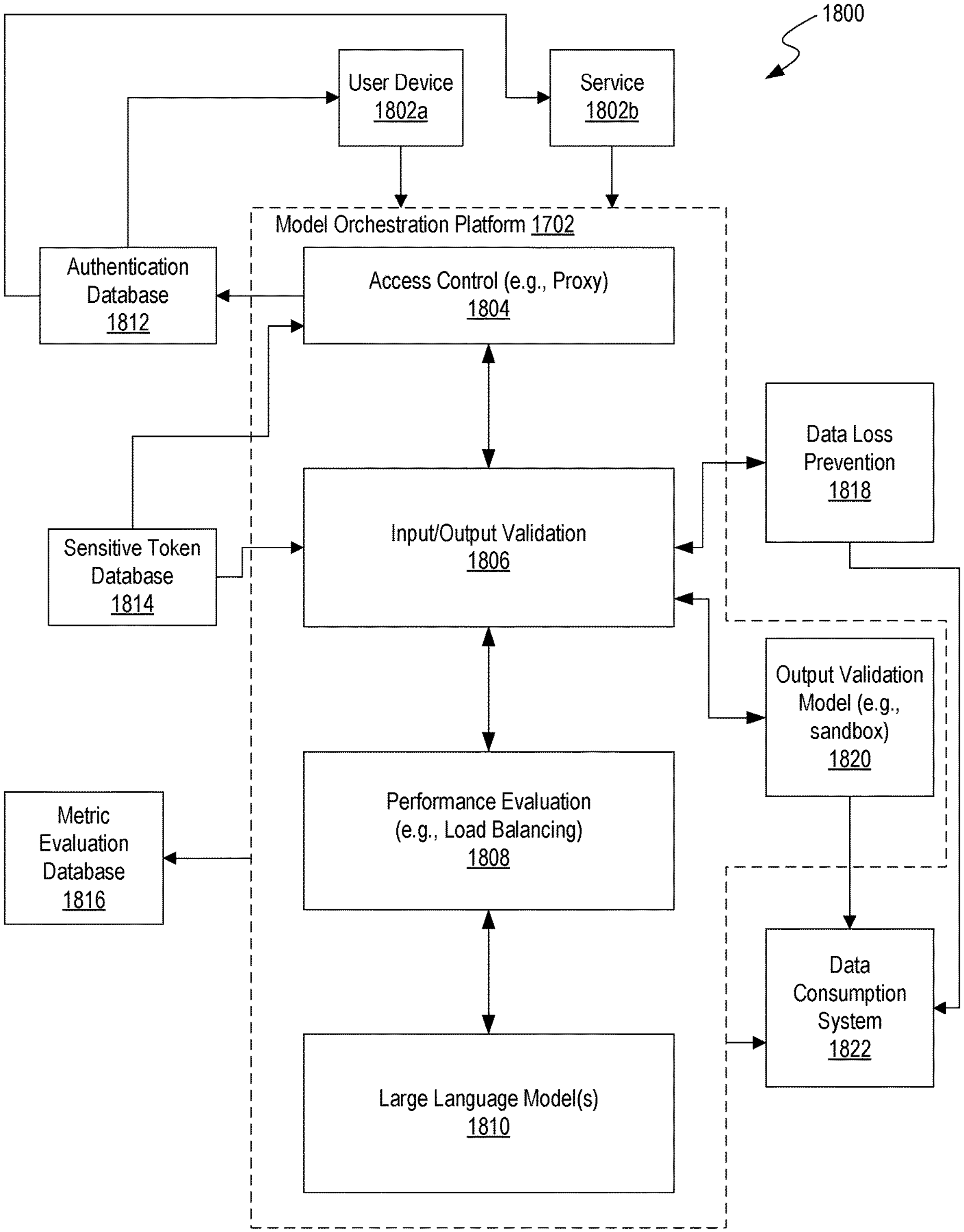
FIG. 18 is a schematic illustrating a process for validating model inputs and outputs, in accordance with some implementations of the present technology.

FIG. 18 is a schematic illustrating a process 1800 for validating model (e.g., agent) inputs and outputs, in accordance with some implementations of the present technology. For example, a user device 1802*a* or a service 1802*b* provides an output generation request (e.g., including an input, such as a prompt, and an authentication token) to the model orchestration platform 1702 (e.g., to the access control engine 1714 for access control 1804 via the communication engine 1712 of FIG. 17). The access control engine 1714 can authenticate the user device 1802*a* or service 1802*b* by identifying stored tokens within an authentication database 1812 that match the provided authentication token. The access control engine 1714 can communicate the prompt to the breach mitigation engine 1716 for input/output validation 1806. The breach mitigation engine 1716 can communicate with a sensitive token database 1814 and/or a data-loss prevention engine 1818, and/or an output validation model 1820 for validation of prompts and/or model outputs. Following input validation, the performance engine 1718 can evaluate the performance of models to route the prompt to an appropriate model (e.g., model(s) 1810). The model orchestration platform 1702 can transmit the generated output to the output validation model 1820 for testing and validation of the output (e.g., to prevent security breaches). The output validation model 1820 can transmit the validated output to a data consumption system 1822, for exposure of the output to the user device 1802*a* and/or the service 1802*b*. In some implementations, the model orchestration platform 1702 can transmit metric values, records, or events associated with the model orchestration platform 1702 to a metric evaluation database 1816 (e.g., an event database) for monitoring, tracking, and evaluation of the model orchestration platform 1702.

A user device (e.g., the user device 1802*a*) and/or a module, component, or service of a development pipeline (e.g., a service 1802*b*) can generate and transmit an output generation request to the model orchestration platform 1702 (e.g., via the communication engine 1712 of FIG. 17). An output generation request can include an indication of a requested output from a machine learning model. The output generation request can include an input, such as a prompt, an authentication token, and/or a user/device identifier of the requester. To illustrate, the output generation request can include a prompt (e.g., a query) requesting data, information, or data processing (e.g., from a model). The prompt can include a natural language question or command (e.g., in English). For example, the prompt includes a request for a model to generate code (e.g., within a specified programming language) that executes a particular operation. Additionally or alternatively, a prompt includes a data processing request, such as a request to extract or process information of a database (e.g., associated with one or more of the third-party databases 1708*a*-1708*n*). The output generation request can be transmitted to the model orchestration platform 1702 using an API call to an API associated with the model orchestration platform 1702 and/or through a graphical user interface (GUI).

The output generation request can include textual and/or non-textual inputs. For example, the output generation request includes audio data (e.g., a voice recording), video data, streaming data, database information, and other suitable information for processing using a machine learning model. For example, the output generation request is a video generation request that includes an image and a textual prompt indicating a request to generate a video based on the image. As such, machine learning models of the model orchestration platform disclosed herein enable inputs of various formats or combinations thereof.

Figure 19:
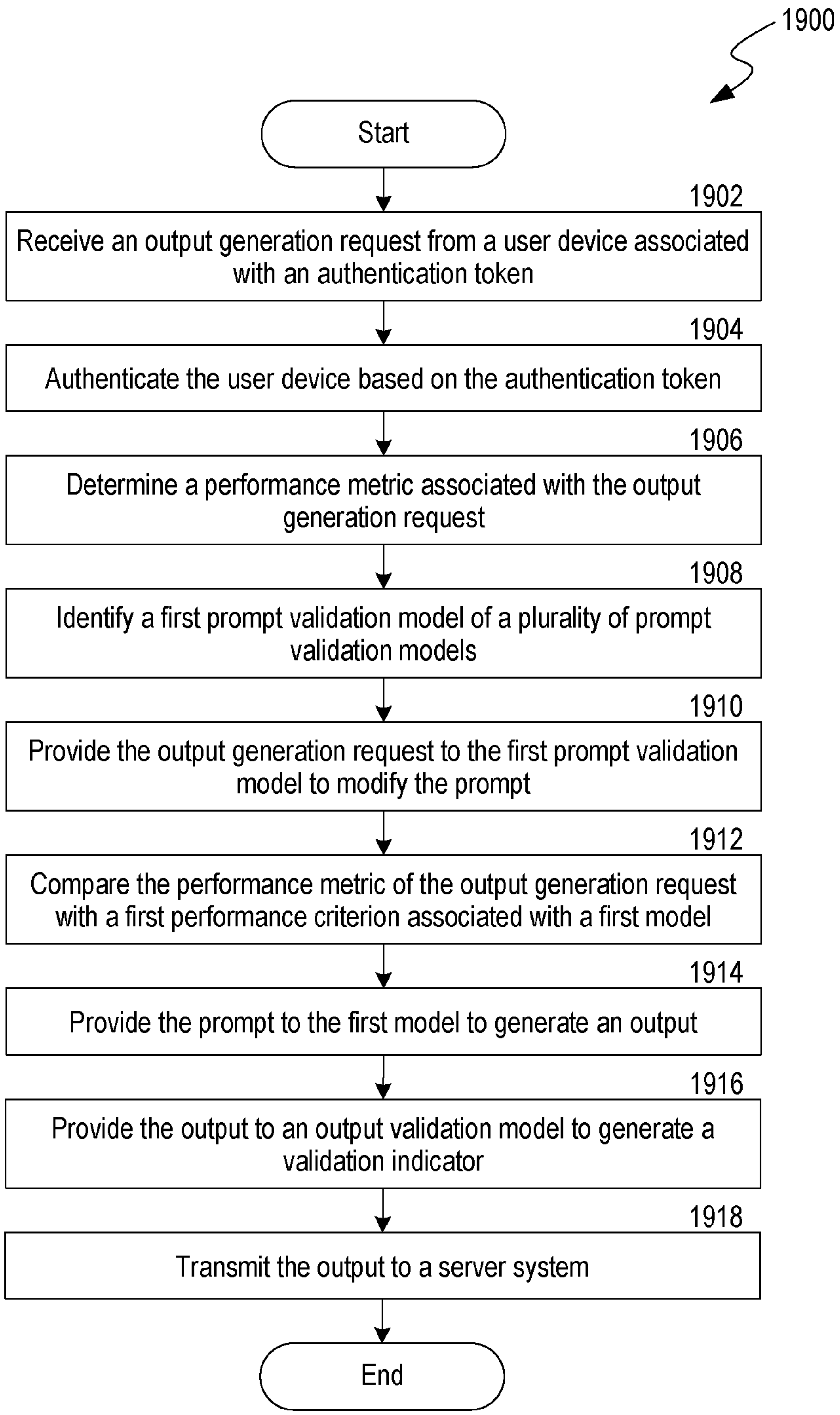
FIG. 19 shows a flow diagram illustrating a process for evaluating natural language prompts for model selection and for validating generated responses, in accordance with some implementations of the present technology.

FIG. 19 shows a flow diagram illustrating a process 1900 for the dynamic evaluation of model prompts and validation of the resulting outputs, in accordance with some implementations of the present technology. For example, the process 1900 is used to generate data and/or code for in the context of data processing or software development pipelines.

At act 1902, process 1900 can receive an output generation request from a user device (e.g., where the user device is associated with an authentication token). For example, the model orchestration platform 1702 receives an output generation request from a user device, where the user device is associated with an authentication token, and where the output generation request includes a prompt for generation of a text-based output using a first model. As an illustrative example, the model orchestration platform 1702 receives a request from a user, through a computing device, indicating a query to request the generation of code for a software application. The request can include a user identifier, such as a username, as well as a specification of a particular requested model architecture. By receiving such a request, the model orchestration platform 1702 can evaluate the prompt and generate a resulting output in an efficient, secure manner.

In some implementations, process 1900 can generate an event record that describes the output generation request. For example, the model orchestration platform 1702 generates, based on the output generation request, an event record including the performance metric value, a user identifier associated with the user device, and the prompt. The model orchestration platform 1702 can transmit, to the server system, the event record for storage in an event database. As an illustrative example, the model orchestration platform 1702 can generate a log of requests from users for generation of outputs (e.g., including the user identifier and associated timestamp). By doing so, the model orchestration platform 1702 can track, monitor, and evaluate the use of system resources, such as models, thereby conferring improved control to system administrators to improve the effectiveness of troubleshooting and system resource orchestration.

At act 1904, process 1900 can authenticate the user. For example, the model orchestration platform 1702 authenticates the user device based on the authentication token (e.g., credentials associated with the output generation request). As an illustrative example, the model orchestration platform 1702 can identify the user associated with the output generation request and determine whether the user is allowed to submit a request (e.g., and/or whether the user is allowed to select an associated model). By evaluating the authentication status of the user, the model orchestration platform 1702 can protect the associated software development pipeline from malicious or unauthorized use.

In some implementations, process 1900 can compare the authentication token with a token stored within an authentication database in order to authenticate the user. For example, the model orchestration platform 1702 determines a user identifier associated with the user device. The model orchestration platform 1702 can determine, from a token database, a stored token associated with the user identifier. The model orchestration platform 1702 can compare the stored token and the authentication token associated with the output generation request. In response to determining that the stored token and the authentication token associated with the output generation request match, the model orchestration platform 1702 can authenticate the user device. As an illustrative example, the model orchestration platform 1702 can compare a first one-time password assigned to a user (e.g., as stored within an authentication database) with a second one-time password provided along with the authentication request. By confirming that the first and second passwords match, the model orchestration platform 1702 can ensure that the user submitting the output generation request is authorized to interact to use the requested models.

At act 1906, process 1900 can determine a performance metric value associated with the output generation request. For example, the model orchestration platform 1702 determines a performance metric value associated with the output generation request, where the performance metric value indicates an estimated resource requirement for the output generation request. As an illustrative example, the model orchestration platform 1702 can determine an estimated memory usage associated with the output generation request (e.g., an estimated memory size needed by the associated model to generate the requested output based on the input prompt). By doing so, the model orchestration platform 1702 can determine the load or burden on the system associated with the user's request, thereby enabling the model orchestration platform 1702 to evaluate and suggest resource use optimization strategies to improve the efficiency of the associated development pipeline.

At act 1908, process 1900 can identify a prompt validation model, for validation of the output generation request, based on an attribute of the request. For example, the model orchestration platform 1702 identifies, based on an attribute of the output generation request, a first prompt validation model of a plurality of prompt validation models (e.g., of a set of input controls). As an illustrative example, the model orchestration platform 1702 can determine a technical application or type of requested output associated with the prompt. The attribute can include an indication that the prompt is requesting code (e.g., for software development purposes). Based on this attribute, the model orchestration platform 1702 can determine a prompt validation model (e.g., an input control) that is suitable for the given prompt or output generation request. By doing so, the model orchestration platform 1702 enables tailored, flexible, and modular controls or safety checks on prompts provided by users, thereby improving the efficiency of the system will targeting possible vulnerabilities in a prompt-specific manner.

At act 1910, process 1900 can provide the output generation request to the identified model for modification of the prompt. For example, the model orchestration platform 1702 provides the output generation request to the first prompt validation model to modify the prompt. As an illustrative example, the model orchestration platform 1702 can execute one or more input controls to evaluate the prompt, including trace injection, prompt injection, logging, secret redaction, sensitive data detection, prompt augmentation, or input validation. By doing so, the model orchestration platform 1702 can improve the accuracy, security, and stability of prompts that are subsequently provided to models, thereby preventing unintended data leakage (e.g., of sensitive information), malicious prompt manipulation, or other adverse effects.

In some implementations, process 1900 can replace or hide sensitive data within the user's prompt. For example, the model orchestration platform 1702 determines that the prompt includes a first alphanumeric token. The model orchestration platform 1702 can determine that one or more records in a sensitive token database include a representation of the first alphanumeric token. The model orchestration platform 1702 can modify the prompt to include a second alphanumeric token in lieu of the first alphanumeric token, where the sensitive token database does not include a record representing the second alphanumeric token. As an illustrative example, the model orchestration platform 1702 can detect that the prompt includes sensitive information (e.g., PII), such as users'personal names, social security numbers, or birthdays. By masking such information, the model orchestration platform 1702 can ensure that such sensitive information is not leaked to or provided to external systems (e.g., via an API request to an externally housed model), thereby mitigating security breaches associated with model use.

In some implementations, process 1900 can remove forbidden tokens from the user's prompt. For example, the model orchestration platform 1702 determines that the prompt includes a forbidden token. The model orchestration platform 1702 can generate the modified prompt by omitting the forbidden token. As an illustrative example, the model orchestration platform 1702 can determine whether the user's prompt includes inappropriate or impermissible tokens, such as words, phrases, or sentences that are associated with swear words. The model orchestration platform 1702 can mask or replace such inappropriate tokens, thereby improving the quality of inputs to the target model and preventing unintended or undesirable outputs as a result.

In some implementations, process 1900 can inject a trace token into the user's prompt to improve model evaluation and tracking capabilities. For example, the model orchestration platform 1702 can generate a trace token comprising a traceable alphanumeric token. The model orchestration platform 1702 can generate the modified prompt to include the trace token. As an illustrative example, the model orchestration platform 1702 can inject (e.g., by modifying the prompt to include) tokens, such as characters, words, or phrases, that are designed to enable tracking, evaluation, or monitoring of the prompt any resulting outputs. By doing so, the model orchestration platform 1702 enables evaluation and troubleshooting with respect to model outputs (e.g., to detect or prevent prompt manipulation or interception of the prompt or output by malicious actors).

At act 1912, process 1900 can compare the performance metric value with a performance criterion (e.g., a threshold metric value) that is related to the model associated with the output generation request. For example, the model orchestration platform 1702 compares the performance metric value of the output generation request with a first performance criterion associated with the first model of a plurality of models. As an illustrative example, the model orchestration platform 1702 can compare a requirement of system resources for execution of the model using the given prompt with a threshold value (e.g., as associated with the model, the user, and/or the attribute of the output generation request). For example, the model orchestration platform 1702 can compare an estimated system memory usage for use of the model with an available system memory availability to determine whether the model can be used without adversely affecting the associated computing system. By doing so, the model orchestration platform 1702 can prevent unintended system-wide issues regarding resource use.

In some implementations, process 1900 can generate a cost metric value and determine whether the cost metric value satisfies a threshold cost (e.g., a threshold associated with the performance criterion). For example, the model orchestration platform 1702 generates a cost metric value associated with the estimated resource requirement for the output generation request. The model orchestration platform 1702 can determine a threshold cost associated with the first model. The model orchestration platform 1702 can determine that the cost metric value satisfies the threshold cost. As an illustrative example, the model orchestration platform 1702 can determine a monetary cost associated with running the model with the requested prompt. Based on determining that the cost is greater than a threshold cost (e.g., a remaining budget within the user's allotment), the model orchestration platform 1702 can determine not to provide the prompt to the model. Additionally or alternatively, the model orchestration platform 1702 can determine that the cost is less than the threshold cost and, in response to this determination, proceed to provide the prompt to the model. By doing so, the model orchestration platform 1702 provides improved flexibility and/or control over the use of system resources (including memory, computational, and/or financial resources), enabling optimization of the associated development pipeline.

At act 1914, process 1900 can provide the prompt (e.g., as modified by suitable prompt validation models) to the model generate the requested output. For example, in response to determining that the performance metric satisfies the first performance criterion, the model orchestration platform 1702 provides the prompt to the first model to generate an output. As an illustrative example, the model orchestration platform 1702 can generate a vector representation of the prompt (e.g., using a vectorization system and/or the vector database) and provide the vector representation to a transformer model and/or a neural network associated with an model (e.g., through an API call). By doing so, the model orchestration platform 1702 can generate a resulting output (e.g., generated code or natural language data) in response to a query submitted by the user within the prompt.

At act 1916, process 1900 can validate the output from the model. For example, the model orchestration platform 1702 provides the output to an output validation model to generate a validation indicator associated with the output. As an illustrative example, the model orchestration platform 1702 can validate the output of the model to prevent security breaches or unintended behavior. For example, the model orchestration platform 1702 can review output text using a toxicity detection model and determine an indication of whether the output is valid or invalid. In some implementations, the model orchestration platform 1702 can determine a sentiment associated with the output and modify the output (e.g., by resubmitting the output to the model) to modify the sentiment associated with the output. By doing so, the model orchestration platform 1702 can ensure the accuracy, utility, and reliability of generated data.

In some implementations, process 1900 can validate the output by generating and testing an executable program compiled on the basis of the output. For example, the model orchestration platform 1702 extracts a code sample from the output, where the code sample includes code for a software routine. The model orchestration platform 1702 can compile, within a virtual machine of the system, the code sample to generate an executable program associated with the software routine. The model orchestration platform 1702 can execute, within the virtual machine, the software routine using the executable program. The model orchestration platform 1702 can detect an anomaly in the execution of the software routine. In response to detecting the anomaly in the execution of the software routine, the model orchestration platform 1702 can generate the validation indicator to include an indication of the anomaly. As an illustrative example, the model orchestration platform 1702 can generate a validation indicator based on determining that the output contains code and testing the code (and/or the compiled version of the code) in an isolated environment for potential adverse effects, viruses, or bugs. By doing so, the model orchestration platform 1702 can ensure the safety and security of generated code, thereby protecting the software development pipeline from security breaches or unintended behavior.

At act 1918, process 1900 can enable access to the output by the user. For example, in response to generating the validation indicator, the model orchestration platform 1702 transmits the output to a server system enabling access to the output by the user device. As an illustrative example, the model orchestration platform 1702 can provide the output to a server that enables users to access the output data (e.g., through login credentials) for consumption of the data and/or use in other downstream applications. As such, the model orchestration platform 1702 provides a robust, flexible, and modular way to validate model-generated content.

Dynamic Agent Selection Using the Model Orchestration Platform

The model orchestration platform disclosed herein enables dynamic model (e.g., LLM, agent) selection for processing inputs (e.g., prompts) to generate associated outputs (e.g., responses to the prompts). For example, the model orchestration platform can redirect a prompt to a second model (e.g., distinct from the first model selected by the user within the output generation request). Additionally or alternatively, the model orchestration platform operates with other suitable machine learning model algorithms, inputs (e.g., including images, multimedia, or other suitable data), and outputs (e.g., including images, video, or audio). By doing so, the model orchestration platform 1702 can mitigate adverse system performance (e.g., excessive incurred costs or overloaded memory devices or processors) by estimating system effects associated with the output generation request (e.g., the prompt) and generating an output using an appropriate model.

FIG. 20 shows a schematic of a data structure 2000 illustrating a system state and associated threshold metric values, in accordance with some implementations of the present technology. For example, the data structure 2000 includes usage values 2004 and maximum values 2006 for performance metrics 2002. The model orchestration platform 1702 can determine threshold metric values based on data associated with system performance (e.g., at the time of receipt of the output generation request). By doing so, the model orchestration platform 1702 enables dynamic evaluation of requests for output generation, as well as dynamic selection of suitable models with which to process such requests.

As discussed in relation to FIG. 18 above, a performance metric can include an attribute of a computing system that characterizes system performance. For example, the performance metric is associated with monetary cost, system memory, system storage, processing power (e.g., through a CPU or a GPU), and/or other suitable indications of performance. The system state (e.g., a data structure associated with the system state) can include information relating to performance metrics 2002, such as CPU usage, memory usage, hard disk space usage, a number of input tokens (e.g., system-wide, across one or more models associated with the model orchestration platform 1702), and/or cost incurred. The data structure 2000 corresponding to the system state can include usage values 2004 and maximum values 2006 associated with the respective performance metrics 2002.

In some implementations, the model orchestration platform 1702 determines a threshold metric value (e.g., of the threshold metric values 2008 of FIG. 20) based on a usage value and maximum value for a corresponding performance metric (e.g., of performance metrics 2002). For example, the model orchestration platform 1702 determines a cost incurred up to a given point of time or within a predetermined time period associated with machine learning models of the model orchestration platform 1702. The cost incurred can be stored as a usage value within the system state. For example, the usage value includes an indication of a sum of metric values for previous output generation requests, inputs (e.g., textual or non-textual prompts), or output generation instances associated with the system. The system state can include an indication of an associated maximum, minimum, or otherwise limiting value for the cost incurred or other performance metrics (e.g., an associated maximum value). By storing such information, the model orchestration platform 1702 can determine a threshold metric value associated with generating an output using the selected model based on the prompt.

For example, the model orchestration platform 1702 determines the threshold metric value based on a difference between the usage value and the maximum value. The model orchestration platform 1702 can determine a threshold metric value associated with a cost allowance for processing a prompt based on a difference between a maximum value (e.g., a maximum budget) and a usage value (e.g., a cost incurred). As such, the model orchestration platform 1702 can handle situations where the system's performance metric changes over time.

In some implementations, the model orchestration platform 1702 can determine or predict a threshold metric value based on providing the output generation request and the system state to a threshold evaluation model. For example, the model orchestration platform 1702 can provide the input, the indication of a selected model, and information of the system state to the threshold evaluation model to predict a threshold metric value. To illustrate, the model orchestration platform 1702 can predict a future system state (e.g., a time-series of performance metric values associated with the system) based on the output generation request, the current system state, and the selected model. The model orchestration platform 1702 can estimate an elapsed time for the generation of output using the requested model; based on this elapsed time, the model orchestration platform 1702 can determine a predicted system state throughout the output generation, thereby enabling more accurate estimation of the threshold metric value. The threshold evaluation model can be trained on historical system usage (e.g., performance metric value) information associated with previous output generation requests. As such, the model orchestration platform 1702 enables the determination of threshold metric values on a dynamic, pre-emptive basis, thereby improving the ability of the model orchestration platform 1702 to predict and handle future performance issues.

In some implementations, the system state is generated with respect to a particular user and/or group of users. For example, the model orchestration platform 1702 determines a system state associated with a subset of resources assigned to a given user or group of users. To illustrate, the model orchestration platform 1702 can determine a maximum cost value associated with output generation for a given user or subset of users of the model orchestration platform 1702. For example, the maximum cost value corresponds to a budget (e.g., a finite set of monetary resources) assigned to a particular group of users, as identified by associated user identifiers. Furthermore, the usage value can be associated with this particular group of users (e.g., corresponding to the generation of outputs using models by users of the group). As such, the model orchestration platform 1702 can determine an associated threshold metric value that is specific to the particular associated users. By doing so, model orchestration platform 1702 enables flexible, configurable requirements and limits to system resource usage based on the identity of users submitting prompts.

In some implementations, the model orchestration platform 1702 determines an estimated performance metric value, as discussed in relation to FIG. 18. For example, the model orchestration platform 1702 generates the estimated performance metric value based on a performance metric evaluation model. A performance metric evaluation model can include an artificial intelligence model (e.g., or another suitable machine learning model) that is configured to predict performance metric values associated with generating outputs using machine learning models (e.g., agents, LLMs). For example, the performance metric evaluation model can generate an estimated cost value for processing a prompt using the first model to generate the associated output. In some implementations, the performance metric evaluation model is trained using previous prompts and associated performance metric values. The performance metric evaluation model can be specific to a particular machine learning model or LLM. Additionally or alternatively, the performance metric evaluation model accepts an indication of a machine learning model as an input to generate the estimated performance metric value.

In some implementations, the model orchestration platform 1702 evaluates the suitability of a prompt for a given model based on comparing a composite metric value with a threshold composite value. For example, the model orchestration platform 1702 generates a composite performance metric value based on a combination of performance metrics (e.g., the performance metrics 2002 as shown in FIG. 20). To illustrate, the model orchestration platform 1702 can generate a composite performance metric based on multiple performance metrics of the computing system associated with the machine learning models. Based on the metric, the model orchestration platform 1702 can generate an estimated composite metric value corresponding to the composite metric (e.g., by calculating a product of values associated with the respective performance metrics) and compare the estimated composite metric value with an associated threshold metric value. As such, model orchestration platform 1702 enables a more holistic evaluation of the effect of a given output generation request on system resources, thereby improving the accuracy and efficiency of the model orchestration platform 1702 in selecting a suitable model. In some implementations, the model orchestration platform 1702 can assign particular performance metrics a respective weight and calculate a value for the composite metric accordingly. Accordingly, the model orchestration platform 1702 enables the prioritization of relevant performance metrics (e.g., cost) over other metrics (e.g., memory usage) according to system requirements.

Figure 21:
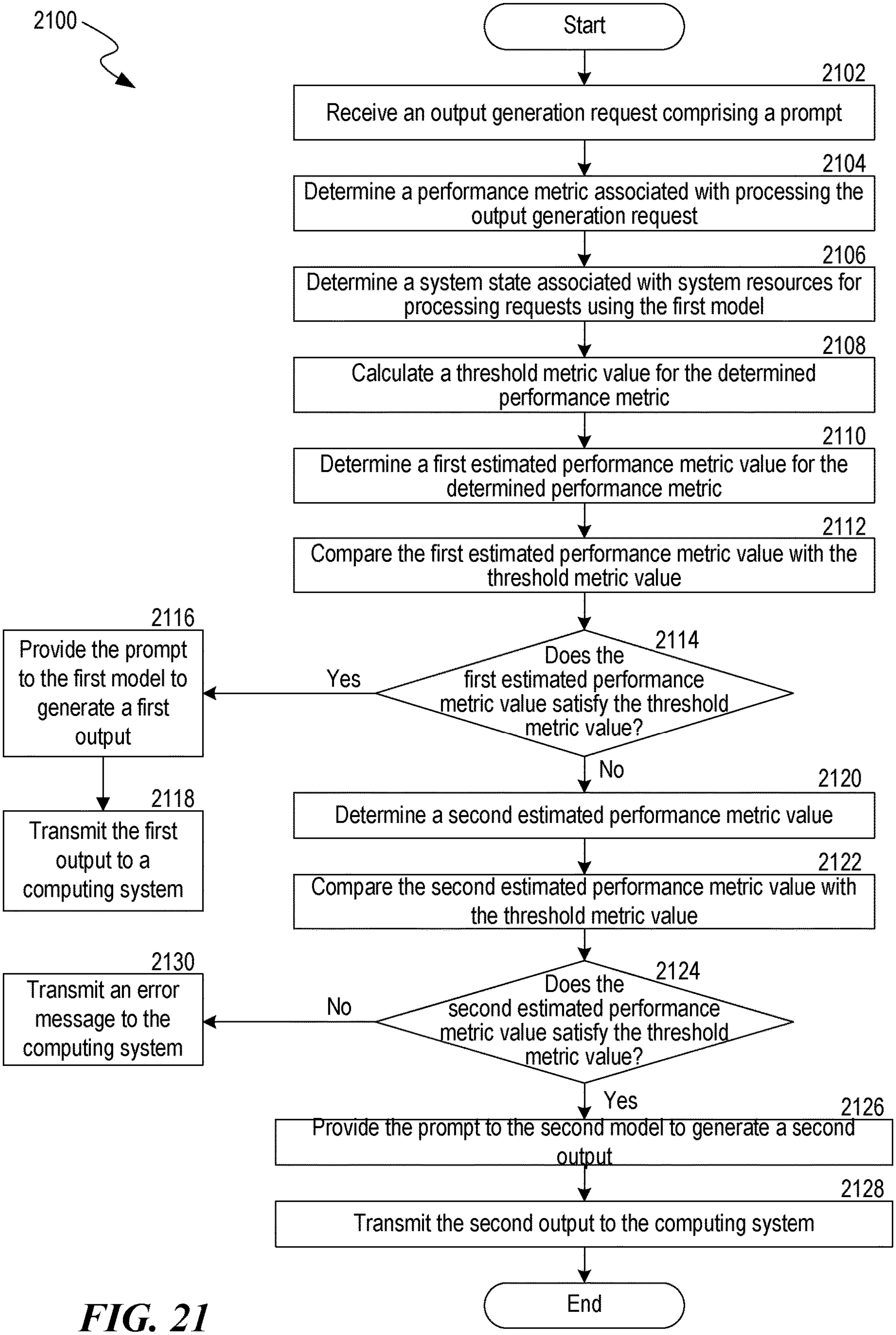
FIG. 21 shows a flow diagram illustrating a process for dynamic selection of models based on an evaluation of user prompts, in accordance with some implementations of the present technology.

FIG. 21 shows a flow diagram illustrating a process 2100 for dynamic selection of models based on evaluation of user inputs (e.g., prompts), in accordance with some implementations of the present technology. For example, the process 2100 enables selection of an model for generation of an output (e.g., software-related code samples) based on an input (e.g., a text-based prompt) to prevent overuse of system resources (e.g., to ensure that sufficient system resources are available to process the request).

At act 2102, the process 2100 can receive an input for generation of an output using a model. For example, the process 2100 receives, from a user device, an output generation request comprising an input (e.g., prompt) for generation of an output using a first model (e.g., an agent) of a plurality of models. As an illustrative example, the model orchestration platform 1702 (e.g., through the communication engine 1712) receives a prompt indicating a desired output, such as a text-based instruction for the generation of software-related code samples (e.g., associated with a particular function). The output generation request can include an indication of a selected model (e.g., agent) for processing the prompt. As such, the model orchestration platform 1702 can evaluate the effect of generating an output using the selected model based on the prompt (e.g., or other suitable inputs) on the basis of the content or nature of the request (e.g., based on a user identifier associated with the request).

At act 2104, the process 2100 can determine a performance metric associated with processing the output generation request. For example, the process 2100 determines a performance metric associated with processing the output generation request. As an illustrative example, the model orchestration platform 1702 can determine one or more performance metrics that characterize the behavior of the system (e.g., when providing inputs to a model for generation of an output). Such performance metrics can include CPU utilization, cost (e.g., associated with the operation of the system and/or the associated models), memory usage, storage space, and/or number of input or output tokens associated with MODELs. In some implementations, the model orchestration platform 1702 (e.g., through the performance engine 1718) determines multiple performance metrics (e.g., associated with the system state) for evaluation of the effects (e.g., of generating an output based on the prompt) on the system.

At act 2106, the process 2100 can determine a system state associated with system resources. For example, the process 2100 determines a system state associated with system resources for processing requests using the first model of the plurality of models. As an illustrative example, the performance engine 1718 dynamically determines a state of the system (e.g., with respect to the determined performance metrics). The system state can include an indication of values associated with performance metrics (e.g., usage values, such as CPU utilization metric values, memory usage values, hard disk space usage values, numbers of input tokens previously submitted to models within the system, and/or values of incurred cost). For example, the model orchestration platform 1702, through communication engine 1712 can query a diagnostic tool or program associated with the computing system and/or an associated database to determine values of the performance metrics. In some implementations, the system state includes maximum, minimum, or other limiting values associated with the performance metric values (e.g., a maximum cost/budget, or a maximum available memory value). By receiving information relating to the system state and associated restrictions, the model orchestration platform 1702 can evaluate the received prompt to determine whether the selected model is suitable for generating an associated output.

At act 2108, the process 2100 can calculate a threshold metric value (e.g., associated with the output generation request). For example, the process 2100 can calculate, based on the system state, a threshold metric value for the determined performance metric. As an illustrative example, the model orchestration platform 1702 (e.g., through the performance engine 1718) determines an indication of computational or monetary resources available for processing the input or prompt (e.g., to generate an associated output). The model orchestration platform 1702 can determine an available budget (e.g., a threshold cost metric) and/or available memory space (e.g., remaining space within a memory device of the system) for processing the request. By doing so, the model orchestration platform 1702 can evaluate the effect of generating an output based on the prompt using the specified model (e.g., agent) with respect to system requirements or constraints.

In some implementations, the model orchestration platform 1702 (e.g., through performance engine 1718) can determine the threshold metric value to include the allowance value. For example, the performance engine 1718 determines that the performance metric corresponds to a cost metric. The performance engine 1718 can determine a maximum cost value associated with output generation associated with the system. The performance engine 1718 can determine, based on the system state, a sum of cost metric values for previous output generation requests associated with the system. The performance engine 1718 can determine, based on the maximum cost value and the sum, an allowance value corresponding to the threshold metric value. The performance engine 1718 can determine the threshold metric value comprising the allowance value. As an illustrative example, the performance engine 1718 determines a remaining budget associated with model operations. By doing so, the performance engine 1718 can mitigate cost overruns associated with output text generation, thereby improving the efficiency of the model orchestration platform 1702.

In some implementations, the model orchestration platform 1702 (e.g., through the performance engine 1718) can determine the threshold metric value based on a user identifier and corresponding group associated with the output generation request. For example, the model orchestration platform 1702 determines, based on the output generation request, a user identifier associated with a user of the user device. The performance engine 1718 can determine, using the user identifier, a first group of users, wherein the first group comprises the use. The performance engine 1718 can determine the allowance value associated with the first group of users. As an illustrative example, the performance engine 1718 determines an allowance value (e.g., a budget) that is specific to a group of users associated with the user identifier (e.g., a username) of the output generation request. As such, the model orchestration platform 1702 enables tracking of resources assigned or allocated to particular groups of users (e.g., teams), thereby improving the flexibility of allocation of system resources.

In some implementations, the model orchestration platform 1702 (e.g., through the performance engine 1718) can determine the threshold metric value based on a usage value for a computational resource. For example, the model orchestration platform 1702 determines that the performance metric corresponds to a usage metric for a computational resource. The performance engine 1718 can determine an estimated usage value for the computational resource based on the indication of an estimated computational resource usage by the first model (e.g., agent) when processing the input (e.g., prompt) with the first model. The performance engine 1718 can determine a maximum usage value for the computational resource. The performance engine 1718 can determine, based on the system state, a current resource usage value for the computational resource. The performance engine 1718 can determine, based on the maximum usage value and the current resource usage value, an allowance value corresponding to the threshold metric value. The performance engine 1718 can determine the threshold metric value comprising the allowance value. As an illustrative example, the performance engine 1718 can determine a threshold metric value based on a remaining available set of resources that are idle (e.g., processors that are not being used or free memory). As such, the model orchestration platform 1702 enables dynamic evaluation of the state of the system for determination of whether sufficient resources are available for processing the output.

At act 2110, the process 2100 can determine an estimated performance metric value associated with processing the output generation request. For example, the process 2100 determines a first estimated performance metric value for the determined performance metric based on an indication of an estimated resource usage by the first model when processing the input included in the output generation request. As an illustrative example, the model orchestration platform 1702 determines a prediction for resource usage for generating an output using the indicated model (e.g., an agent associated with the determined performance metric). The model orchestration platform 1702 (e.g., through the performance engine 1718) can determine a number of input tokens within the input or prompt and predict a cost and/or a memory usage associated with processing the prompt using the selected model. By doing so, the model orchestration platform 1702 can evaluate the effects of processing the input on system resources for evaluation of the suitability of the model for generating the requested output.

In some implementations, the model orchestration platform 1702 generates a composite performance metric value based on more than one performance metric. For example, the performance engine 1718 determines that the performance metric includes a composite metric associated with a plurality of system metrics. The performance engine 1718 can determine, based on the system state, a threshold composite metric value. The performance engine 1718 can determine a plurality of estimated metric values corresponding to the plurality of system metrics. Each estimated metric value of the plurality of estimated metric values can indicate a respective estimated resource usage associated with processing the output generation request with the first model. The performance engine 1718 can determine, using the plurality of estimated metric values, a composite metric value associated with processing the output generation request with the first model. The performance engine 1718 can determine the first estimated performance metric value comprising the composite metric value. As an illustrative example, the model orchestration platform 1702 can generate a geometric mean of estimated values associated with various performance metrics (e.g., estimated memory usage, CPU utilization, and/or cost) and determine an associated metric. In some implementations, the model orchestration platform 1702 can generate a weighted geometric mean based on weightings assigned to respective values of the performance metric. By doing so, the model orchestration platform 1702 enables flexible, targeted evaluation of system behavior associated with generating outputs using models.

In some implementations, the model orchestration platform 1702 generates a performance metric value corresponding to a number of input or output tokens. For example, the first estimated performance metric value corresponds to a number of input or output tokens, and wherein the threshold metric value corresponds to a maximum number of tokens. As an illustrative example, the model orchestration platform 1702 determines a number of input tokens (e.g., words or characters) associated with the input or prompt. Additionally or alternatively, the model orchestration platform 1702 determines (e.g., predicts or estimates) a number of output tokens associated with the output in response to the prompt. For example, the model orchestration platform 1702 can estimate a number of output tokens by identifying instructions or words associated with prompt length within the prompt (e.g., an instruction to keep the generated output within a particular limit). By doing so, the model orchestration platform 1702 can compare the number of tokens associated with processing the prompt with an associated threshold number of tokens to determine whether the selected model is suitable for the generation task. As such, the model orchestration platform 1702 can limit wordy or excessive output generation requests, thereby conserving system resources.

In some implementations, the model orchestration platform 1702 generates the estimated performance metric value based on providing the prompt to an evaluation model. For example, the model orchestration platform 1702 provides the input (e.g., the prompt) and an indication of the first model (e.g., agent) to a performance metric evaluation model to generate the first estimated performance metric value. To illustrate, the model orchestration platform 1702 can provide the input to a machine learning model (e.g., an artificial neural network) to generate an estimate of resources used (e.g., an estimated memory usage or cost) based on historical data associated with output generation. By doing so, the model orchestration platform 1702 improves the accuracy of estimated performance metric value determination, thereby mitigating overuse of system resources.

In some implementations, the model orchestration platform 1702 trains the evaluation model based on previous inputs (e.g., prompts) and associated performance metric values. For example, the model orchestration platform 1702 obtains, from a first database, a plurality of training prompts and respective performance metric values associated with providing respective training prompts to the first model. The model orchestration platform 1702 can provide the plurality of training prompts and respective performance metric values to the performance metric evaluation model to train the performance metric evaluation model to generate estimated performance metric values based on prompts. For example, the model orchestration platform 1702 can retrieve previous prompts submitted by users, as well as previous system states when the prompts are submitted to the associated model (e.g., agent). Based on these previous prompts and system states, the model orchestration platform 1702 can train the performance metric evaluation model to generate estimated performance metrics based on inputs.

At act 2112, the process 2100 can compare the first estimated performance metric value with the threshold metric value. As an illustrative example, the model orchestration platform 1702 can determine whether the first estimated performance metric value is greater than, equal to, and/or less than the threshold metric value. At act 2114, the process 2100 can determine whether the first estimated performance metric value satisfies the threshold metric value. (e.g., by determining that the estimated resource usage value is less than or equal to a threshold metric value). For example, the model orchestration platform 1702 can determine whether an estimated cost value associated with processing the prompt using the first model is less than or equal to an allowance value (e.g., a remaining balance within a budget). By doing so, the model orchestration platform 1702 can ensure that the prompt is processed when suitable system resources are available.

At act 2116, the process 2100 can provide the input (e.g., prompt) to the first model in response to determining that the first estimated performance metric value satisfies the threshold metric value. For example, in response to determining that the first estimated performance metric value satisfies the threshold metric value, the process 2100 provides the prompt to the first model to generate a first output by processing the input (e.g., prompt) included in the output generation request. As an illustrative example, the model orchestration platform 1702 can transmit the prompt (e.g., through the communication engine 1712 and/or via an associated API) to the first model for generation of an associated output. To illustrate, the model orchestration platform 1702 can generate a vector representation of the prompt (e.g., through word2vec or another suitable algorithm) and generate a vector representation of the output via the first model. By doing so, the model orchestration platform 1702 can process the user's output generation request with available system resources (e.g., monetary resources or computational resources).

At act 2118, the process 2100 can generate the output for display on a device associated with the user. For example, the process 2100 transmits the first output to a computing system enabling access to the first output by the user device. As an illustrative example, the model orchestration platform 1702 (e.g., through the communication engine 1712) can transmit the output from the first model to a computing system (e.g., a server) from which the user can access the generated output (e.g., through an API call and/or via a user interface). By doing so, the model orchestration platform 1702 enables generation of outputs (e.g., natural language outputs) using models specified by the user when system resources are available to process associated prompts.

At act 2120, the process 2100 can determine a second estimated performance metric value associated with a second model (e.g., agent) in response to determining that the first estimated performance metric value does not satisfy the threshold metric value. For example, in response to determining that the first estimated performance metric value does not satisfy the threshold metric value, the process 2100 determines a second estimated performance metric value for the determined performance metric based on an indication of an estimated resource usage by a second model of the plurality of models when processing the prompt included in the output generation request. As an illustrative example, the model orchestration platform 1702 can determine a second estimate for a cost associated with processing the output with the second model and determine whether this cost estimate is consistent with the threshold cost value (e.g., determine whether the cost is less than the budget available to the user for the output generation request).

At act 2122, the process 2100 can compare the second estimated performance metric value with the threshold metric value. For example, at act 2124, the process 2100 can determine whether the second estimated performance metric value satisfies the threshold metric value. As an illustrative example, the model orchestration platform 1702 can determine whether the cost metric value associated with processing the input (e.g., prompt) with the second model is greater than, less than, and/or equal to the threshold metric value (e.g., associated with an allowance or budget). By doing so, the model orchestration platform 1702 can ensure that sufficient system resources are available for processing the prompt using the second model, thereby enabling redirection of output generation requests to an appropriate model when the selected model is unsuitable due to insufficient resource availability.

At act 2126, the process 2100 can generate a second output by providing the prompt to the second model in response to determining that the second estimated performance metric value satisfies the threshold metric value. For example, the process 2100 provides the prompt to the second model to generate a second output by processing the input (e.g., prompt) included in the output generation request. As an illustrative example, the model orchestration platform 1702 (e.g., through the communication engine 1712) can generate vector representations of the prompt and transmit these (e.g., via an API call) to a device associated with the second model for generation of the associated output. By doing so, the model orchestration platform 1702 enables processing of the output generation request using a model (e.g., the second agent) that satisfies system resource limitations or constraints, thereby improving the resilience and efficiency of the model orchestration platform 1702.

In some implementations, the process 2100 can determine the second model based on a selection of the model by the user. For example, in response to determining that the first estimated performance metric value does not satisfy the threshold metric value, the model orchestration platform 1702 transmits a model (e.g., agent) selection request to the user device. In response to transmitting the model selection request, the model orchestration platform 1702 obtains, from the user device, a selection of the second model. The model orchestration platform 1702 can provide the input (e.g., prompt) to the second model associated with the selection. As an illustrative example, the model orchestration platform 1702 can generate a message for the user requesting selection of another model for generation of an output in response to the prompt. In response to the message, the model orchestration platform 1702 can receive instructions from the user (e.g., via a command or function) for redirection of the prompt to another suitable model that satisfies performance requirements for the system.

In some implementations, the process 2100 can determine the second model based on a selection of the model on a GUI (e.g., from a list of models with performance metrics that satisfy the performance requirements). For example, the model orchestration platform 1702, in response to determining that the first estimated performance metric value does not satisfy the threshold metric value, generates, for display on a user interface of the user device, a request for user instructions, wherein the request for user instructions comprises a recommendation for processing the output generation request with the second model of the plurality of models. In response to generating the request for user instructions, the model orchestration platform 1702 can receive a user instruction comprising an indication of the second model. In response to receiving the user instruction, the model orchestration platform 1702 can provide the prompt to the second model. To illustrate, the model orchestration platform 1702 can generate indications of one or more recommended models with estimated performance metric values (e.g., estimated cost values) that are compatible with the associated threshold performance metric (e.g., a threshold cost metric). By doing so, the model orchestration platform 1702 can present options for models (e.g., that satisfy system performance constraints) for processing the user's prompt, conferring the user with increased control over output generation.

At act 2128, the process 2100 can generate the output for display on a device associated with the user. For example, the process 2100 transmits the second output to the computing system enabling access to the second output by the user device. As an illustrative example, the model orchestration platform 1702 (e.g., through communication engine 1712) transmits the second output to a computing system that enables access to the output by the user (e.g., through an associated API or GUI).

At act 2130, the process 2100 can transmit an error message to the computing system in response to determining that the second estimated performance metric value does not satisfy the threshold metric value. As an illustrative example, the model orchestration platform 1702 (e.g., through the communication engine 1712) can generate a message that indicates that the input (e.g., prompt) is unsuitable for provision the second model due to insufficient resources. Additionally or alternatively, the model orchestration platform 1702 can determine a third model (e.g., agent) with satisfactory performance characteristics (e.g., with a third estimated performance metric value that satisfies the threshold metric value). By doing so, the model orchestration platform 1702 enables generation of an output based on the prompt via a model such that system resources are conserved or controlled.

In some implementations, the process 2100 generates a recommendation for a model by providing the output generation request (e.g., the associated prompt) to a selection model. For example, in response to determining that the first estimated performance metric value does not satisfy the threshold metric value, the model orchestration platform 1702 generates, for display on a user interface of the user device, a request for user instructions. The request for user instructions can include a recommendation for processing the output generation request with the second model of the plurality of models. In response to generating the request for user instructions, the model orchestration platform 1702 can receive a user instruction comprising an indication of the second model. In response to receiving the user instruction, the model orchestration platform 1702 can provide the input (e.g., prompt) to the second model. As an illustrative example, the model orchestration platform 1702 can evaluate the prompt for selection of a model that is compatible with resource requirements and/or a task associated with the output generation request. For example, the model orchestration platform 1702 can determine an attribute associated with the prompt (e.g., that the prompt is requesting the generation of a code sample) and reroute the prompt to a model that is configured to generate software-related outputs. By doing so, the model orchestration platform 1702 can recommend models that are well-suited to the user's requested task, thereby improving the utility of the disclosed model orchestration platform.

Figure 22:
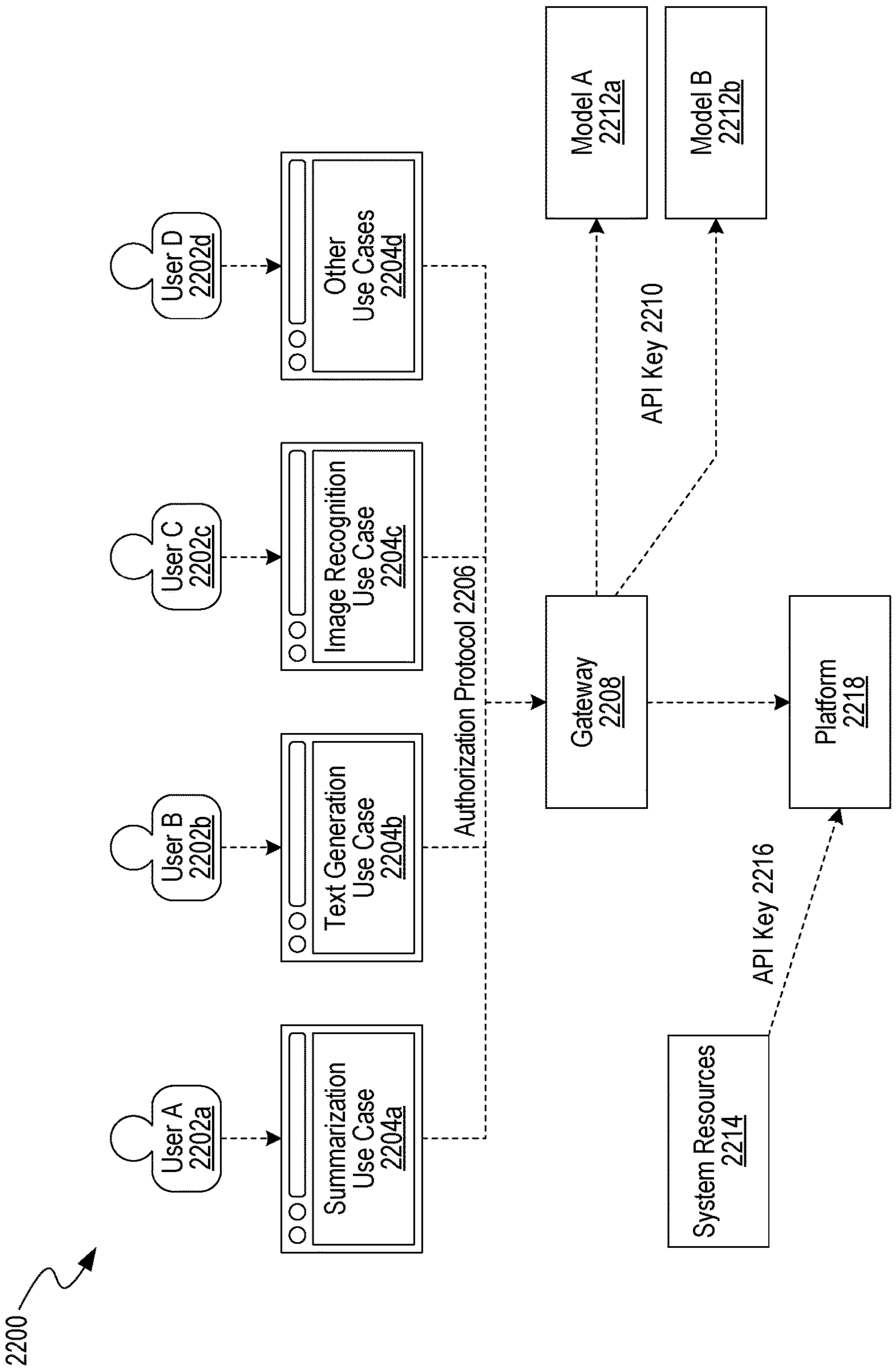
FIG. 22 shows a schematic illustrating an example environment of a platform for dynamically selecting models and infrastructure to process a request with the selected models, in accordance with some implementations of the present technology.

Dynamic Resource-Sensitive Agent Selection Using the Model Orchestration Platform FIG. 22 is an illustrative diagram illustrating an example environment 2200 of a platform 2218 for dynamically selecting models and infrastructure to process a request with the selected models, in accordance with some implementations of the present technology. Environment 2200 includes users 2202_a-d_, use cases 2204_a-d_, authorization protocol 2206, gateway 2208, API key 2210, 2216, models 2212_a-b_, system resources 2214, and platform 2218. Platform 2218 is implemented using components of example computer system 2500 illustrated and described in more detail with reference to FIG. 25. Platform 2218 can be the same as or similar to model orchestration platform 1702 with reference to FIG. 17. Likewise, implementations of example environment 2200 can include different and/or additional components or can be connected in different ways.

Users 2202_a-d_ can each represent different individuals or entities who interact with the platform by submitting inputs (e.g., input inquiry, prompt, query) in an output generation request to be processed subsequently by the platform 2218 to select appropriate models and resources. Each user 2202_a-d_ can have distinct requirements and use cases, such as summarization use case 2204_a_, text generation use case 2204_b_, image recognition use case 2204_c_, and/or other use cases 2204_d_. For example, the summarization use case 2204_a_ can include generating a concise summary of a given text input. The user 2202_a_ submits a text document or a large body of text, and the platform 2218 processes the text document to produce a shorter version that captures the representative points and information of the text document. Additionally, the text generation use case 2204_b_ can include generating new text based on a given prompt or input. The user 2202_b_ provides a starting sentence, topic, or context, and the platform generates coherent and contextually relevant text. For instance, a user can provide a prompt like "Once upon a time in a faraway land," and the platform generates a continuation of the story. Further, the image recognition use case 2204_c_ can include analyzing and identifying objects, features, or patterns within an image. The user 2202_c_ submits an image, and the platform processes the image to recognize and label the contents. For example, a user can upload a photo of a crowded street, and the platform identifies and labels objects such as cars, pedestrians, traffic lights, and buildings.

The authorization protocol 2206 ensures that only authorized users and devices can access the platform 2218 by managing authentication and authorization processes, verifying user identities, and granting appropriate access rights based on predefined policies. The authorization protocol 2206 can include one or more of, for example, multi-factor authentication, OAuth tokens, or other security measures to ensure access control. In some implementations, the authorization protocol can also include biometric verification or hardware-based security modules for improved security. Examples of authorization protocol 2206 and methods of implementing authorization protocol 2206 are discussed with reference to FIG. 23.

The gateway 2208 is an entry point for output generation requests submitted by users 2202_a-d_, routing the output generation requests to the platform 2218. The gateway 2208 can perform load balancing (i.e., distributing requests across multiple platform instances to improve efficiency of resource use and prevent bottlenecks), data transformations (i.e., converting and normalizing input data for compatibility with the platform), and/or protocol translations (e.g., converting HTTP requests to gRPC) to support the interactions between users 2202_a-d_ and the platform 2218. In some implementations, the gateway 2208 is a microservices-based architecture that allows for scalable and modular handling of requests. For example, when user 2202_a_ submits a text summarization request, the gateway 2208 balances the load by directing the request to an available instance (e.g., platform 2218), transforms the data format if needed, and/or translates the protocol to ensure compatibility before transmitting the request to the platform 2218. The platform 2218 processes the request, and the gateway 2208 returns the summarized text to the user.

In some implementations, when a user submits a request, the gateway 2208 first intercepts the request and checks for the presence of a valid API key 2210. The API key 2210, which serves as a unique identifier, is verified against the authorization protocol 2206. API key 2210 is used to authenticate (e.g., via authorization protocol 2206) and authorize API requests to ensure that only valid requests from authorized users or systems are processed by the platform. Once authenticated, the authorization protocol 2206 can check the associated permissions and roles linked to the API key 2210 to determine if the user has the necessary access rights to perform the requested action. If the API key 2210 is valid and the user is authorized, the gateway 2208 routes the request to the appropriate components within the platform 2218. This interaction ensures that only authorized users can access the platform's resources, maintaining the security and integrity of the system. In some implementations, the authorization protocol 2206 can also enforce additional security measures, such as rate limiting and logging, to further protect the platform from unauthorized access and abuse. In some implementations, API key 2210 can be supplemented with JWT (JSON Web Tokens) for stateless authentication and improved security.

Models 2212_a-b_ are the different models (e.g., AI models, machine learning models, LLMs) accessible by the platform 2218. The models 2212_a-b_ can have different capabilities and performance properties or attributes. The platform 2218 dynamically selects the most appropriate model(s) within models 2212_a-b_ based on the output generation request of the user 2202_a-d_ that specifies the use case 2204_a-d_. Methods of dynamically selecting the most appropriate model(s) is discussed in further detail with reference to FIG. 23. The models 2212_a-b_ can include, for example, deep learning models, decision trees, or ensemble methods, depending on the use case 2204_a-d_. In some implementations, the platform can use a model registry to manage and version control the models 2212_a-b_ to ensure that the most up-to-date and accurate versions of models 2212_a-b_ are used for processing the output generation request.

Similarly to API key 2210, API key 2216 can be used to verify the system resources 2214 accessible by the users 2202_a-d_. System resources 2214 include the computational and storage resources used to process output generation request, encompassing CPU, GPU, memory, and/or other software, hardware, and/or network components that the platform allocates dynamically. The platform can use container orchestration tools such as KUBERNETES to manage the system resources 2214. In some implementations, the platform could leverage cloud-based infrastructure for elastic scaling and cost efficiency.

Figure 23:
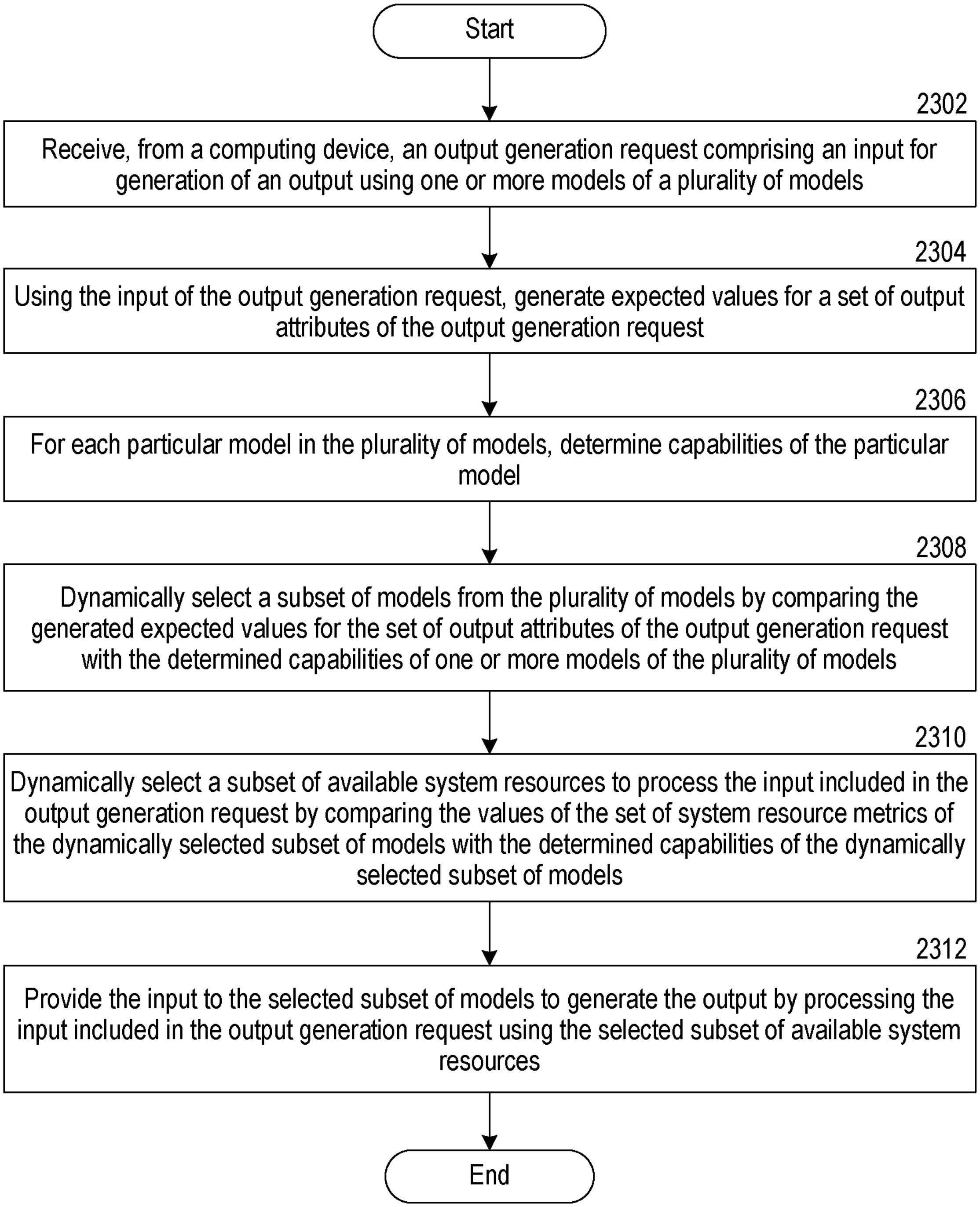
FIG. 23 is a flow diagram illustrating a process for the dynamic selection of models and infrastructure to process the request with the selected models based on an evaluation of user prompts, in accordance with some implementations of the present technology.

FIG. 23 is a flow diagram illustrating a process 2300 for the dynamic selection of models and infrastructure to process the request with the selected models based on evaluation of user prompts, in accordance with some implementations of the present technology. In some implementations, the process 2300 is performed by components of example computer system 2500 illustrated and described in more detail with reference to FIG. 25. Likewise, implementations can include different and/or additional operations or can perform the operations in different orders.

In operation 2302, the system receives, from a computing device, an output generation request including an input (e.g., a prompt, query, input query, request) for generation of an output using one or more models (e.g., AI models) of a plurality of models. In some implementations, at least one AI model in the plurality of AI models is an LLM. The request can be received, for example, via an API endpoint exposed by a gateway (e.g., gateway 2208), which can be the entry point for incoming output generation request. The output generation request can include various parameters such as the type of output desired (e.g., text, image, or data), specific instructions or constraints, and/or metadata about the requestor.

In some implementations, the output generation request includes a predefined query context (e.g., metadata about the requestor) corresponding to a user of the computing device. The predefined query context is a vector representation of one or more expected values for the set of output attributes of the output generation request. The query context can include various types of metadata, such as the user's preferences, historical interaction data, or specific constraints and requirements for the output. For example, if the requestor is a user seeking a text summary, the query context can include information about the preferred summary length, the level of detail required, and any specific sections of the text that should be prioritized.

The vector representation of the query context is typically generated using techniques such as word embeddings, sentence embeddings, or other forms of vectorization that capture the semantic meaning and relationships of the metadata. Text vectorization transforms textual data into a numerical format. The pre-defined query context can be pre-processed, which can include tokenization, normalization, and/or stop word removal. Tokenization is the process of breaking down text into smaller units called tokens. These tokens can be words, phrases, or even individual characters. For instance, the sentence "The quick brown fox jumps over the lazy dog" can be tokenized into individual words like "The", "quick", "brown", "fox", "jumps", "over", "the", "lazy", and "dog". Normalization converts text into a consistent format, making the text easier to process. This can include converting all characters to lowercase, removing punctuation, expanding contractions (e.g., "don't" to "do not"), and handling special characters. Normalization ensures uniformity in the text, reducing variations that could lead to inaccuracies in analysis. For example, normalizing "Don't" and "don't" can result in both being converted to "do not". Stop word removal is the process of filtering out common words that carry little semantic value and are often considered irrelevant for text analysis. These words include "the", "is", "in", "and", etc. Removing stop words helps in focusing on the more meaningful parts of the text. For example, in the sentence "The quick brown fox jumps over the lazy dog", removing stop words would result in "quick", "brown", "fox", "jumps", "lazy", and "dog".

This vector is used to inform and guide the AI models during the output generation process. For instance, a model can adjust its text generation parameters to produce a summary that aligns with the user's historical or recorded preferences for length and detail. The use of a predefined query context allows the system to provide more personalized and contextually relevant outputs, enhancing the overall user experience. Additionally, the query context can be dynamically updated based on the user's interactions and feedback, allowing the system to continuously learn and improve its performance.

In operation 2304, using the prompt of the output generation request, the system generates expected values for a set of output attributes (e.g., output properties, features) of the output generation request. The generated expected values for the set of output attributes of the output generation request can indicate: (1) a type of the output generated from the prompt (e.g., text generation, summarization, image recognition, length of output, format, tone) and (2) a threshold response time of the generation of the output (e.g., low latency, high latency). Natural language processing (NLP) techniques, such as tokenization, part-of-speech tagging, and named entity recognition, can be used to identify the semantic structure and intent of the prompt. Based on this analysis, the system generates expected values for the output attributes.

The type of output refers to the specific format or nature of the generated content. For instance, the system can determine whether the output should be a text summary, a detailed report, an image, or a data visualization. The determination is based on the prompt's content and any predefined query context provided in the request. The system can use classification algorithms or predefined rules to categorize the prompt and assign the appropriate output type. For example, a prompt asking for a summary of a document can result in the system generating a concise text summary, while a prompt requesting an analysis of sales data can lead to the creation of a graphical report.

The threshold response time is an attribute that specifies the maximum allowable time for generating the output. The threshold response time ensures that the system meets performance requirements and provides timely responses to user requests. The system can calculate the threshold response time based on factors such as the complexity of the prompt, the computational resources available, and any user-specified constraints. For instance, a simple text generation task can have a shorter threshold response time compared to a complex image recognition task that uses extensive processing. The threshold response time can be dynamically adjusted based on a current load or resource availability of the system. For example, the system continuously monitors metrics such as CPU and GPU utilization, memory usage, network bandwidth, and active requests. When high load or limited resources are detected, the system increases the threshold response time for new requests to balance the load and prevent delays. Conversely, during low demand periods, the system decreases the threshold response time to provide faster responses. The system can prioritize requests based on the importance, assigning shorter response times to high-priority requests and longer times to lower-priority ones.

In operation 2306, for each particular AI model in the plurality of AI models, the system determines capabilities of the particular AI model. The capabilities can include, for example, (1) values of a set of estimated performance metrics for processing requests using the particular AI model (e.g., the abilities of the models on the platform), and/or (2) values of a set of system resource metrics indicating an estimated resource usage of available system resources for processing the requests using the particular AI model. The available system resources can include hardware resources, software resources, and/or network resources accessible by the computing device to process the output generation request using the particular AI model. Hardware resources can include resources beyond physical hardware, such as virtual machines (VMs). A VM is a software-based emulation of a physical computer that runs an operating system and applications just like a physical computer. Multiple VMs are able to run on a single physical machine, sharing the physical machine's resources such as CPU, memory, and storage. Each VM operates independently and can run different operating systems and applications, and are thus commonly used for tasks such as testing, development, and running multiple applications on a single hardware platform.

The values of the set of estimated performance metrics for each particular AI model in the plurality of AI models can include, for example, response time, accuracy, and/or latency. For example, the system can analyze the model's accuracy in generating text summaries, its response time for image recognition tasks, or its throughput in handling multiple concurrent requests.

The values of the set of system resource metrics for each particular AI model in the plurality of AI models can include, for example, Central Processing Unit (CPU) usage, Graphical Processing Unit (GPU) usage, memory usage, cost, power consumption, and/or network bandwidth. The system assesses the resource consumption patterns of each AI model, considering factors like computational intensity, memory footprint, and data transfer requirements. For instance, a deep learning model for image recognition can have high GPU and memory usage, while an NLP model can use significant CPU and network bandwidth for handling large text datasets.

To determine the capabilities of each AI model, the system can examine the model's architecture (e.g., the number of layers in a neural network), configuration (e.g., the types of operations the model performs), and dependencies (e.g., dependency on specific libraries or frameworks) to estimate the model's resource requirements and performance characteristics (e.g., computational intensity, memory footprint, and potential bottlenecks). In some implementations, the system can execute the model with representative data and capturing metrics such as processing time, accuracy, throughput, CPU and GPU utilization, memory consumption, and network bandwidth usage.

In some implementations, the system obtains a set of operation boundaries (e.g., guidelines, regulatory guidelines) of the plurality of AI models. In some implementations, the system translates guidelines into actionable test cases for evaluating AI model compliance. By parsing and interpreting guidelines (e.g., regulatory documents), the system identifies relevant compliance requirements and operational boundaries that must be complied with plurality of AI models. The system constructs a set of test cases associated with each guideline that covers various scenarios derived from the regulatory requirements. These test cases can include prompts, expected outcomes, and/or expected explanations. For each particular AI model in the plurality of AI models, the system evaluates the particular AI model against the set of test cases to determine compliance of the particular AI model with the set of operation boundaries. The system can generate one or more compliance indicators based on comparisons between expected and actual outcomes and explanations. For example, if the particular AI model's response meets the expected outcome and explanation, the particular AI model receives a positive compliance indicator. If there are discrepancies, the system can flag these as areas requiring further attention or modification. In some implementations, the system can automatically adjust to the parameters of the particular AI model to ensure alignment with regulatory guidelines. By validating each particular AI model, this results in more efficient resource usage so the validation test cases only have to be run once by the platform, rather than every time a user attempts to access a particular AI model.

In operation 2308, the system dynamically selects a subset of AI models from the plurality of AI models by comparing the generated expected values for the set of output attributes of the output generation request with the determined capabilities of the plurality of AI models. This comparison can be performed by assigning a degree to which each model's capabilities align with/satisfy the expected values. For instance, if the request requires a high-accuracy text summary with a short response time, the system assigns a higher degree of alignment/satisfaction to models that have demonstrated high accuracy and low latency in similar tasks in their determined capabilities.

In some implementations, the subset of models is dynamically selected responsive to determining the capabilities of each particular model in the plurality of models. The system can compare the determined capabilities a first model of the plurality of models with the determined capabilities of a second model of the plurality of models. The system can use a scoring mechanism that assigns a compatibility score to each AI model based on how well its capabilities match the expected values. The scoring mechanism can use weighted criteria to prioritize certain attributes over others, depending on the specific requirements of the request. For example, in a real-time application, response time can be weighted more heavily than accuracy, whereas in a medical diagnosis task, accuracy can be the primary criterion. The system aggregates the scores to rank the AI models, identifying those that best meet the overall requirements of the request. The system can normalize the performance metrics and expected values to a common scale to allow different metrics can be compared and aggregated. The system applies weights to each metric based on the importance of the corresponding attribute. The weights can be predefined based on the type of request or dynamically adjusted based on user preferences or contextual factors. For instance, a weight of 0.7 can be assigned to accuracy and 0.3 can be assigned to latency for a medical diagnosis task, reflecting the higher priority of accuracy.

Once the weights are applied, the system calculates a weighted sum for each AI model, representing its overall compatibility score. The score is a composite measure that reflects how well the model's capabilities align with the expected values across all relevant attributes. The system aggregates the scores to rank the AI models, identifying those that best meet the overall requirements of the request. The models with the highest compatibility scores are selected as the subset of AI models for processing the output generation request. In some implementations, the system prioritizes each AI model in the plurality of AI models based on historical performance data of each AI model in the plurality of AI models. The system can store the historical performance data of each AI model in a database accessible by the system. The system updates the historical performance data of one or more AI models in the plurality of AI models after the output generation request is processed.

In some implementations, the system sequentially evaluates each model's capabilities and compares them to the expected values, until a model is found that satisfies the requirements of the output generation request. The system determines the capabilities of a first model in the plurality of models. The system compares the generated expected values for the set of output attributes of the output generation request with the determined capabilities of the first model. Responsive to the determined capabilities of the first model satisfying the generated expected values for the set of output attributes of the output generation request, the system provides the input to the first model to generate the output by processing the input included in the output generation request using the selected subset of available system resources. Responsive to the determined capabilities of the first model not satisfying the generated expected values for the set of output attributes of the output generation request, the system can determine the capabilities of a second model in the plurality of models. Responsive to the determined capabilities of the second model satisfying the generated expected values for the set of output attributes of the output generation request, the system can provide the input to the second model to generate the output by processing the input included in the output generation request using the selected subset of available system resources. The approach ensures that the system quickly identifies a suitable model without the need for exhaustive evaluation of all available models. By stopping the search as soon as a model that meets the expected values is found, the system can efficiently allocate resources and minimize processing time.

In operation 2310, the system dynamically selects a subset of available system resources to process the prompt included in the output generation request by comparing the values of the set of system resource metrics of the dynamically selected subset of AI models with the determined capabilities of the dynamically selected subset of AI models. The system can query resource management modules to obtain real-time data on resource usage across the computing infrastructure. The system assesses the availability of hardware resources, such as the number of free CPU cores, available GPU memory, and storage capacity. The system can additionally or alternatively consider software dependencies, ensuring that the required libraries and frameworks are installed and compatible with the selected models. Additionally, the system evaluates network resources, such as available bandwidth and latency, to ensure that data can be transferred efficiently between components. To perform the comparison, the system can take into account various factors, such as resource constraints, priority levels, and potential contention with other tasks. The system can assign weights (e.g., accessed via an API key) to different resource types based on the resource's respective importance for the specific models and the output generation request. For example, GPU resources can be weighted more heavily for a model that relies on parallel processing, while network bandwidth can be prioritized for a model that requires frequent data transfers.

The dynamically selected subset of available system resources can include a set of shared hardware and a set of dedicated hardware. Shared hardware refers to resources that are concurrently used by multiple tasks or processes, such as general-purpose CPUs, shared GPU clusters, and common storage systems. Dedicated hardware, on the other hand, refers to resources that are exclusively allocated to a specific task or process, such as dedicated GPU instances, specialized accelerators (e.g., TPUs), and isolated memory pools. In some implementations, the system initializes processing the input query included in the output generation request using the set of shared hardware for a predetermined time period. Upon expiration of the predetermined time period, the system continues to process the input query included in the output generation request using the set of dedicated hardware. The transition allows the most resource-intensive stages of the processing are handled by dedicated resources, which can provide higher performance, lower latency, and more predictable execution times.

In some implementations, the system initializes processing the input query included in the output generation request using the set of dedicated hardware for a predetermined time period. Upon expiration of the predetermined time period, the system continues to process the input query included in the output generation request using the set of shared hardware. The transition helps better use resources by offloading less performance-based stages of the processing to shared resources, freeing up dedicated hardware for other high-priority tasks.

In operation 2312, the system provides the prompt to the selected subset of AI models to generate the output by processing the prompt included in the output generation request using the selected subset of available system resources. The routing process can be managed by a task scheduler that coordinates the execution of the models across the allocated system resources. The scheduler ensures that the input data is distributed to the appropriate models, taking into account factors such as data locality, resource availability, and load balancing. For example, if multiple models are running on different GPU instances, the scheduler ensures that the input data is transferred to the correct GPU memory to minimize data transfer latency and maximize processing efficiency. In some implementations, responsive to the generated output, the system automatically transmits, to the computing device, the output within the threshold response time. In some implementations, processing the input included in the output generation request using the dynamically selected subset of available system resources consumes less electrical power than processing the input included in the output generation request using a different subset of available system resources within the set of available system resources.

The output can be a final output. In some implementations, the system provides the prompt to the dynamically selected subset of AI models in parallel. The system can aggregate model-specific outputs from each AI model of the dynamically selected subset of AI models to generate the final output. In some implementations, the system distributes the input prompt across multiple AI models simultaneously, allowing each model to process the data independently and concurrently. The system can partition the input prompt into segments or sub-tasks that can be processed in parallel. For instance, in a text summarization task, the input document can be divided into sections, with each section being processed by a different model. In an image recognition task, different regions of an image can be analyzed by separate models. Once the input prompt is partitioned, the system routes each segment to the corresponding AI model in the dynamically selected subset. Once each AI model has processed the model's segment of the input prompt, the system aggregates the model-specific outputs to generate the final output. For instance, in a text summarization task, the system can merge the summaries generated by each model into a single summary. In an image recognition task, the system can combine the detected objects and features from each model into a single analysis of the input image.

In some implementations, the system provides the prompt to the dynamically selected subset of AI models in a sequence. The system can input a model-specific output from a first AI model of the dynamically selected subset of AI models into a second AI model of the dynamically selected subset of AI models in the sequence. For example, the system can provide the initial prompt to the first AI model in the sequence. The model processes the input data according to its specific capabilities and generates an intermediate output. For example, in an NLP task, the first model can perform tokenization and part-of-speech tagging on the input text. In an image processing task, the first model can perform initial feature extraction or object detection. Once the first model has generated its output, the system takes the model-specific output and inputs the model-specific output into the second AI model in the sequence. The second model processes the intermediate output, further refining or transforming the data. For instance, in the NLP task, the second model can perform named entity recognition or sentiment analysis on the tagged text. In the image processing task, the second model can perform more detailed analysis, such as identifying specific objects or classifying detected features. The sequential processing continues, with each model in the sequence receiving the output from the previous model and generating its own intermediate output. Once the final model in the sequence has processed its input, the system generates the final output.

In some implementations, the system generates a confidence score for a model-specific output generated by each AI model in the selected subset of AI models. The system can aggregate the model-specific outputs using the generated confidence scores. The system selects the model-specific output with a highest confidence score for transmission to the computing device. For example, in an NLP task, a model can calculate its confidence score based on the probability distribution of the generated text, the coherence of the sentences, and the alignment with known linguistic patterns. In an image recognition task, a model can calculate its confidence score based on the clarity of the detected objects, the consistency of the classification results, and the alignment with training data.

The system can receive a set of user feedback on the generated output. The feedback can be collected through various channels, such as user ratings, comments, error reports, or direct interaction with the output. The feedback data can be evaluated by the system to identify patterns, trends, and specific areas for improvement using NLP techniques and sentiment analysis to interpret and categorize the feedback. For example, the system can parse the textual feedback to extract information such as user satisfaction levels, specific issues encountered, and/or suggestions for improvement. The system can use machine learning algorithms, such as support vector machines (SVM) or neural networks, to classify the feedback into different categories, such as accuracy, relevance, performance, and usability. For example, feedback indicating that the output was inaccurate or irrelevant can be categorized under "accuracy issues," while feedback highlighting slow response times can be categorized under "performance issues."

Using the processed feedback, the system can adjust the dynamically selected subset of AI models and/or the dynamically selected subset of available system resources. For the AI models, the system can update the model selection criteria (e.g., assigning a higher weight to criticized areas such as accuracy or latency), retrain or fine-tune the models, or incorporate new models that better address the identified issues. For the system resources, the system can reallocate resources based on the feedback to improve performance and efficiency. For example, if the feedback indicates that the processing time is too slow, the system can allocate more CPU or GPU resources to the task, adjust the data pipelines, or implement more efficient algorithms. Conversely, if the feedback indicates that certain resources are being underutilized, the system can reallocate those resources to other tasks or reduce the overall resource allocation to improve cost efficiency. In some implementations, the system can use a reward-based mechanism where positive feedback leads to reinforcement of the current model and resource configurations, while negative feedback triggers further adjustments.

In some implementations, responsive to the generated output, the system generates for display at the computing device, a layout indicating the output. The layout can include a first representation of each model in the dynamically selected subset of models, a second representation of the dynamically selected subset of available system resources, and/or a third representation of the output.

Example Implementation of the Models of the Model Orchestration Platform

Figure 24:
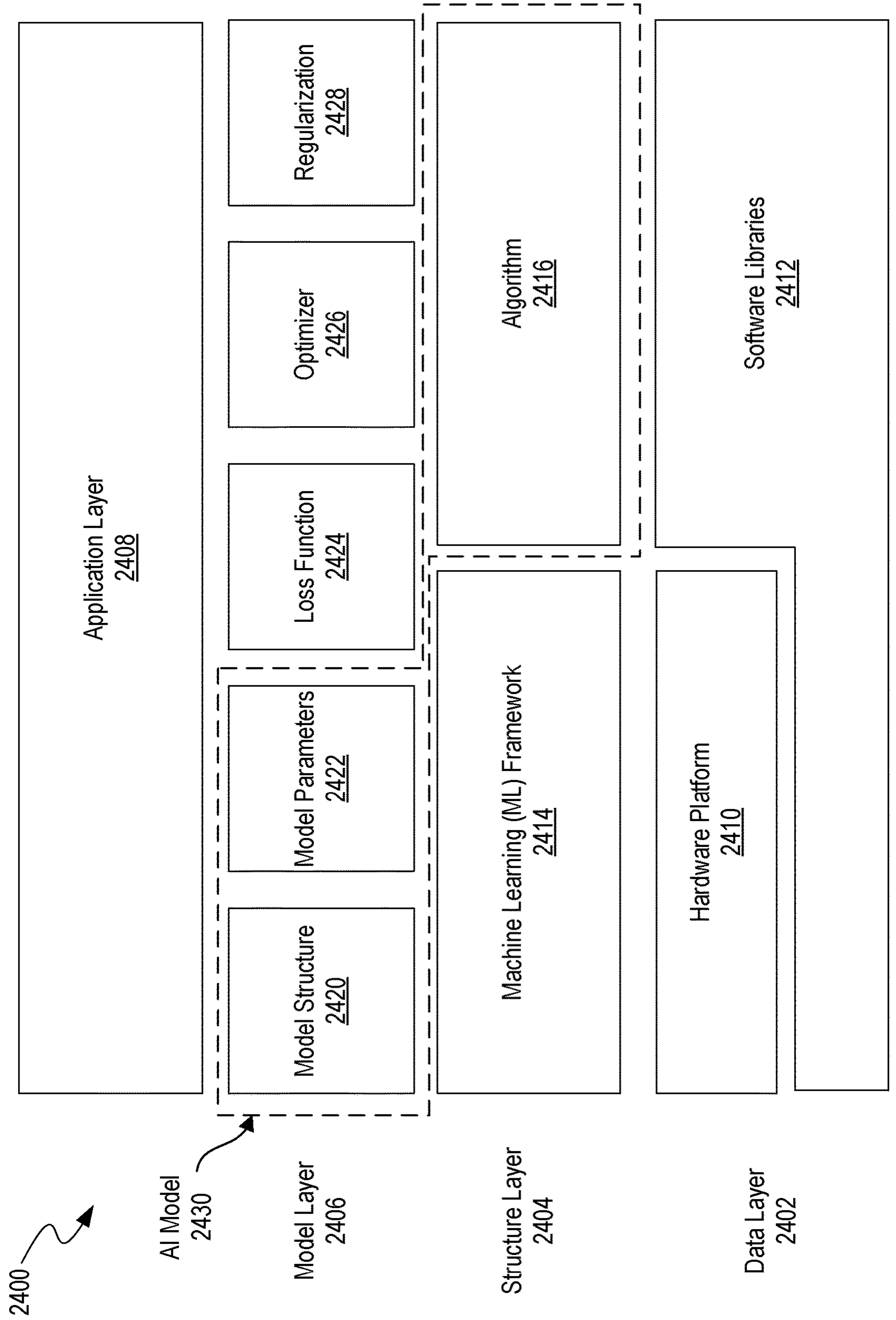
FIG. 24 illustrates a layered architecture of an AI system that can implement the machine learning (ML) models of a model orchestration platform, in accordance with some implementations of the present technology.

FIG. 24 illustrates a layered architecture of an AI system 2400 that can implement the ML models of the model orchestration platform of FIG. 24, in accordance with some implementations of the present technology. Example ML models can include the models executed by the model orchestration platform, such as the agents 116 in FIG. 1. Accordingly, the agents 116 in FIG. 1 can include one or more components of the AI system 2400.

As shown, the AI system 2400 can include a set of layers, which conceptually organize elements within an example network topology for the AI system's architecture to implement a particular AI model (e.g., the AI model 2430). Generally, an AI model is a computer-executable program implemented by the AI system 2400 that analyses data to make predictions. Information can pass through each layer of the AI system 2400 to generate outputs for the AI model. The layers can include a data layer 2402, a structure layer 2404, a model layer 2406, and an application layer 2408. The algorithm 2416 of the structure layer 2404 and the model structure 2420 and model parameters 2422 of the model layer 2406 together form an example AI model. The optimizer 2426, loss function engine 2424, and regularization engine 2428 work to refine and optimize the AI model, and the data layer 2402 provides resources and support for application of the AI model by the application layer 2408.

The data layer 2402 acts as the foundation of the AI system 2400 by preparing data for the AI model. As shown, the data layer 2402 can include two sub-layers: a hardware platform 2410 and one or more software libraries 2412. The hardware platform 2410 can be designed to perform operations for the AI model and include computing resources for storage, memory, logic and networking, such as the resources described in relation to FIGS. 25 and 26. The hardware platform 2410 can process amounts of data using one or more servers. The servers can perform backend operations such as matrix calculations, parallel calculations, machine learning (ML) training, and the like. Examples of servers used by the hardware platform 2410 include CPUs and GPUs. CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 2410 can include computing resources (e.g., servers, memory, etc.) offered by a cloud services provider. The hardware platform 2410 can also include computer memory for storing data about the AI model, application of the AI model, and training data for the AI model. The computer memory can be a form of random-access memory (RAM), such as dynamic RAM, static RAM, and non-volatile RAM.

The software libraries 2412 can be thought of suites of data and programming code, including executables, used to control the computing resources of the hardware platform 2410. The programming code can include low-level primitives (e.g., fundamental language elements) that form the foundation of one or more low-level programming languages, such that servers of the hardware platform 2410 can use the low-level primitives to carry out specific operations. The low-level programming languages do not require much, if any, abstraction from a computing resource's instruction set architecture, enabling them to run quickly with a small memory footprint. Examples of software libraries 2412 that can be included in the AI system 2400 include INTEL Math Kernel Library, NVIDIA cuDNN, EIGEN, and OpenBLAS.

The structure layer 2404 can include an ML framework 2414 and an algorithm 2416. The ML framework 2414 can be thought of as an interface, library, or tool that enables users to build and deploy the AI model. The ML framework 2414 can include an open-source library, an API, a gradient-boosting library, an ensemble method, and/or a deep learning toolkit that work with the layers of the AI system facilitate development of the AI model. For example, the ML framework 2414 can distribute processes for application or training of the AI model across multiple resources in the hardware platform 2410. The ML framework 2414 can also include a set of pre-built components that have the functionality to implement and train the AI model and enable users to use pre-built functions and classes to construct and train the AI model. Thus, the ML framework 2414 can be used to facilitate data engineering, development, hyperparameter tuning, testing, and training for the AI model. Examples of ML frameworks 2414 that can be used in the AI system 2400 include TENSORFLOW, PYTORCH, SCIKIT-LEARN, KERAS, LightGBM, RANDOM FOREST, and AMAZON WEB SERVICES.

The algorithm 2416 can be an organized set of computer-executable operations used to generate output data from a set of input data and can be described using pseudocode. The algorithm 2416 can include complex code that enables the computing resources to learn from new input data and create new/modified outputs based on what was learned. In some implementations, the algorithm 2416 can build the AI model through being trained while running computing resources of the hardware platform 2410. This training enables the algorithm 2416 to make predictions or decisions without being explicitly programmed to do so. Once trained, the algorithm 2416 can run at the computing resources as part of the AI model to make predictions or decisions, improve computing resource performance, or perform tasks. The algorithm 2416 can be trained using supervised learning, unsupervised learning, semi-supervised learning, and/or reinforcement learning.

Using supervised learning, the algorithm 2416 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of the task request 102 in FIG. 1) from various source computing systems described in relation to FIG. 24. Furthermore, training data can include pre-processed data generated by various engines of the model orchestration platform described in relation to FIG. 24. The user may label the training data based on one or more classes and trains the AI model by inputting the training data to the algorithm 2416. The algorithm determines how to label the new data based on the labeled training data. The user can facilitate collection, labeling, and/or input via the ML framework 2414. In some instances, the user may convert the training data to a set of feature vectors for input to the algorithm 2416. Once trained, the user can test the algorithm 2416 on new data to determine if the algorithm 2416 is predicting accurate labels for the new data. For example, the user can use cross-validation methods to test the accuracy of the algorithm 2416 and retrain the algorithm 2416 on new training data if the results of the cross-validation are below an accuracy threshold.

Supervised learning can include classification and/or regression. Classification techniques include teaching the algorithm 2416 to identify a category of new observations based on training data and are used when input data for the algorithm 2416 is discrete. Said differently, when learning through classification techniques, the algorithm 2416 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 2416 can categorize new data by analyzing the new data for features that map to the categories. Examples of classification techniques include boosting, decision tree learning, genetic programming, learning vector quantization, KNN algorithm, and statistical classification.

Regression techniques include estimating relationships between independent and dependent variables and are used when input data to the algorithm 2416 is continuous. Regression techniques can be used to train the algorithm 2416 to predict or forecast relationships between variables. To train the algorithm 2416 using regression techniques, a user can select a regression method for estimating the parameters of the model. The user collects and labels training data that is input to the algorithm 2416 such that the algorithm 2416 is trained to understand the relationship between data features and the dependent variable(s). Once trained, the algorithm 2416 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 2416 learns patterns from unlabeled training data. In particular, the algorithm 2416 is trained to learn hidden patterns and insights of input data, which can be used for data exploration or for generating new data. Here, the algorithm 2416 does not have a predefined output, unlike the labels output when the algorithm 2416 is trained using supervised learning. Said another way, unsupervised learning is used to train the algorithm 2416 to find an underlying structure of a set of data, group the data according to similarities, and represent that set of data in a compressed format. The model orchestration platform can use unsupervised learning to identify patterns in claim history (e.g., to identify particular event sequences) and so forth. In some implementations, performance of the model orchestration platform that can use unsupervised learning is improved because the incoming memories (e.g., the task request 102 in FIG. 1) is pre-processed and reduced, based on the relevant triggers, as described herein.

A few techniques can be used in unsupervised learning: clustering, anomaly detection, and techniques for learning latent variable models. Clustering techniques include grouping data into different clusters that include similar data, such that other clusters contain dissimilar data. For example, during clustering, data with possible similarities remains in a group that has less or no similarities to another group. Examples of clustering techniques density-based methods, hierarchical based methods, partitioning methods, and grid-based methods. In one example, the algorithm 2416 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 2416 may be trained to be an Isolation Forest, local outlier factor (LOF) algorithm, or KNN algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 2416 include factor analysis, item response theory, latent profile analysis, and latent class analysis.

The model layer 2406 implements the AI model using data from the data layer and the algorithm 2416 and ML framework 2414 from the structure layer 2404, thus enabling decision-making capabilities of the AI system 2400. The model layer 2406 includes a model structure 2420, model parameters 2422, a loss function engine 2424, an optimizer 2426, and a regularization engine 2428.

The model structure 2420 describes the architecture of the AI model of the AI system 2400. The model structure 2420 defines the complexity of the pattern/relationship that the AI model expresses. Examples of structures that can be used as the model structure 2420 include decision trees, support vector machines, regression analyses, Bayesian networks, Gaussian processes, genetic algorithms, and artificial neural networks (or, simply, neural networks). The model structure 2420 can include a number of structure layers, a number of nodes (or neurons) at each structure layer, and activation functions of each node. Each node's activation function defines how a node converts data received to data output. The structure layers may include an input layer of nodes that receive input data, an output layer of nodes that produce output data. The model structure 2420 may include one or more hidden layers of nodes between the input and output layers. The model structure 2420 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 2422 represent the relationships learned during training and can be used to make predictions and decisions based on input data. The model parameters 2422 can weigh and bias the nodes and connections of the model structure 2420. For instance, when the model structure 2420 is a neural network, the model parameters 2422 can weight and bias the nodes in each layer of the neural networks, such that the weights determine the strength of the nodes and the biases determine the thresholds for the activation functions of each node. The model parameters 2422, in conjunction with the activation functions of the nodes, determine how input data is transformed into desired outputs. The model parameters 2422 can be determined and/or altered during training of the algorithm 2416.

The loss function engine 2424 can determine a loss function, which is a metric used to evaluate the AI model's performance during training. For instance, the loss function engine 2424 can measure the difference between a predicted output of the AI model and the actual output of the AI model and is used to guide optimization of the AI model during training to minimize the loss function. The loss function may be presented via the ML framework 2414, such that a user can determine whether to retrain or otherwise alter the algorithm 2416 if the loss function is over a threshold. In some instances, the algorithm 2416 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 2426 adjusts the model parameters 2422 to minimize the loss function during training of the algorithm 2416. In other words, the optimizer 2426 uses the loss function generated by the loss function engine 2424 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 2426 used may be determined based on the type of model structure 2420 and the size of data and the computing resources available in the data layer 2402.

The regularization engine 2428 executes regularization operations. Regularization is a technique that prevents over- and under-fitting of the AI model. Overfitting occurs when the algorithm 2416 is overly complex and too adapted to the training data, which can result in poor performance of the AI model. Underfitting occurs when the algorithm 2416 is unable to recognize even basic patterns from the training data such that it cannot perform well on training data or on validation data. The optimizer 2426 can apply one or more regularization techniques to fit the algorithm 2416 to the training data properly, which helps constrain the resulting AI model and improves its ability for generalized application. Examples of regularization techniques include lasso (L1) regularization, ridge (L2) regularization, and elastic (L1 and L2 regularization).

The application layer 2408 describes how the AI system 2400 is used to solve problems or perform tasks. In an example implementation, the application layer 2408 can include a front-end user interface of the model orchestration platform.

Example Computing Environment of the Model Orchestration Platform

Figure 25:
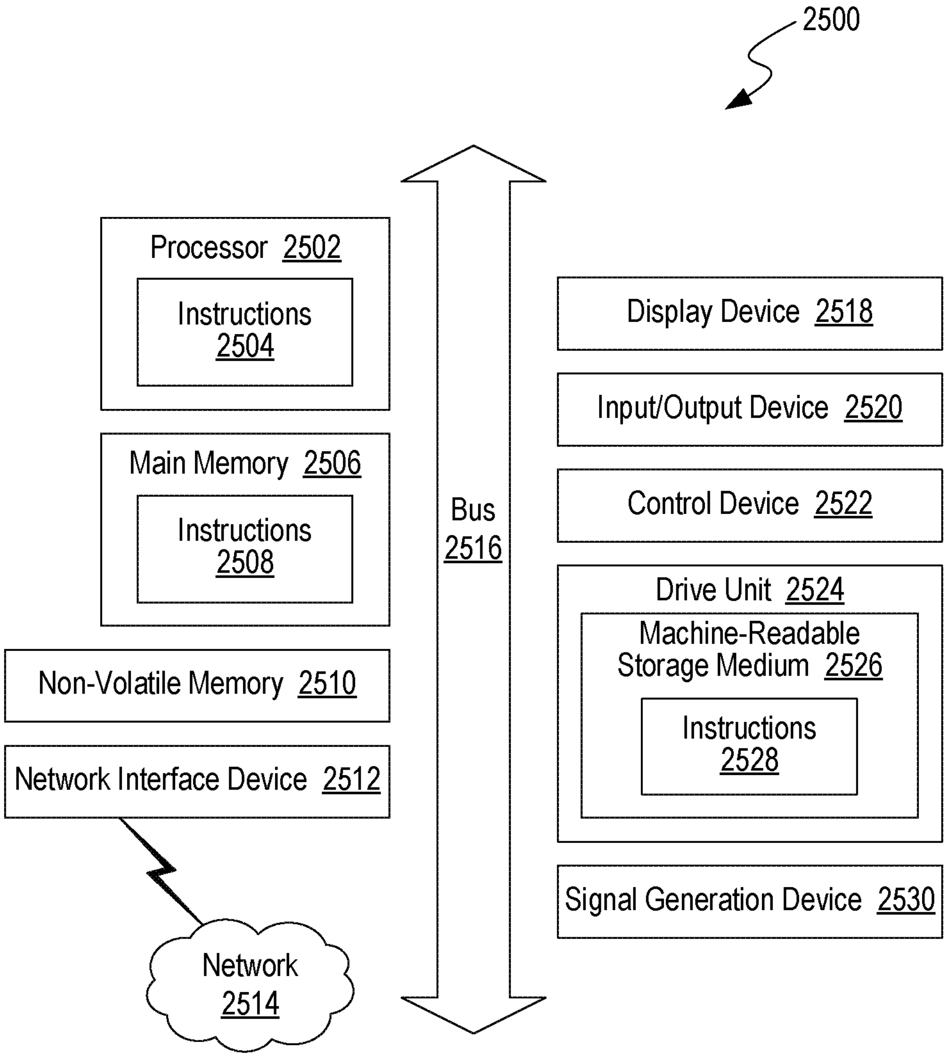
FIG. 25 is a block diagram showing some of the components typically incorporated in at least some of the computer systems and other devices on which the model orchestration platform operates, in accordance with some implementations of the present technology.

FIG. 25 is a block diagram showing some of the components typically incorporated in at least some of the computer systems 2500 and other devices on which the disclosed system operates in accordance with some implementations of the present technology. As shown, an example computer system 2500 can include: one or more processors 2502, main memory 2506, non-volatile memory 2510, a network interface device 2512, video display device 2518, an input/output device 2520, a control device 2522 (e.g., keyboard and pointing device), a drive unit 2524 that includes a machine-readable medium 2526, and a signal generation device 2530 that are communicatively connected to a bus 2516. The bus 2516 represents one or more physical buses and/or point-to-point connections that are connected by appropriate bridges, adapters, or controllers. Various common components (e.g., cache memory) are omitted from FIG. 25 for brevity. Instead, the computer system 2500 is intended to illustrate a hardware device on which components illustrated or described relative to the examples of the figures and any other components described in this specification can be implemented.

The computer system 2500 can take any suitable physical form. For example, the computer system 2500 can share a similar architecture to that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computer system 2500. In some implementations, the computer system 2500 can be an embedded computer system, a system-on-chip (SOC), a single-board computer system (SBC) or a distributed system such as a mesh of computer systems or include one or more cloud components in one or more networks. Where appropriate, one or more computer systems 2500 can perform operations in real time, near real time, or in batch mode.

The network interface device 2512 enables the computer system 2500 to exchange data in a network 2514 with an entity that is external to the computing system 2500 through any communication protocol supported by the computer system 2500 and the external entity. Examples of the network interface device 2512 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 2506, non-volatile memory 2510, machine-readable medium 2526) can be local, remote, or distributed. Although shown as a single medium, the machine-readable medium 2526 can include multiple media (e.g., a centralized/distributed database and/or associated caches and servers) that store one or more sets of instructions 2528. The machine-readable (storage) medium 2526 can include any medium that is capable of storing, encoding, or carrying a set of instructions for execution by the computer system 2500. The machine-readable medium 2526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2508, 2528) set at various times in various memory and storage devices in computing device(s). When read and executed by the processor 2502, the instruction(s) cause the computer system 2500 to perform operations to execute elements involving the various aspects of the disclosure.

Figure 26:
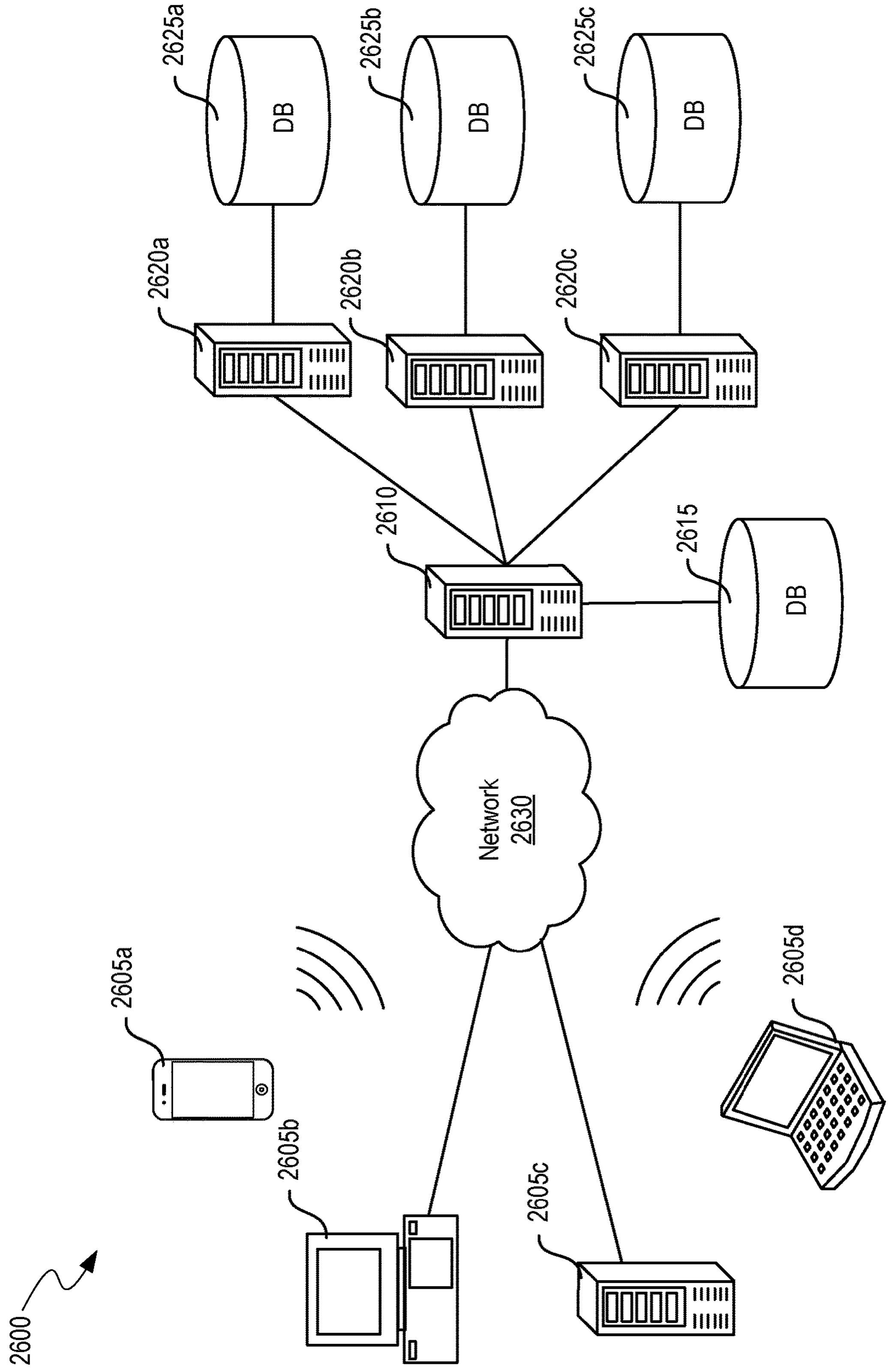
FIG. 26 is a system diagram illustrating an example of a computing environment in which the model orchestration platform operates, in accordance with some implementations of the present technology.

FIG. 26 is a system diagram illustrating an example of a computing environment in which the disclosed system operates in some implementations. In some implementations, environment 2600 includes one or more client computing devices 2605A-D, examples of which can host the model orchestration platform of FIG. 1. Client computing devices 2605 operate in a networked environment using logical connections through network 2630 to one or more remote computers, such as a server computing device.

In some implementations, server computing device 2610 is an edge server which receives client requests and coordinates fulfillment of those requests through other servers, such as servers 2620A-C. In some implementations, server computing devices 2610 and 2620 comprise computing systems, such as the model orchestration platform of FIG. 1. Though each server computing device 2610 and 2620 is displayed logically as a single server, server computing devices can each be a distributed computing environment encompassing multiple computing devices located at the same or at geographically disparate physical locations. In some implementations, each server computing device 2620 corresponds to a group of servers.

Client computing devices 2605 and server computing devices 2610 and 2620 can each act as a server or client to other server or client devices. In some implementations, servers (2610, 2620A-C) connect to a corresponding database (2615, 2625A-C). As discussed above, each server computing device 2620 can correspond to a group of servers, and each of these servers can share a database or can have its own database. Databases 2615 and 2625 warehouse (e.g., store) information such as claims data, email data, call transcripts, call logs, policy data and so on. Though databases 2615 and 2625 are displayed logically as single units, databases 2615 and 2625 can each be a distributed computing environment encompassing multiple computing devices, can be located within their corresponding server, or can be located at the same or at geographically disparate physical locations.

Network 2630 can be a local area network (LAN) or a wide area network (WAN), but can also be other wired or wireless networks. In some implementations, network 2630 is the Internet or some other public or private network. Client computing devices 2605 are connected to network 2630 through a network interface, such as by wired or wireless communication. While the connections between server computing device 2610 and server computing devices 2620 are shown as separate connections, these connections can be any kind of local, wide area, wired, or wireless network, including network 2630 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A system comprising:

at least one hardware processor; and at least one non-transitory memory storing instructions, which, when executed by the at least one hardware processor, cause the system to:

receive a task request at a computing device communicatively coupled to a plurality of artificial intelligence (AI) agents each operating in a stateless configuration, wherein each AI agent is registered in an agent registry configured to store a metadata profile of the AI agent, wherein the metadata profile defines a performance metric value set derived from one or more historical task executions associated with the AI agent, and wherein the metadata profile is configured to be dynamically updated in response to a change in an operational state of the AI agent;

identify a task feature set from the task request by classifying the task request into one or more task types in accordance with a datastore that maps respective vector representations of one or more historical tasks to one or more historical agent selections;

generate a score for each AI agent of the plurality of AI agents by evaluating the performance metric value set against the task feature set;

select an agent configuration by:

ranking the plurality of AI agents according to respective scores of the plurality of AI agents, identifying an AI agent subset by determining that the respective scores of the AI agent subset satisfy a threshold value, and determining an execution order for the AI agent subset by evaluating one or more intermediate output dependencies between one or more sequential portions of the task request;

transmit the task request to the AI agent subset according to the execution order; and update the agent registry based on the AI agent subset by:

obtaining an execution result set responsive to the transmitted task request, and updating one or more respective performance metric value sets of one or more AI agents based on the execution result set.

2. The system of claim 1, wherein the operational state comprises at least one of an availability status indicating whether the AI agent is currently processing a task or a workload metric indicating a number of tasks queued for the AI agent.

3. The system of claim 1, wherein the system is further caused to:

obtain an intermediate outcome score generated by a first AI agent in the AI agent subset during execution of an observed portion of the task request, determine that the intermediate outcome score fails to satisfy one or more performance criterion, and reroute a remaining portion of the task request to a second AI agent in the agent registry having a score that satisfies the threshold value.

4. The system of claim 1, wherein the system is further caused to:

generate a likelihood of successful task completion for each of a plurality of candidate execution paths prior to transmitting the task request, determining the execution order by selecting a particular candidate execution path of the plurality of candidate execution paths having a probability of successful task completion that satisfies a confidence threshold.

5. The system of claim 1, wherein the system is further caused to:

transmit the task request to a shadow agent concurrently with transmitting the task request to the AI agent subset, wherein an output generated by the shadow agent is configured to be stored in the datastore, and compare the output generated by the shadow agent against an output generated by the AI agent subset to update a performance metric value set of the shadow agent.

6. The system of claim 1, wherein the performance metric value set comprises a compliance score derived from a particular count of one or more task executions in which the AI agent satisfied one or more operative constraints relative to a total count of task executions by the AI agent.

7. The system of claim 1, wherein the system is further caused to:

determine that a task complexity value derived from the task feature set satisfies a complexity threshold, and in response to the determination, assign the task request to two or more AI agents sharing at least a portion of the respective metadata profiles, wherein each of the two or more AI agents are configured to independently use the task request to generate a respective output.

8. A non-transitory computer-readable storage medium comprising instructions for dynamically allocating tasks across a plurality of stateless artificial intelligence (AI) agents stored thereon, wherein the instructions when executed by at least one data processor of a system, cause the system to:

obtain a task request at a computing device communicatively coupled to a plurality of AI agents each operating in a stateless configuration, wherein each AI agent is registered in an agent registry configured to store a metadata profile of the AI agent, wherein the metadata profile defines a performance metric value set derived from one or more historical task executions associated with the AI agent;

determine a task feature set from the task request by classifying the task request into one or more task types in accordance with a datastore that maps respective vector representations of one or more historical tasks to one or more historical agent selections;

generate a score for one or more AI agents of the plurality of AI agents by evaluating the performance metric value set against the task feature set;

determine an agent configuration by:

identifying a AI agent subset according to respective scores of the plurality of AI agents, and determining an execution order for the AI agent subset by evaluating one or more intermediate output dependencies between one or more sequential portions of the task request;

cause transmission of the task request to the AI agent subset according to the execution order; and cause update of the agent registry based on the AI agent subset by:

obtaining an execution result set responsive to the task request, and updating one or more respective performance metric value sets of one or more AI agents based on the execution result set.

9. The non-transitory computer-readable storage medium of claim 8, wherein the instructions further cause the system to:

prior to generating the score for the one or more AI agents, filter the plurality of AI agents to determine the one or more AI agents by applying one or more constraints stored in the agent registry, wherein the one or more constraints define at least one of a maximum latency value or a maximum cost value.

10. The non-transitory computer-readable storage medium of claim 8, wherein the datastore comprises a graph structure having a first set of nodes representing the one or more task types and a second set of nodes representing one or more agent identifiers identifying the plurality of AI agents, and wherein each edge of the graph structure is configured to connect a first node in the first set of nodes to a second node in the second set of nodes in response to a determination that a corresponding AI agent of the second node has executed a task of a corresponding task type of the first node.

11. The non-transitory computer-readable storage medium of claim 8, wherein the instructions further cause the system to:

detect an indicator of a deteriorating performance during execution of the task request, and dynamically reallocate one or more resources to a different agent configuration prior to completion of the task request.

12. The non-transitory computer-readable storage medium of claim 8, wherein the instructions further cause the system to:

receive an intermediate result from a first AI agent in the AI agent subset during execution of the task request, determine that a value of a quality metric of the intermediate result fails to satisfy a quality threshold, and prior to completion of the task request, prevent execution by the first AI agent by reassigning the task request to a second AI agent in the plurality of AI agents.

13. The non-transitory computer-readable storage medium of claim 8, wherein the instructions further cause the system to:

prior to causing transmission of the task request, generate an outcome score for the agent configuration by querying the datastore to retrieve one or more historical execution results for one or more task requests having respective vector representations within a similarity threshold of the vector representation of the task request, and in response to the outcome score failing to satisfy an outcome threshold, modify the agent configuration by adding a first AI agent or replacing a second AI agent in the AI agent subset with a third AI agent.

14. The non-transitory computer-readable storage medium of claim 8, wherein the instructions further cause the system to:

receive a feedback signal associated with an output generated by the AI agent subset, store the feedback signal in the datastore in association with one or more of the task request or the agent configuration, and adjust one or more weights used to generate the score for each AI agent based on the feedback signal.

15. A computer-implemented method comprising:

obtaining a task request at a computing device communicatively coupled to a plurality of AI agents each operating in a stateless configuration, wherein each AI agent is registered in an agent registry configured to store a metadata profile of the AI agent, wherein the metadata profile defines a performance metric value set derived from one or more historical task executions associated with the AI agent;

determining a task feature set from the task request by classifying the task request into one or more task types in accordance with a datastore that maps respective vector representations of one or more historical tasks to one or more historical agent selections;

generating a score for one or more AI agents of the plurality of AI agents by evaluating the performance metric value set against the task feature set;

determining an agent configuration by:

identifying a AI agent subset according to respective scores of the plurality of AI agents, and determining an execution order for the AI agent subset by evaluating one or more intermediate output dependencies between one or more sequential portions of the task request;

causing transmission of the task request to the AI agent subset according to the execution order; and causing update of the agent registry based on the AI agent subset by:

obtaining an execution result set responsive to the task request, and updating one or more respective performance metric value sets of one or more AI agents based on the execution result set.

16. The computer-implemented method of claim 15, wherein the AI agent is an autonomous AI agent.

17. The computer-implemented method of claim 15, further comprising:

evaluating a plurality of candidate execution orders for the AI agent subset by generating a confidence score for each candidate execution order of the plurality of candidate execution orders, and pruning one or more candidate execution orders in response to determining that a particular confidence score for a particular candidate execution order fails to satisfy one or more criterion.

18. The computer-implemented method of claim 15, wherein the score is generated by aggregating one or more historical success rates and one or more measured response times.

19. The computer-implemented method of claim 15, wherein determining the agent configuration comprises providing the task feature set and the score for the one or more AI agents as input to an AI model configured to output the AI agent subset and the execution order.

20. The computer-implemented method of claim 15, wherein determining the agent configuration comprises matching the one or more types to one or more routing rules, wherein each routing rule defines a type pattern indicative of a particular type and a corresponding agent identifier associated with a particular AI agent, and wherein each AI agent of the AI agent subset is associated with an agent identifier that matches at least one of the one or more types.

* * * * *